US012208402B2

(12) United States Patent
Ophardt et al.

(10) Patent No.: US 12,208,402 B2
(45) Date of Patent: Jan. 28, 2025

(54) FLUID DISPENSING SYSTEM WITH ADAPTER FOR A TABLE TOP DISPENSER

(71) Applicant: OP-Hygiene IP GmbH, Niederbipp (CH)

(72) Inventors: Heiner Ophardt, Arisdorf (CH); Padraig McDonagh, County Sligo (IE)

(73) Assignee: OP-HYGIENE IP GMBH, Niederbipp (CH)

( * ) Notice: Subject to any disclaimer, the term of this patent is extended or adjusted under 35 U.S.C. 154(b) by 35 days.

(21) Appl. No.: 18/347,252

(22) Filed: Jul. 5, 2023

(65) Prior Publication Data

US 2024/0001385 A1 Jan. 4, 2024

Related U.S. Application Data

(63) Continuation of application No. 17/541,633, filed on Dec. 3, 2021, now Pat. No. 11,731,146.

(60) Provisional application No. 63/122,069, filed on Dec. 7, 2020.

(51) Int. Cl.

*B05B 11/00* (2023.01)
*A47K 5/12* (2006.01)
*B05B 11/10* (2023.01)

(52) U.S. Cl.

CPC ........ *B05B 11/0008* (2013.01); *A47K 5/1211* (2013.01); *B05B 11/1011* (2023.01); *B05B 11/1081* (2023.01); *A47K 2005/1218* (2013.01)

(58) Field of Classification Search

CPC ............. B05B 11/0008; B05B 11/3011; B05B 11/3047; B05B 11/3077; B05B 7/0062; A47K 5/1211; A47K 2005/1218; A47K 5/12; A47K 5/1205

See application file for complete search history.

(56) References Cited

U.S. PATENT DOCUMENTS

| | | | |
|---|---|---|---|
| 3,233,787 | A | 2/1966 | Ross |
| 4,186,855 | A | 2/1980 | Edman et al. |
| 5,435,463 | A | 7/1995 | Hodgson |
| 5,992,698 | A | 11/1999 | Copeland et al. |
| 7,748,573 | B2 | 7/2010 | Anhuf et al. |
| 10,743,719 | B2 | 8/2020 | Ophardt et al. |
| 11,389,035 | B2 | 7/2022 | Lang et al. |
| 2008/0110936 | A1 | 5/2008 | Ophardt |
| 2014/0144934 | A1 | 5/2014 | Ophardt et al. |

(Continued)

FOREIGN PATENT DOCUMENTS

| | | |
|---|---|---|
| DE | 40 08 886 | 9/1990 |
| DE | 202 14 347 U1 | 12/2002 |

(Continued)

*Primary Examiner* — Vishal Pancholi

(74) *Attorney, Agent, or Firm* — Thorpe North & Western, LLP

(57) ABSTRACT

A fluid dispensing system including a fluid dispenser that is operable in a stand-alone mode, and a housing that is configured to removably receive the fluid dispenser for operation of the fluid dispenser in a housed mode. When the fluid dispenser is placed on top of a horizontal support surface for operation of the fluid dispenser in the stand-alone mode, a pump mechanism of the fluid dispenser is manually activatable to dispense an allotment of fluid by manually depressing an activation member of the pump mechanism. When the fluid dispenser is received by the housing for operation of the fluid dispenser in the housed mode, the pump mechanism is activatable by activating an actuation mechanism of the housing.

20 Claims, 70 Drawing Sheets

(56) References Cited

U.S. PATENT DOCUMENTS

| | | | |
|---|---|---|---|
| 2016/0288151 | A1 | 10/2016 | Schultz et al. |
| 2018/0360275 | A1 | 12/2018 | Ophardt et al. |

FOREIGN PATENT DOCUMENTS

| | | | |
|---|---|---|---|
| DE | 10 2015 109 681 | | 12/2016 |
| DE | 20 2017 105 952 | U1 | 10/2018 |
| DE | 10 2019 132 545 | | 6/2021 |
| EP | 3 827 720 | | 6/2021 |
| SE | 538297 | C2 | 5/2016 |
| WO | WO 2008/006209 | | 1/2008 |

FLUID DISPENSING SYSTEM WITH ADAPTER FOR A TABLE TOP DISPENSER

RELATED APPLICATION

This application claims priority to the Dec. 7, 2020 filing date of U.S. Provisional Patent Application Ser. No. 63/122,069, and is a Continuation of the Dec. 3, 2021 filing date of the U.S. Non-Provisional patent application Ser. No. 17/541,633, which is incorporated herein by reference.

FIELD OF THE INVENTION

This invention relates to hand cleaning fluid dispensers, and more particularly to dispensers with a housing that is mounted to a support structure such as a wall or a post.

BACKGROUND OF THE INVENTION

It is known to mount hand cleaning fluid dispensers to a support structure such as a wall or a post. This allows the fluid dispensers to be mounted at a suitable height for delivering hand cleaning fluid onto a person's hand, and also allows the dispensers to be mounted at convenient and accessible locations, such as on a wall above or adjacent to a sink; on a wall adjacent to a doorway; or on a support post in a hallway or waiting room.

Wall or post mounted fluid dispensers often have a dispenser housing that is configured to removably receive a fluid reservoir containing a supply of the fluid to be dispensed, and a fluid pump for dispensing the fluid from the reservoir. The dispenser housing typically remains mounted in place on the wall or post, with the fluid reservoir and the fluid pump being removable for replacement when necessary, such as when the supply of fluid in the reservoir is depleted.

It is also known to provide stand-alone hand cleaning fluid dispensers that can be placed on a horizontal support surface, such as a table top, rather than being mounted to a wall or post. Stand-alone or table top fluid dispensers typically consist of a bottle that can be placed directly on top of a horizontal support surface, without any housing, and have a pump mechanism that extends through a top opening of the bottle. Fluid is typically dispensed from a table top dispenser by manually depressing a top portion of the pump mechanism, such as with a user's hand.

Table top dispensers have the advantage that they are easily movable, can be introduced to existing environments without the need to mount a housing, and can be placed on a variety of different support surfaces that may already be present in a given environment, such as tables, desks, and countertops.

The applicant has appreciated that in a facility that uses a variety of different fluid dispenser types, including both mounted dispensers and table top dispensers, there may occur a situation in which the facility experiences an oversupply of one type of dispenser and an undersupply of another type of dispenser. For example, a facility may have a large supply of table top dispensers and an undersupply of the fluid reservoirs and pumps needed for its mounted dispenser housings. The applicant has appreciated that it would be advantageous to be able to use the table top dispensers in the mounted dispenser housings, as this would allow for greater flexibility in how the table top dispensers and the mounted dispensers are used. Using the table top dispensers in the mounted dispenser housings would, for example, allow the mounted dispenser housings to remain operational for dispensing hand cleaning fluid, even if the supply of fluid reservoirs and pumps designed for the mounted dispenser housings has run out.

The applicant has appreciated a disadvantage of the prior art is that mounted dispenser housings can typically only dispense fluid from a pump and reservoir that were specifically designed for use in the housing, and are unable to dispense fluid from a table top dispenser.

SUMMARY OF THE INVENTION

To at least partially overcome some of the disadvantages of previously known devices and methods, in one aspect the present invention provides a fluid dispensing system including a fluid dispenser that is operable in a stand-alone mode, and a housing that is configured to removably receive the fluid dispenser for operation of the fluid dispenser in a housed mode. When the fluid dispenser is placed on top of a horizontal support surface for operation of the fluid dispenser in the stand-alone mode, a pump mechanism of the fluid dispenser is manually activatable to dispense an allotment of fluid by manually depressing an activation member of the pump mechanism. When the fluid dispenser is received by the housing for operation of the fluid dispenser in the housed mode, the pump mechanism is activatable by activating an actuation mechanism of the housing.

The applicant has appreciated that a fluid dispensing system with a fluid dispenser that is operable in a stand-alone mode as well as in a housed mode preferably provides flexibility as to the location and manner in which the fluid dispenser may be used to dispense fluid. For example, in some preferred embodiments of the invention the fluid dispenser could be placed in a housing mounted at a convenient height and location, such as on a wall adjacent to a doorway. Alternatively, the same fluid dispenser could be placed at a location where no housing has been installed, such as on a countertop or desk.

Preferably, the fluid dispensing system includes a plurality of fluid dispensers and a plurality of housings, each of the fluid dispensers being capable of being operated in the housed mode in any of the housings, and in the stand-alone mode when separated from the housings. This preferably allows the manager of a facility where the fluid dispensing system is used to select a preferred combination of housed and stand-alone locations for the fluid dispensers to be arranged in the facility, and to adjust the locations of the fluid dispensers over time based on changing needs and/or preferences. The fluid dispensing system also preferably allows a single supply of fluid dispensers to be used to restock all of the fluid dispensing locations in the facility, including both the housed and stand-alone locations.

In some preferred embodiments of the invention, the housing is capable of operating at least two different types of fluid dispensers. For example, the housing may be configured to operate a first type of fluid dispenser that is capable of being operated in the stand-alone mode, as well as a second type of dispenser that is designed to be operated in the housed mode only. The first type of fluid dispenser might, for example, have an internal biasing mechanism that biases the activation member of the pump mechanism to a raised position, thus permitting the first type of fluid dispenser to be operated relatively easily in the stand-alone mode merely by depressing the activation member, with the biasing mechanism returning the activation member to the raised position after each activation. In contrast, the second type of fluid dispenser could optionally lack an internal biasing mechanism, thus making it more difficult to operate in a stand-alone mode. The first type of fluid dispenser is sometimes referred to herein as a table top fluid dispenser, and the second type of fluid dispenser is sometimes referred to herein as a mountable fluid dispenser.

In at least some preferred embodiments of the invention, the housing has a support member that engages with a support surface of a table top fluid dispenser when the table top fluid dispenser is received by the housing, and the actuation mechanism includes an engagement member that moves relative to the support member between a first position and a second position upon activation of the actuation mechanism. The support member could, for example, be a shelf or ledge positioned near the bottom of the housing, and the support surface could, for example, be the bottom surface of the fluid dispenser bottle. When the table top fluid dispenser is received by the housing for operation of the table top fluid dispenser in the housed mode, and the engagement member is moved from the first position to the second position, the engagement member depresses the activation member from the raised position to a depressed position, to thereby activate the pump mechanism of the table top fluid dispenser to dispense the fluid.

The housing also preferably has a support element that engages with a piston chamber forming body of a mountable fluid dispenser when the mountable fluid dispenser is received by the housing, and a catch member that moves relative to the support element between an elevated position and a lowered position upon activation of the actuation mechanism. The support element could, for example, include a pair of horizontal slots near the top of the housing that receive a corresponding pair of horizontal fingers that extend laterally outwardly from the piston chamber forming body. The catch member engages with a catching member on a piston forming element of the mountable fluid dispenser. When the mountable fluid dispenser is received by the housing, and the catch member is engaged with the catching member, movement of the catch member between the elevated position and the lowered position moves the piston forming element relative to the piston chamber forming body between an extended position and a retracted position, to thereby activate the pump mechanism of the mountable fluid dispenser to dispense the fluid. The actuation mechanism also preferably has a biasing mechanism, such as a spring, that biases the catch member towards the elevated position, and thereby indirectly biases the piston forming element towards the extended position when the catch member is engaged with the catching member.

In some preferred embodiments of the invention, the engagement member is provided as a separate piece from the rest of the housing, and can be attached to or detached from the rest of the housing. For example, in some embodiments of the invention the engagement member may be provided as an add-on that can be used to retrofit an existing dispenser housing that was previously able to dispense fluid from mountable fluid dispensers, so as to allow the retrofitted dispenser housing to also be able to operate table top fluid dispensers as well.

Preferably, the engagement member is designed to attach to the housing without interfering with the ability of the housing to receive and dispense fluid from a mountable fluid dispenser. For example, the engagement member preferably attaches to the housing at at least one attachment point that is spaced from the catch member. The catch member may, for example, comprise two catch arms that extend from an actuation plate, and the engagement member may attach to the actuation plate at a position or positions that are spaced from the catch arms. In one preferred embodiment, the engagement member has two attachment arms that are configured to extend through existing attachment openings in the actuation plate, and through which the catch arms extend. The attachment arms are preferably sufficiently spaced from the catch arms to permit the catch arms to move from an unbiased position to a deflected position upon engagement of the catch member with the catching member. In some preferred embodiments, the mountable fluid dispenser has an elongated spout tube, and the engagement member has a spout tube opening through which the elongated spout tube extends when the mountable fluid dispenser is received by the housing.

Accordingly, in one aspect the present invention resides in a fluid dispensing system comprising: a housing; and a fluid dispenser; wherein the fluid dispenser comprises: a bottle containing a supply of fluid; a dispenser outlet; and a pump mechanism for dispensing an allotment of the fluid from the bottle out the dispenser outlet upon activation of the pump mechanism; wherein the pump mechanism has an activation member that is movable relative to the bottle between a raised position and a depressed position; wherein the pump mechanism has a biasing mechanism that biases the activation member towards the raised position; wherein the bottle has a bottom surface that engages with a horizontal support surface when the fluid dispenser is placed on top of the horizontal support surface for operation of the fluid dispenser in a stand-alone mode; wherein, when the fluid dispenser is placed on top of the horizontal support surface for operation of the fluid dispenser in the stand-alone mode, the pump mechanism is manually activatable to dispense the allotment of the fluid by manually depressing the activation member from the raised position to the depressed position; wherein the housing is configured to removably receive the fluid dispenser for operation of the fluid dispenser in a housed mode; wherein the housing comprises: an actuation mechanism; and a support member that engages with a support surface of the fluid dispenser when the fluid dispenser is received by the housing; wherein the actuation mechanism comprises an engagement member that moves relative to the support member between a first position and a second position upon activation of the actuation mechanism; and wherein, when the fluid dispenser is received by the housing for operation of the fluid dispenser in the housed mode, and the engagement member is moved from the first position to the second position, the engagement member depresses the activation member from the raised position to the depressed position, to thereby activate the pump mechanism to dispense the allotment of the fluid.

Optionally, the housing is configured to be mounted to a support structure.

Preferably, the housing is configured to be mounted to a vertical support structure.

In some embodiments, the housing is mounted to a support structure.

In some preferred embodiments, the housing is mounted to a vertical support structure.

The support surface of the fluid dispenser may, for example, comprise the bottom surface of the bottle.

In some embodiments, the fluid dispenser is a first fluid dispenser, the bottle is a first bottle, the fluid is a first fluid, the dispenser outlet is a first dispenser outlet, the pump mechanism is a first pump mechanism, and the biasing mechanism is a first biasing mechanism; wherein the fluid dispensing system further comprises a second fluid dispenser; wherein the second fluid dispenser comprises: a second bottle containing a supply of a second fluid; a second dispenser outlet; and a second pump mechanism for dispensing an allotment of the second fluid from the second bottle out the second dispenser outlet upon activation of the second pump mechanism; wherein the second pump mechanism has a piston forming element and a piston chamber forming body; wherein the piston chamber forming body defines a piston chamber that slideably receives the piston forming element; wherein the piston forming element is slideable along a pump axis relative to the piston chamber forming body between an extended position and a retracted position; wherein the housing is configured to removably receive the second fluid dispenser for operation of the second fluid dispenser when the first fluid dispenser is absent from the housing; wherein the housing further comprises a support element that engages with the piston chamber forming body to prevent the piston chamber forming body from moving axially relative to the support element; wherein the actuation mechanism further comprises a catch member that moves relative to the support element between an elevated position and a lowered position upon activation of the actuation mechanism; wherein the piston forming element has a catching member that engages with the catch member; wherein, when the catching member is engaged with the catch member and the support element is engaged with the piston chamber forming body, movement of the catch member between the elevated position and the lowered position moves the piston forming element relative to the piston chamber forming body between the extended position and the retracted position, to thereby activate the second pump mechanism to dispense the allotment of the second fluid; and wherein the actuation mechanism further comprises a second biasing mechanism that biases the catch member towards the elevated position.

Optionally, the actuation mechanism further comprises an actuation plate; wherein the engagement member attaches to the actuation plate; and wherein the engagement member is detachable from the actuation plate.

In some preferred embodiments, the catch member has two catch arms that extend from the actuation plate for engagement with the catching member; wherein the engagement member attaches to the actuation plate at at least one attachment point; and wherein the at least one attachment point is spaced from the two catch arms.

Optionally, the two catch arms are resiliently deflectable from an unbiased position to a deflected position; wherein the two catch arms move from the unbiased position to the deflected position upon engagement of the catch member with the catching member; and wherein the engagement member is sufficiently spaced from the two catch arms to permit movement of the two catch arms from the unbiased position to the deflected position.

The actuation plate may, for example, have a left side attachment opening and a right side attachment opening; wherein a left one of the two catch arms extends through the left side attachment opening; wherein a right one of the two catch arms extends through the right side attachment opening; wherein the engagement member as a left side attachment arm and a right side attachment arm; wherein the left side attachment arm extends through the left side attachment opening, and is spaced laterally outwardly from the left one of the two catch arms; and wherein the right side attachment arm extends through the right side attachment opening, and is spaced laterally outwardly from the right one of the two catch arms.

Optionally, when the catch member engages with the catching member, the catching member is positioned between the two catch arms; and wherein, when the catch member engages with the catching member, the catching member is spaced from the left side attachment arm and the right side attachment arm of the engagement member.

In some embodiments, the piston forming element has an elongated spout tube, the second dispenser outlet located at a terminal end of the elongated spout tube; wherein the engagement member has a spout tube opening; and wherein the elongated spout tube extends through the spout tube opening when the catching member is engaged with the catch member and the engagement member is attached to the actuation plate.

In another aspect, the present invention resides in a housing for dispensing fluid from a first fluid dispenser and a second fluid dispenser; wherein the housing is configured to removably receive the first fluid dispenser when the second fluid dispenser is absent from the housing; wherein the housing is configured to removably receive the second fluid dispenser when the first fluid dispenser is absent from the housing; the housing comprising: an actuation mechanism; a support member that engages with a support surface of the first fluid dispenser when the first fluid dispenser is received by the housing; and a support element that engages with a piston chamber forming body of the second fluid dispenser when the second fluid dispenser is received by the housing; wherein the actuation mechanism comprises an engagement member that moves relative to the support member between a first position and a second position upon activation of the actuation mechanism; wherein, when the first fluid dispenser is received by the housing and the engagement member is moved from the first position to the second position, the engagement member depresses an activation member of the first fluid dispenser from a raised position to a depressed position, to thereby activate a first pump mechanism of the first fluid dispenser to dispense an allotment of fluid from the first fluid dispenser; wherein, when the second fluid dispenser is received by the housing, the support element prevents the piston chamber forming body of the second fluid dispenser from moving along a pump axis relative to the support element; wherein the actuation mechanism further comprises a catch member that moves relative to the support element between an elevated position and a lowered position upon activation of the actuation mechanism; wherein the catch member engages with a catching member of a piston forming element of the second fluid dispenser; wherein, when the catch member is engaged with the catching member and the support element is engaged with the piston chamber forming body, movement of the catch member between the elevated position and the lowered position moves the piston forming element relative to the piston chamber forming body between an extended position and a retracted position, to thereby activate a second pump mechanism of the second fluid dispenser to dispense an allotment of fluid from the second fluid dispenser; and wherein the actuation mechanism further comprises a biasing mechanism that biases the catch member towards the elevated position.

In another aspect, the present invention resides in an adapter for a fluid dispenser housing, the fluid dispenser housing being configured to removably receive a mountable fluid dispenser, and to dispense an allotment of fluid from the mountable fluid dispenser upon activation of an actuation mechanism of the housing; wherein the adapter is configured to attach to the fluid dispenser housing to allow the fluid dispenser housing to removably receive a table top fluid dispenser, and to dispense an allotment of fluid from the table top fluid dispenser upon activation of the actuation mechanism of the housing; wherein the adapter comprises an engagement member that attaches to the actuation mechanism of the housing, so that the engagement member moves relative to a support member of the housing between a first position and a second position upon activation of the actuation mechanism of the housing; and wherein, when the table top fluid dispenser is received by the housing and the engagement member is moved from the first position to the second position, the engagement member depresses an activation member of the table top fluid dispenser from a raised position to a depressed position, to thereby activate a first pump mechanism of the table top fluid dispenser to dispense the allotment of fluid from the table top fluid dispenser.

In a further aspect, the present invention resides in a method of adapting a fluid dispenser housing to allow the housing to removably receive a table top fluid dispenser, and to dispense an allotment of fluid from the table top fluid dispenser upon activation of an actuation mechanism of the housing; wherein the fluid dispenser housing is configured to removably receive a mountable fluid dispenser, and to dispense an allotment of fluid from the mountable fluid dispenser upon activation of the actuation mechanism of the housing; the method comprising: attaching an adapter to the actuation mechanism of the housing, the adapter comprising an engagement member that moves relative to a support member of the housing between a first position and a second position upon activation of the actuation mechanism of the housing; wherein, when the table top fluid dispenser is received by the housing and the engagement member is moved from the first position to the second position, the engagement member depresses an activation member of the table top fluid dispenser from a raised position to a depressed position, to thereby activate a first pump mechanism of the table top fluid dispenser to dispense an allotment of fluid from the table top fluid dispenser.

Accordingly, in a first aspect the present invention resides in a housing for dispensing fluid from a first fluid dispenser and a second fluid dispenser; wherein the housing is configured to removably receive the first fluid dispenser when the second fluid dispenser is absent from the housing; wherein the housing is configured to removably receive the second fluid dispenser when the first fluid dispenser is absent from the housing; the housing comprising an actuation mechanism with a first engagement element for engaging with the first fluid dispenser when the first fluid dispenser is received by the housing, and a second engagement element for engaging with the second fluid dispenser when the second fluid dispenser is received by the housing; wherein, when the first fluid dispenser is received by the housing and engaged with the first engagement element, activation of the actuation mechanism activates the first fluid dispenser to dispense fluid from the first fluid dispenser; wherein, when the second fluid dispenser is received by the housing and engaged with the second engagement element, activation of the actuation mechanism activates the second fluid dispenser to dispense fluid from the second fluid dispenser; wherein the housing is configured to receive the first fluid dispenser without removal of the second engagement element; and wherein the housing is configured to receive the second fluid dispenser without removal of the first engagement element.

In a second aspect, the present invention resides in a housing, which optionally incorporates one or more features of the first aspect, wherein the first engagement element is spaced from the second engagement element.

In a third aspect, the present invention resides in a housing, which optionally incorporates one or more features of any one or more of the first and second aspects, wherein the first engagement element is configured to engage with an activation member of the first fluid dispenser, and to depress the activation member to dispense fluid from the first fluid dispenser when the actuation mechanism is activated.

In a fourth aspect, the present invention resides in a housing, which optionally incorporates one or more features of any one or more of the first to third aspects, wherein the housing is configured to carry the second fluid dispenser in a substantially vertical orientation when the second fluid dispenser is received by the housing; and wherein the housing is configured to carry the first fluid dispenser angled forwardly in a tilted orientation when the first fluid dispenser is received by the housing.

In a fifth aspect, the present invention resides in a housing, which optionally incorporates one or more features of any one or more of the first to fourth aspects, wherein the first engagement element comprises a support surface that engages with the first fluid dispenser to prevent the first fluid dispenser from falling forwardly out of the housing when the first fluid dispenser is received by the housing and engaged with the first engagement element.

In a sixth aspect, the present invention resides in a housing, which optionally incorporates one or more features of any one or more of the first to fifth aspects, wherein the first engagement element comprises a cavity for receiving the activation member of the first fluid dispenser; wherein the cavity has an upper surface that engages with a top surface of the activation member; wherein, upon activation of the actuation mechanism, the upper surface of the cavity moves downwardly, which depresses the activation member; wherein the cavity has a left side surface that is positioned adjacent to a left side of the activation member when the first fluid dispenser is received by the housing; wherein the cavity has a right side surface that is positioned adjacent to a right side of the activation member when the first fluid dispenser is received by the housing; wherein the left side surface of the cavity has a rearwardly facing left support surface that is configured to engage with a forwardly facing left locking surface on the left side of the activation member; and wherein the right side surface of the cavity has a rearwardly facing right support surface that is configured to engage with a forwardly facing right locking surface on the right side of the activation member.

In a seventh aspect, the present invention resides in a housing, which optionally incorporates one or more features of any one or more of the first to sixth aspects, wherein the left support surface and the right support surface each have a top portion and a bottom portion, the top portion being positioned upwardly and rearwardly relative to the bottom portion.

In an eighth aspect, the present invention resides in a housing, which optionally incorporates one or more features of any one or more of the first to seventh aspects, wherein the left support surface and the right support surface each have a wave-like contour.

In a ninth aspect, the present invention resides in a housing, which optionally incorporates one or more features of any one or more of the first to eighth aspects, wherein the housing comprises a support member; and wherein the support member is configured to support a fluid reservoir of the first fluid dispenser when the first fluid dispenser is received by the housing.

In a tenth aspect, the present invention resides in a housing, which optionally incorporates one or more features of any one or more of the first to ninth aspects, wherein the first engagement element is spaced forwardly relative to the second engagement element.

In an eleventh aspect, the present invention resides in a housing, which optionally incorporates one or more features of any one or more of the first to tenth aspects, wherein the second engagement element comprises two catch arms that are configured to engage with a piston forming element of the second fluid dispenser.

In a twelfth aspect, the present invention resides in a housing, which optionally incorporates one or more features of any one or more of the first to eleventh aspects, wherein the actuation mechanism comprises an engagement element carrying body that carries the first engagement element and the second engagement element; and wherein the engagement element carrying body pivots about a pivot axis upon activation of the actuation mechanism.

In a thirteenth aspect, the present invention resides in a housing, which optionally incorporates one or more features of any one or more of the first to twelfth aspects, wherein the first engagement element is spaced further from the pivot axis than the second engagement element is spaced from the pivot axis; and wherein, upon activation of the actuation mechanism, the first engagement element travels a greater distance than the second engagement element.

In a fourteenth aspect, the present invention resides in a housing, which optionally incorporates one or more features of any one or more of the first to thirteenth aspects, wherein the engagement element carrying body comprises a nozzle shield.

In a fifteenth aspect, the present invention resides in a housing, which optionally incorporates one or more features of any one or more of the first to fourteenth aspects, wherein the first engagement element has a spout tube opening for receiving an elongated spout tube of the second fluid dispenser when the second fluid dispenser is received by the housing.

In a sixteenth aspect, the present invention resides in a housing, which optionally incorporates one or more features of any one or more of the first to fifteenth aspects, wherein the first engagement element is configured to engage with an activation member of the first fluid dispenser, and to depress the activation member to dispense fluid from the first fluid dispenser when the actuation mechanism is activated; wherein the housing is configured to carry the second fluid dispenser in a substantially vertical orientation when the second fluid dispenser is received by the housing; wherein the housing is configured to carry the first fluid dispenser angled forwardly in a tilted orientation when the first fluid dispenser is received by the housing; and wherein the first engagement element comprises a support surface that engages with the first fluid dispenser to prevent the first fluid dispenser from falling forwardly out of the housing when the first fluid dispenser is received by the housing and engaged with the first engagement element.

In a seventeenth aspect, the present invention resides in a housing, which optionally incorporates one or more features of any one or more of the first to sixteenth aspects, wherein the first engagement element comprises a cavity for receiving the activation member of the first fluid dispenser; wherein the cavity has an upper surface that engages with a top surface of the activation member; wherein, upon activation of the actuation mechanism, the upper surface of the cavity moves downwardly, which depresses the activation member; wherein the cavity has a left side surface that is positioned adjacent to a left side of the activation member when the first fluid dispenser is received by the housing; wherein the cavity has a right side surface that is positioned adjacent to a right side of the activation member when the first fluid dispenser is received by the housing; wherein the left side surface of the cavity has a rearwardly facing left support surface that is configured to engage with a forwardly facing left locking surface on the left side of the activation member; wherein the right side surface of the cavity has a rearwardly facing right support surface that is configured to engage with a forwardly facing right locking surface on the right side of the activation member; wherein the left support surface and the right support surface each have a top portion and a bottom portion, the top portion being positioned upwardly and rearwardly relative to the bottom portion; and wherein the left support surface and the right support surface each have a wave-like contour.

In an eighteenth aspect, the present invention resides in a housing, which optionally incorporates one or more features of any one or more of the first to seventeenth aspects, wherein the housing comprises a support member; wherein the support member is configured to support a fluid reservoir of the first fluid dispenser when the first fluid dispenser is received by the housing; wherein the first engagement element is spaced forwardly relative to the second engagement element; wherein the second engagement element comprises two catch arms that are configured to engage with a piston forming element of the second fluid dispenser; wherein the actuation mechanism comprises an engagement element carrying body that carries the first engagement element and the second engagement element; and wherein the engagement element carrying body pivots about a pivot axis upon activation of the actuation mechanism.

In a nineteenth aspect, the present invention resides in a housing, which optionally incorporates one or more features of any one or more of the first to eighteenth aspects, wherein the first engagement element is spaced further from the pivot axis than the second engagement element is spaced from the pivot axis; wherein, upon activation of the actuation mechanism, the first engagement element travels a greater distance than the second engagement element; wherein the engagement element carrying body comprises a nozzle shield; and wherein the first engagement element has a spout tube opening for receiving an elongated spout tube of the second fluid dispenser when the second fluid dispenser is received by the housing.

In a twentieth aspect, the present invention resides in a housing, which optionally incorporates one or more features of any one or more of the first to nineteenth aspects, wherein the first engagement element has a spout tube opening for receiving an elongated spout tube of the second fluid dispenser when the second fluid dispenser is received by the housing.

In a twenty first aspect, the present invention resides in a fluid dispensing system, which optionally incorporates one or more features of any one or more of the first to twentieth aspects, the fluid dispensing system comprising: a housing; a first fluid dispenser; and a second fluid dispenser; wherein the first fluid dispenser comprises: a first bottle containing a supply of a first fluid; a first dispenser outlet; and a first pump mechanism for dispensing an allotment of the first fluid from the first bottle out the first dispenser outlet upon activation of the first pump mechanism; wherein the first pump mechanism has an activation member that is movable relative to the first bottle between a raised position and a depressed position; wherein the first pump mechanism has a first biasing mechanism that biases the activation member towards the raised position; wherein the first bottle has a bottom surface that engages with a horizontal support surface when the first fluid dispenser is placed on top of the horizontal support surface for operation of the first fluid dispenser in a stand-alone mode; wherein, when the first fluid dispenser is placed on top of the horizontal support surface for operation of the first fluid dispenser in the stand-alone mode, the first pump mechanism is manually activatable to dispense the allotment of the first fluid by manually depressing the activation member from the raised position to the depressed position; wherein the housing is configured to removably receive the first fluid dispenser for operation of the first fluid dispenser in a housed mode; wherein the housing comprises: an actuation mechanism; and a support member that engages with a support surface of the first fluid dispenser when the first fluid dispenser is received by the housing; wherein the actuation mechanism comprises an engagement member that moves relative to the support member between a first position and a second position upon activation of the actuation mechanism; and wherein, when the first fluid dispenser is received by the housing for operation of the first fluid dispenser in the housed mode, and the engagement member is moved from the first position to the second position, the engagement member depresses the activation member from the raised position to the depressed position, to thereby activate the first pump mechanism to dispense the allotment of the first fluid; wherein the second fluid dispenser comprises: a second bottle containing a supply of a second fluid; a second dispenser outlet; and a second pump mechanism for dispensing an allotment of the second fluid from the second bottle out the second dispenser outlet upon activation of the second pump mechanism; wherein the second pump mechanism has a piston forming element and a piston chamber forming body; wherein the piston chamber forming body defines a piston chamber that slideably receives the piston forming element; wherein the piston forming element is slideable along a pump axis relative to the piston chamber forming body between an extended position and a retracted position; wherein the housing is configured to removably receive the second fluid dispenser for operation of the second fluid dispenser when the first fluid dispenser is absent from the housing, without removal of the engagement member from the housing; wherein the housing further comprises a support element that engages with the piston chamber forming body to prevent the piston chamber forming body from moving axially relative to the support element; wherein the actuation mechanism further comprises a catch member that moves relative to the support element between an elevated position and a lowered position upon activation of the actuation mechanism; wherein the piston forming element has a catching member that engages with the catch member; wherein, when the catching member is engaged with the catch member and the support element is engaged with the piston chamber forming body, movement of the catch member between the elevated position and the lowered position moves the piston forming element relative to the piston chamber forming body between the extended position and the retracted position, to thereby activate the second pump mechanism to dispense the allotment of the second fluid; and wherein the actuation mechanism further comprises a second biasing mechanism that biases the catch member towards the elevated position.

In a twenty second aspect, the present invention resides in a fluid dispensing system, which optionally incorporates one or more features of any one or more of the first to twenty first aspects, wherein the housing is configured to be mounted to a support structure.

In a twenty third aspect, the present invention resides in a fluid dispensing system, which optionally incorporates one or more features of any one or more of the first to twenty second aspects, wherein the housing is configured to be mounted to a vertical support structure.

In a twenty fourth aspect, the present invention resides in a fluid dispensing system, which optionally incorporates one or more features of any one or more of the first to twenty third aspects, wherein the housing is mounted to a support structure.

In a twenty fifth aspect, the present invention resides in a fluid dispensing system, which optionally incorporates one or more features of any one or more of the first to twenty fourth aspects, wherein the housing is mounted to a vertical support structure.

In a twenty sixth aspect, the present invention resides in a fluid dispensing system, which optionally incorporates one or more features of any one or more of the first to twenty fifth aspects, wherein the support surface of the fluid dispenser comprises the bottom surface of the bottle.

In a twenty seventh aspect, the present invention resides in a fluid dispensing system, which optionally incorporates one or more features of any one or more of the first to twenty sixth aspects, wherein the actuation mechanism further comprises an actuation plate; wherein the engagement member attaches to the actuation plate; and wherein the engagement member is detachable from the actuation plate.

In a twenty eighth aspect, the present invention resides in a fluid dispensing system, which optionally incorporates one or more features of any one or more of the first to twenty seventh aspects, wherein the catch member has two catch arms that extend from the actuation plate for engagement with the catching member; wherein the engagement member attaches to the actuation plate at at least one attachment point; and wherein the at least one attachment point is spaced from the two catch arms.

In a twenty ninth aspect, the present invention resides in a fluid dispensing system, which optionally incorporates one or more features of any one or more of the first to twenty eighth aspects, wherein the two catch arms are resiliently deflectable from an unbiased position to a deflected position; wherein the two catch arms move from the unbiased position to the deflected position upon engagement of the catch member with the catching member; and wherein the engagement member is sufficiently spaced from the two catch arms to permit movement of the two catch arms from the unbiased position to the deflected position.

In a thirtieth aspect, the present invention resides in a fluid dispensing system, which optionally incorporates one or more features of any one or more of the first to twenty ninth aspects, wherein the actuation plate has a left side attachment opening and a right side attachment opening; wherein a left one of the two catch arms extends through the left side attachment opening; wherein a right one of the two catch arms extends through the right side attachment opening; wherein the engagement member as a left side attachment arm and a right side attachment arm; wherein the left side attachment arm extends through the left side attachment opening, and is spaced laterally outwardly from the left one of the two catch arms; and wherein the right side attachment arm extends through the right side attachment opening, and is spaced laterally outwardly from the right one of the two catch arms.

In a thirty first aspect, the present invention resides in a fluid dispensing system, which optionally incorporates one or more features of any one or more of the first to thirtieth aspects, wherein, when the catch member engages with the catching member, the catching member is positioned between the two catch arms; and wherein, when the catch member engages with the catching member, the catching member is spaced from the left side attachment arm and the right side attachment arm of the engagement member.

In a thirty second aspect, the present invention resides in a fluid dispensing system, which optionally incorporates one or more features of any one or more of the first to thirty first aspects, wherein the piston forming element has an elongated spout tube, the second dispenser outlet located at a terminal end of the elongated spout tube; wherein the engagement member has a spout tube opening; and wherein the elongated spout tube extends through the spout tube opening when the catching member is engaged with the catch member and the engagement member is attached to the actuation plate.

In a thirty third aspect, the present invention resides in a fluid dispensing system, which optionally incorporates one or more features of any one or more of the first to thirty second aspects, wherein, upon activation of the actuation mechanism, the actuation plate moves downwardly relative to the support element and relative to the support member; wherein the downward movement of the actuation plate moves the catch member downwardly from the elevated position to the lowered position; wherein the downward movement of the actuation plate moves the engagement member from the first position to the second position; wherein the second biasing mechanism biases the actuation plate upwardly, which causes the actuation plate to move upwardly after the activation of the actuation mechanism has ended; wherein the upward movement of the actuation plate moves the catch member upwardly from the lowered position to the elevated position; and wherein the upward movement of the actuation plate moves the engagement member from the second position to the first position.

In a thirty fourth aspect, the present invention resides in a fluid dispensing system, which optionally incorporates one or more features of any one or more of the first to thirty third aspects, wherein the actuation mechanism comprises a face shield; wherein the face shield pivots about a pivot axis between a rest position and a lowered position upon activation of the actuation mechanism; and wherein pivoting of the face shield between the rest position and the lowered position moves the catch member between the elevated position and the lowered position, and moves the engagement member between the first position and the second position.

In a thirty fifth aspect, the present invention resides in a fluid dispensing system, which optionally incorporates one or more features of any one or more of the first to thirty fourth aspects, wherein the face shield comprises the engagement member and the catch member; and wherein the engagement member is spaced from the catch member.

In a thirty sixth aspect, the present invention resides in a fluid dispensing system, which optionally incorporates one or more features of any one or more of the first to thirty fifth aspects, wherein the actuation mechanism further comprises an actuator lever; wherein the actuation mechanism is activated by manually depressing the actuator lever from a rest position to a depressed position; wherein the housing has a pump mounting body, the pump mounting body comprising the support element; wherein the face shield is pivotally mounted to the pump mounting body for pivoting relative to the pump mounting body about the pivot axis; wherein the actuator lever is attached to the face shield such that movement of the actuator lever from the rest position to the depressed position pivots the face shield about the pivot axis from the rest position to the lowered position; and wherein the second biasing mechanism biases the face shield towards the rest position.

In a thirty seventh aspect, the present invention resides in a fluid dispensing system, which optionally incorporates one or more features of any one or more of the first to thirty sixth aspects, further comprising a third fluid dispenser, the third fluid dispenser comprising: a third bottle containing a supply of a third fluid; a third dispenser outlet; and a third pump mechanism for dispensing an allotment of the third fluid from the third bottle out the third dispenser outlet upon activation of the third pump mechanism; wherein the third pump mechanism has a second activation member that is movable relative to the third bottle between a raised position and a depressed position; wherein the third pump mechanism has a third biasing mechanism that biases the second activation member towards the raised position; wherein the third bottle has a second bottom surface that engages with a horizontal support surface when the third fluid dispenser is placed on top of the horizontal support surface for operation of the third fluid dispenser in a stand-alone mode; wherein, when the third fluid dispenser is placed on top of the horizontal support surface for operation of the third fluid dispenser in the stand-alone mode, the third pump mechanism is manually activatable to dispense the allotment of the third fluid by manually depressing the second activation member from the raised position to the depressed position; wherein the housing is configured to removably receive the third fluid dispenser for operation of the third fluid dispenser in a housed mode, when the first fluid dispenser and the second fluid dispenser are absent from the housing; wherein the support member engages with the second bottom surface of the third bottle when the third fluid dispenser is received by the housing; and wherein, when the third fluid dispenser is received by the housing for operation of the third fluid dispenser in the housed mode, and the engagement member is moved from the first position to the second position, the engagement member depresses the second activation member from the raised position to the depressed position, to thereby activate the third pump mechanism to dispense the allotment of the third fluid.

In a thirty eighth aspect, the present invention resides in a fluid dispensing system, which optionally incorporates one or more features of any one or more of the first to thirty seventh aspects, wherein the engagement member has a first engagement portion configured to receive the first activation member of the first fluid dispenser when the first fluid dispenser is received by the housing; wherein the engagement member has a second engagement portion configured to receive the second activation member of the third fluid dispenser when the third fluid dispenser is received by the housing; and wherein the first activation member has a different size and/or a different shape than the second activation member.

In a thirty ninth aspect, the present invention resides in a fluid dispensing system, which optionally incorporates one or more features of any one or more of the first to thirty eighth aspects, wherein the piston forming element has an elongated spout tube, the second dispenser outlet located at a terminal end of the elongated spout tube; and wherein the engagement member has a channel for receiving the elongated spout tube when the second fluid dispenser is received by the housing.

In a fortieth aspect, the present invention resides in a fluid dispensing system, which optionally incorporates one or more features of any one or more of the first to thirty ninth aspects, wherein the support member has an adjustable height.

In a forty first aspect, the present invention resides in a housing for dispensing fluid from a first fluid dispenser and a second fluid dispenser, which optionally incorporates one or more features of any one or more of the first to fortieth aspects, wherein the housing is configured to removably receive the first fluid dispenser when the second fluid dispenser is absent from the housing; wherein the housing is configured to removably receive the second fluid dispenser when the first fluid dispenser is absent from the housing; the housing comprising: an actuation mechanism; a support member that engages with a support surface of the first fluid dispenser when the first fluid dispenser is received by the housing; and a support element that engages with a piston chamber forming body of the second fluid dispenser when the second fluid dispenser is received by the housing; wherein the actuation mechanism comprises an engagement member that moves relative to the support member between a first position and a second position upon activation of the actuation mechanism; wherein, when the first fluid dispenser is received by the housing and the engagement member is moved from the first position to the second position, the engagement member depresses an activation member of the first fluid dispenser from a raised position to a depressed position, to thereby activate a first pump mechanism of the first fluid dispenser to dispense an allotment of fluid from the first fluid dispenser; wherein, when the second fluid dispenser is received by the housing, the support element prevents the piston chamber forming body of the second fluid dispenser from moving along a pump axis relative to the support element; wherein the actuation mechanism further comprises a catch member that moves relative to the support element between an elevated position and a lowered position upon activation of the actuation mechanism; wherein the catch member engages with a catching member of a piston forming element of the second fluid dispenser; wherein, when the catch member is engaged with the catching member and the support element is engaged with the piston chamber forming body, movement of the catch member between the elevated position and the lowered position moves the piston forming element relative to the piston chamber forming body between an extended position and a retracted position, to thereby activate a second pump mechanism of the second fluid dispenser to dispense an allotment of fluid from the second fluid dispenser; wherein the actuation mechanism further comprises a biasing mechanism that biases the catch member towards the elevated position; and wherein the housing is configured to receive the second fluid dispenser without removal of the engagement member.

In a forty second aspect, the present invention resides in an adapter for a fluid dispenser housing, which optionally incorporates one or more features of any one or more of the first to forty first aspects, the fluid dispenser housing being configured to removably receive a mountable fluid dispenser, and to dispense an allotment of fluid from the mountable fluid dispenser upon activation of an actuation mechanism of the housing; wherein the adapter is configured to attach to the fluid dispenser housing to allow the fluid dispenser housing to removably receive a table top fluid dispenser, and to dispense an allotment of fluid from the table top fluid dispenser upon activation of the actuation mechanism of the housing, without interfering with the fluid dispenser housing being able to receive the mountable fluid dispenser; wherein the adapter comprises an engagement member that attaches to the actuation mechanism of the housing, so that the engagement member moves relative to a support member of the housing between a first position and a second position upon activation of the actuation mechanism of the housing; and wherein, when the table top fluid dispenser is received by the housing and the engagement member is moved from the first position to the second position, the engagement member depresses an activation member of the table top fluid dispenser from a raised position to a depressed position, to thereby activate a first pump mechanism of the table top fluid dispenser to dispense the allotment of fluid from the table top fluid dispenser.

In a forty third aspect, the present invention resides in a method of adapting a fluid dispenser housing to allow the housing to removably receive a table top fluid dispenser, and to dispense an allotment of fluid from the table top fluid dispenser upon activation of an actuation mechanism of the housing, which optionally incorporates one or more features of any one or more of the first to forty second aspects, wherein the fluid dispenser housing is configured to removably receive a mountable fluid dispenser, and to dispense an allotment of fluid from the mountable fluid dispenser upon activation of the actuation mechanism of the housing; the method comprising: attaching an adapter to the actuation mechanism of the housing, without interfering with the fluid dispenser housing being able to receive the mountable fluid dispenser, the adapter comprising an engagement member that moves relative to a support member of the housing between a first position and a second position upon activation of the actuation mechanism of the housing; wherein, when the table top fluid dispenser is received by the housing and the engagement member is moved from the first position to the second position, the engagement member depresses an activation member of the table top fluid dispenser from a raised position to a depressed position, to thereby activate a first pump mechanism of the table top fluid dispenser to dispense an allotment of fluid from the table top fluid dispenser.

In a forty fourth aspect, the present invention resides in a housing for dispensing fluid from a first fluid dispenser and a second fluid dispenser, which optionally incorporates one or more features of any one or more of the first to forty third aspects, wherein the housing is configured to removably receive the first fluid dispenser when the second fluid dispenser is absent from the housing; wherein the housing is configured to removably receive the second fluid dispenser when the first fluid dispenser is absent from the housing; the housing comprising an actuation mechanism with a first engagement element for engaging with the first fluid dispenser when the first fluid dispenser is received by the housing, and a second engagement element for engaging with the second fluid dispenser when the second fluid dispenser is received by the housing; wherein, when the first fluid dispenser is received by the housing and engaged with the first engagement element, activation of the actuation mechanism activates the first fluid dispenser to dispense fluid from the first fluid dispenser; wherein, when the second fluid dispenser is received by the housing and engaged with the second engagement element, activation of the actuation mechanism activates the second fluid dispenser to dispense fluid from the second fluid dispenser; wherein the housing is configured to removably receive the first fluid dispenser without removal of the second engagement element; and wherein the housing is configured to removably receive the second fluid dispenser without removal of the first engagement element.

In a forty fifth aspect, the present invention resides in a housing, which optionally incorporates one or more features of any one or more of the first to forty fourth aspects, wherein the first engagement element is spaced from the second engagement element.

In a forty sixth aspect, the present invention resides in a housing, which optionally incorporates one or more features of any one or more of the first to forty fifth aspects, wherein the first fluid dispenser is a table top fluid dispenser with an activation member that is manually depressible to dispense fluid from the table top fluid dispenser; and wherein the first engagement element is configured to engage with the activation member of the table top fluid dispenser, and to depress the activation member when the actuation mechanism is activated.

In a forty seventh aspect, the present invention resides in a housing, which optionally incorporates one or more features of any one or more of the first to forty sixth aspects, wherein the housing is configured to carry the second fluid dispenser in a substantially vertical orientation when the second fluid dispenser is received by the housing; and wherein the housing is configured to carry the first fluid dispenser in a tilted orientation that is angled forwardly relative to a vertical axis when the first fluid dispenser is received by the housing.

In a forty eighth aspect, the present invention resides in a housing, which optionally incorporates one or more features of any one or more of the first to forty seventh aspects, wherein the first engagement element comprises a support surface that engages with the first fluid dispenser to prevent the first fluid dispenser from falling forwardly out of the housing when the first fluid dispenser is received by the housing and engaged with the first engagement element.

In a forty ninth aspect, the present invention resides in a housing, which optionally incorporates one or more features of any one or more of the first to forty eighth aspects, wherein the first engagement element comprises a cavity for receiving the activation member of the first fluid dispenser; wherein the cavity has an upper surface that engages with a top surface of the activation member; wherein, upon activation of the actuation mechanism, the upper surface of the cavity moves downwardly, which depresses the activation member; wherein the activation member comprises a head with a forwardly facing outlet, a left side, and a right side; wherein the left side of the head has a forwardly facing left locking surface, and the right side of the head has a forwardly facing right locking surface; wherein the cavity has a left side surface that is positioned adjacent to the left side of the head when the first fluid dispenser is received by the housing; wherein the cavity has a right side surface that is positioned adjacent to the right side of the head when the first fluid dispenser is received by the housing; wherein the left side surface of the cavity has a rearwardly facing left support surface that engages with the left locking surface; wherein the right side surface of the cavity has a rearwardly facing right support surface that engages with the right locking surface; and wherein the engagement of the left support surface with the left locking surface, and the engagement of the right support surface with the right locking surface, prevents the first fluid dispenser from falling forwardly out of the housing when the first fluid dispenser is received by the housing and engaged with the first engagement element.

In a fiftieth aspect, the present invention resides in a housing, which optionally incorporates one or more features of any one or more of the first to forty ninth aspects, wherein the left support surface and the right support surface each have a top portion and a bottom portion, the top portion being positioned upwardly and rearwardly relative to the bottom portion; and wherein the left locking surface and the right locking surface each have an upper portion and a lower portion, the upper portion being positioned upwardly and rearwardly relative to the lower portion.

In a fifty first aspect, the present invention resides in a housing, which optionally incorporates one or more features of any one or more of the first to fiftieth aspects, wherein the left support surface, the right support surface, the left locking surface, and the right locking surface each have a wave-like contour.

In a fifty second aspect, the present invention resides in a fluid dispenser, which optionally incorporates one or more features of any one or more of the first to fifty first aspects, comprising: a bottle containing a supply of a fluid; a dispenser outlet; and a pump mechanism for dispensing an allotment of the fluid from the bottle out the dispenser outlet upon activation of the pump mechanism; wherein the pump mechanism has an activation member that is movable relative to the bottle between a raised position and a depressed position; wherein the pump mechanism has a biasing mechanism that biases the activation member towards the raised position; wherein the bottle has a bottom surface that engages with a horizontal support surface when the fluid dispenser is placed on top of the horizontal support surface for operation of the fluid dispenser in a stand-alone mode; wherein, when the fluid dispenser is placed on top of the horizontal support surface for operation of the fluid dispenser in the stand-alone mode, the pump mechanism is manually activatable to dispense the allotment of the fluid by manually depressing the activation member from the raised position to the depressed position; wherein the fluid dispenser is configured to be received by a housing for operation of the fluid dispenser in a housed mode; wherein the activation member comprises a head with a left side and a right side, and with the dispenser outlet facing forwardly; wherein the left side of the head has a forwardly facing left locking surface, and the right side of the head has a forwardly facing right locking surface; wherein the left locking surface and the right locking surface are configured to engage with support surfaces of the housing, to prevent the fluid dispenser from falling forwardly out of the housing; wherein the left locking surface and the right locking surface each have an upper portion and a lower portion, the upper portion being positioned upwardly and rearwardly relative to the lower portion.

In a fifty third aspect, the present invention resides in a fluid dispenser, which optionally incorporates one or more features of any one or more of the first to fifty second aspects, wherein the left locking surface and the right locking surface each slope downwardly as they extend forwardly.

In a fifty fourth aspect, the present invention resides in a fluid dispenser, which optionally incorporates one or more features of any one or more of the first to fifty third aspects, wherein the left locking surface and the right locking surface each have a slope that changes as they extend downwardly and forwardly.

In a fifty fifth aspect, the present invention resides in a fluid dispenser, which optionally incorporates one or more features of any one or more of the first to fifty fourth aspects, wherein the left locking surface and the right locking surface each have a wave-like contour.

In a fifty sixth aspect, the present invention resides in a housing, which optionally incorporates one or more features of any one or more of the first to fifty fifth aspects, wherein the housing comprises a support member; wherein the support member is configured to support a fluid reservoir of the first fluid dispenser when the first fluid dispenser is received by the housing; and wherein the support member is configured to support a fluid reservoir of the second fluid dispenser when the second fluid dispenser is received by the housing.

In a fifty seventh aspect, the present invention resides in a housing, which optionally incorporates one or more features of any one or more of the first to fifty sixth aspects, wherein the first engagement element is spaced forwardly relative to the second engagement element.

In a fifty eighth aspect, the present invention resides in a housing, which optionally incorporates one or more features of any one or more of the first to fifty seventh aspects, wherein the actuation mechanism comprises an engagement member and an actuation element; wherein the engagement member comprises the first engagement element; and wherein the engagement member attaches to the actuation element without interfering with the ability of the housing to receive the second fluid dispenser.

In a fifty ninth aspect, the present invention resides in a housing, which optionally incorporates one or more features of any one or more of the first to fifty eighth aspects, wherein the actuation element comprises the second engagement element, or the actuation element is attached to the second engagement element.

In a sixtieth aspect, the present invention resides in a housing, which optionally incorporates one or more features of any one or more of the first to fifty ninth aspects, wherein the engagement member is detachable from the actuation element.

In a sixty first aspect, the present invention resides in a housing, which optionally incorporates one or more features of any one or more of the first to sixtieth aspects, wherein the second engagement element comprises a catch member with two catch arms that are configured to engage with a piston forming element of the second fluid dispenser.

In a sixty second aspect, the present invention resides in a housing, which optionally incorporates one or more features of any one or more of the first to sixty first aspects, wherein the actuation mechanism comprises an engagement element carrying body that carries the first engagement element and the second engagement element; and wherein the engagement element carrying body pivots about a pivot axis upon activation of the actuation mechanism.

In a sixty third aspect, the present invention resides in a housing, which optionally incorporates one or more features of any one or more of the first to sixty second aspects, wherein the first engagement element is spaced further from the pivot axis than the second engagement element is spaced from the pivot axis.

In a sixty fourth aspect, the present invention resides in a housing, which optionally incorporates one or more features of any one or more of the first to sixty third aspects, wherein the engagement element carrying body comprises a nozzle shield.

In a sixty fifth aspect, the present invention resides in a housing, which optionally incorporates one or more features of any one or more of the first to sixty fourth aspects, wherein, upon activation of the actuation mechanism, the first engagement element travels a greater distance than the second engagement element.

In a sixty sixth aspect, the present invention resides in a housing, which optionally incorporates one or more features of any one or more of the first to sixty fifth aspects, wherein the housing comprises an adjustable support member; wherein the adjustable support member is configured to support a fluid reservoir of the first fluid dispenser when the first fluid dispenser is received by the housing; and wherein the adjustable support member is adjustable to select a height of the adjustable support member relative to the pivot axis.

In a sixty seventh aspect, the present invention resides in a housing, which optionally incorporates one or more features of any one or more of the first to sixty sixth aspects, wherein the second fluid dispenser has an elongated spout tube; and wherein the first engagement element has a spout tube opening for receiving the elongated spout tube when the second fluid dispenser is received by the housing.

In a sixty eighth aspect, the present invention resides in a method of dispensing fluid from a table top fluid dispenser, which optionally incorporates one or more features of any one or more of the first to sixty seventh aspects, comprising: placing the table top fluid dispenser in a housing in accordance with any one of the previous aspects; engaging the first engagement element with the table top fluid dispenser; and activating the actuation mechanism to dispense the fluid from the table top fluid dispenser.

In a sixty ninth aspect, the present invention resides in a housing for dispensing fluid from a fluid dispenser, which optionally incorporates one or more features of any one or more of the first to sixty eighth aspects, the housing comprising an actuation mechanism having an engagement element carrying body that pivots about a pivot axis upon activation of the actuation mechanism; wherein the engagement element carrying body carries a pump engagement element for engaging with an activation member of the fluid dispenser; wherein, when the fluid dispenser is received by the housing and the activation member is engaged with the pump engagement element, activation of the actuation mechanism depresses the activation member to dispense fluid from the fluid dispenser; and wherein the pump engagement element is moveable to select a position of the pump engagement element on the engagement element carrying body relative to the pivot axis.

In a seventieth aspect, the present invention resides in a housing, which optionally incorporates one or more features of any one or more of the first to sixty ninth aspects, wherein the housing comprises a support member for supporting a fluid reservoir of the fluid dispenser; and wherein a distance that the pump engagement element travels towards the support member upon activation of the actuation mechanism increases as a distance of the pump engagement element from the pivot axis increases.

In a seventy first aspect, the present invention resides in a housing, which optionally incorporates one or more features of any one or more of the first to seventieth aspects, wherein the support member has an adjustable height relative to the pivot axis.

In a seventy second aspect, the present invention resides in a housing, which optionally incorporates one or more features of any one or more of the first to seventy first aspects, wherein the pump engagement element has a cavity configured to receive the activation member, and to prevent the activation member from falling out of engagement with the pump engagement element.

In a seventy third aspect, the present invention resides in a housing, which optionally incorporates one or more features of any one or more of the first to seventy second aspects, wherein the engagement element carrying body comprises an actuator lever.

In a seventy fourth aspect, the present invention resides in a housing, which optionally incorporates one or more features of any one or more of the first to seventy third aspects, wherein the engagement element carrying body comprises a nozzle shield.

In a seventy fifth aspect, the present invention resides in a housing, which optionally incorporates one or more features of any one or more of the first to seventy fourth aspects, wherein the fluid dispenser is a first fluid dispenser; and wherein the pump engagement element is removable from engagement element carrying body, the housing further comprising a second pump engagement element that is attachable to the engagement element carrying body, the second pump engagement element being configured to engage with an activation member of a second fluid dispenser, the activation member of the second fluid dispenser having a different size and/or shape than the activation member of the first fluid dispenser.

In a seventy sixth aspect, the present invention resides in a housing, which optionally incorporates one or more features of any one or more of the first to seventy fifth aspects, wherein the fluid dispenser is a first fluid dispenser; and wherein the housing further comprises a second pump engagement element that is carried by the engagement element carrying body, the second pump engagement element being configured to engage with an activation member of a second fluid dispenser.

In a seventy seventh aspect, the present invention resides in a fluid dispenser housing, which optionally incorporates one or more features of any one or more of the first to seventy sixth aspects, comprising: a shroud defining an internal cavity for receiving a fluid dispenser; and a pump actuation mechanism assembly attached to the shroud, the pump actuation mechanism for activating the fluid dispenser to dispense fluid; wherein the pump actuation mechanism assembly comprises: an actuator lever; a nozzle shield; a pump mounting body; and a biasing mechanism; wherein the nozzle shield is pivotally connected to the pump mounting body for pivoting about a pivot axis between a raised position and a lowered position; wherein the biasing mechanism biases the nozzle shield towards the raised position; wherein the actuator lever engages with the nozzle shield, so that depressing the actuator lever pivots the nozzle shield about the pivot axis towards the lowered position; and wherein the nozzle shield comprises a pump engagement element that engages with the fluid dispenser to activate the fluid dispenser when the nozzle shield is pivoted from the raised position towards the lowered position.

In a seventy eighth aspect, the present invention resides in a fluid dispenser housing, which optionally incorporates one or more features of any one or more of the first to seventy seventh aspects, wherein the fluid dispenser is a first fluid dispenser, the fluid dispenser housing being configured to receive a second fluid dispenser when the first fluid dispenser is absent from the fluid dispenser housing; wherein the pump engagement element is a first pump engagement element; and wherein the nozzle shield comprises a second pump engagement element that engages with the second fluid dispenser to activate the second fluid dispenser to dispense fluid when the nozzle shield is pivoted from the raised position towards the lowered position.

In a seventy ninth aspect, the present invention resides in a fluid dispenser housing, which optionally incorporates one or more features of any one or more of the first to seventy eighth aspects, wherein the second pump engagement element is spaced further from the pivot axis than the first pump engagement element is from the pivot axis.

In an eightieth aspect, the present invention resides in a fluid dispenser housing, which optionally incorporates one or more features of any one or more of the first to seventy ninth aspects, wherein the pump actuation mechanism assembly is removable from the shroud.

In an eighty first aspect, the present invention resides in a fluid dispenser housing, which optionally incorporates one or more features of any one or more of the first to eightieth aspects, wherein the shroud comprises a left side wall and a right side wall; wherein the shroud has a stud that extends laterally inwardly from the left side wall, and a stud that extends laterally inwardly from the right side wall; wherein the pump mounting body has a left stud engagement channel for receiving the stud extending laterally inwardly from the left side wall, and a right stud engagement channel for receiving the stud extending laterally inwardly from the right side wall; wherein the pump mounting body has a locking mechanism that holds the stud extending laterally inwardly from the left side wall in the left stud engagement channel, and that holds the stud extending laterally inwardly from the right side wall in the right stud engagement channel; and wherein the pump mounting body has a release mechanism that, when activated, allows the stud extending laterally inwardly from the left side wall to be released from the left stud engagement channel, and allows the stud extending laterally inwardly from the right side wall to be released from the right stud engagement channel.

BRIEF DESCRIPTION OF THE DRAWINGS

Further aspects and advantages of the invention will appear from the following description taken together with the accompanying drawings, in which:

FIG. 11B is a side perspective view of the engagement member shown in FIG. 7 attached to the actuator plate shown in FIG. 9;

DETAILED DESCRIPTION OF THE DRAWINGS

FIGS. 1 to 22 show a fluid dispensing system in accordance with a first aspect of the present invention. The fluid dispensing system includes a fluid dispenser housing 10, a mountable fluid dispenser 12, and a table top fluid dispenser 14.

The fluid dispenser housing 10 and the mountable fluid dispenser 12 have a construction generally similar to that shown and described in U.S. Pat. No. 7,748,573 to Anhuf et al., issued Jul. 6, 2010, which is incorporated herein by reference.

Figure 1:
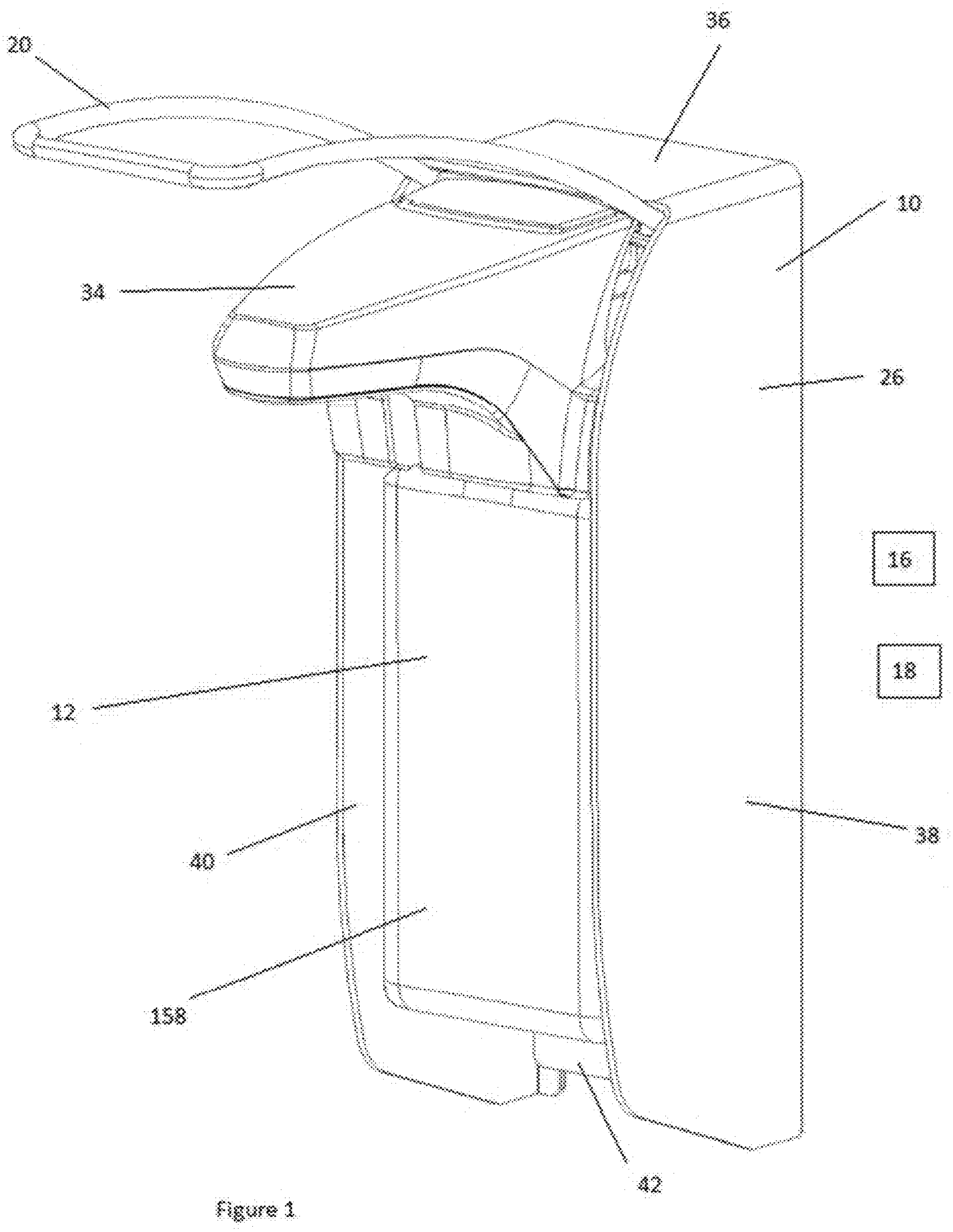
FIG. 1 is a perspective view of a fluid dispenser housing containing a mountable fluid dispenser in accordance with a first embodiment of the present invention, showing an actuator lever of the fluid dispenser housing at a rest position.
Figure 2:
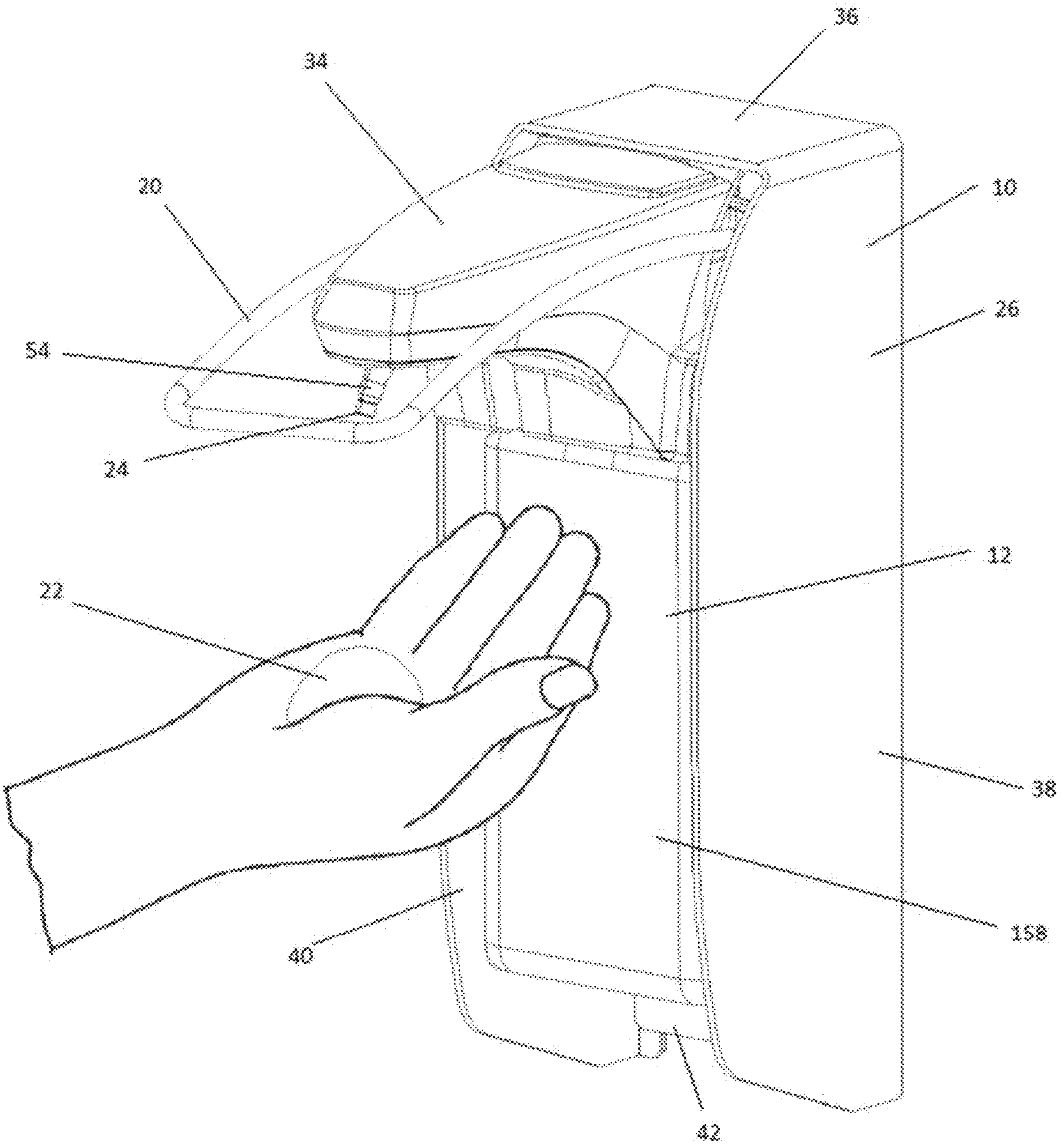
FIG. 2 is a perspective view of the fluid dispenser housing and mountable fluid dispenser shown in FIG. 1, with a user's hand shown positioned below a fluid outlet of the mountable fluid dispenser, with the actuator lever at a depressed position and a volume of fluid dispensed onto the user's hand.

The fluid dispenser housing 10 is adapted to be secured to a support structure 16, such as a vertical wall 18, and is adapted for manual activation by a user urging an actuator lever 20 of the housing 10 downwardly from the rest position shown in FIG. 1 to the depressed position shown in FIG. 2. When the mountable fluid dispenser 12 is received by the housing 10 as shown in FIGS. 1 and 2, urging the actuator lever 20 downwardly from the rest position shown in FIG. 1 to the depressed position shown in FIG. 2 causes the mountable fluid dispenser 12 to dispense hand cleaning fluid 22 from a fluid outlet 24.

Referring to FIGS. 1 to 4, the fluid dispenser housing 10 has a shroud 26, a pump mounting body 28, an actuation mechanism 30, a support member 32, and a face shield 34. The shroud 26 has a horizontal top wall 36, two spaced vertical side walls 38 and 40, and a vertical back wall 42. The back wall 42 is configured to be secured to a support structure 16 such as a vertical wall 18, as is known in the art. Together, the top wall 26, the side walls 38, 40, and the back wall 42 define an inner cavity 44 therebetween for receiving the mountable fluid dispenser 12 or the table top fluid dispenser 14.

Figure 13:
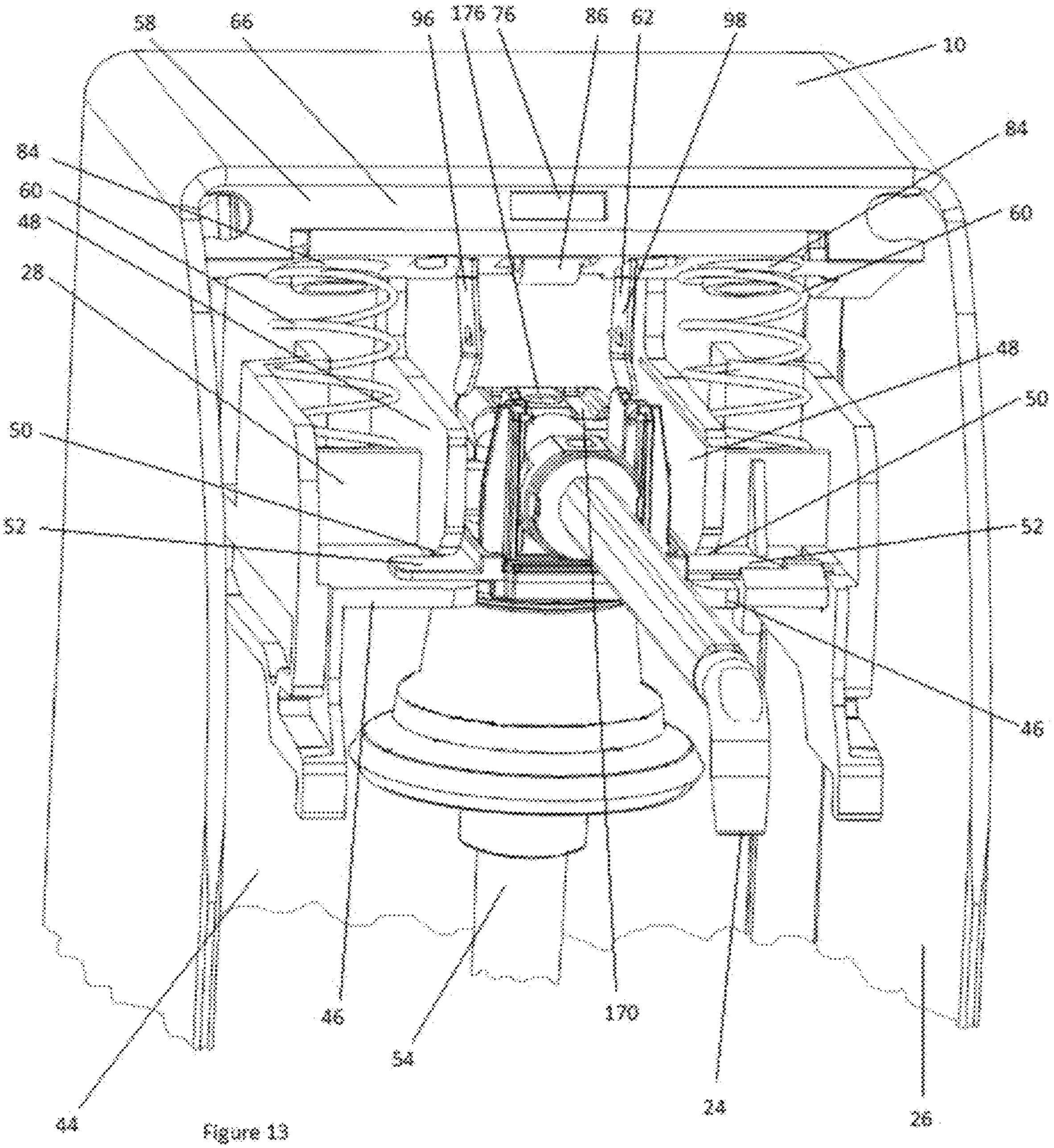
FIG. 13 is a partial front perspective view of the fluid dispenser housing and the mountable fluid dispenser shown in FIG. 1, with the actuator lever, the face shield, the engagement member, and the fluid reservoir omitted, and showing the catch member at an elevated position and disengaged from the fluid pump.

The pump mounting body 28 is positioned near the top of the inner cavity 44 of the shroud 26, and is best shown in FIG. 13. The pump mounting body 28 has two horizontal shoulder members 46 and two vertical holding members 48, each of the vertical holding members 48 being spaced a short distance above a respective one of the horizontal shoulder members 46 so as to define a horizontal slot 50 therebetween. The horizontal slots are configured to receive a pair of mounting fingers 52 that extend laterally outwardly from a fluid pump 54 of the mountable fluid dispenser 12, as is known in the art.

Figure 4:
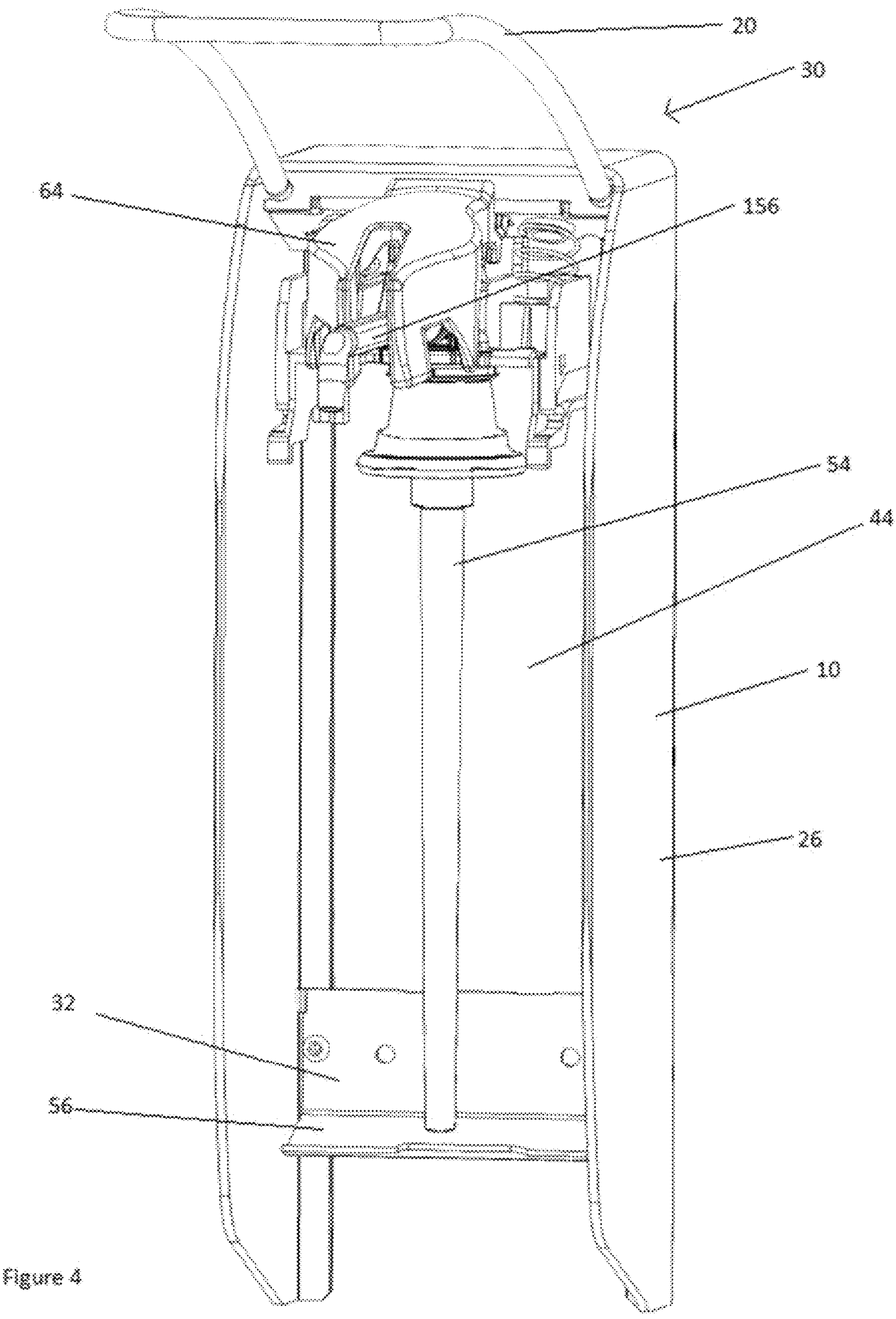
FIG. 4 is a front perspective view of the fluid dispenser housing and mountable fluid dispenser shown in FIG. 1, with the fluid reservoir omitted and a face shield of the fluid dispenser housing omitted.
Figure 5:
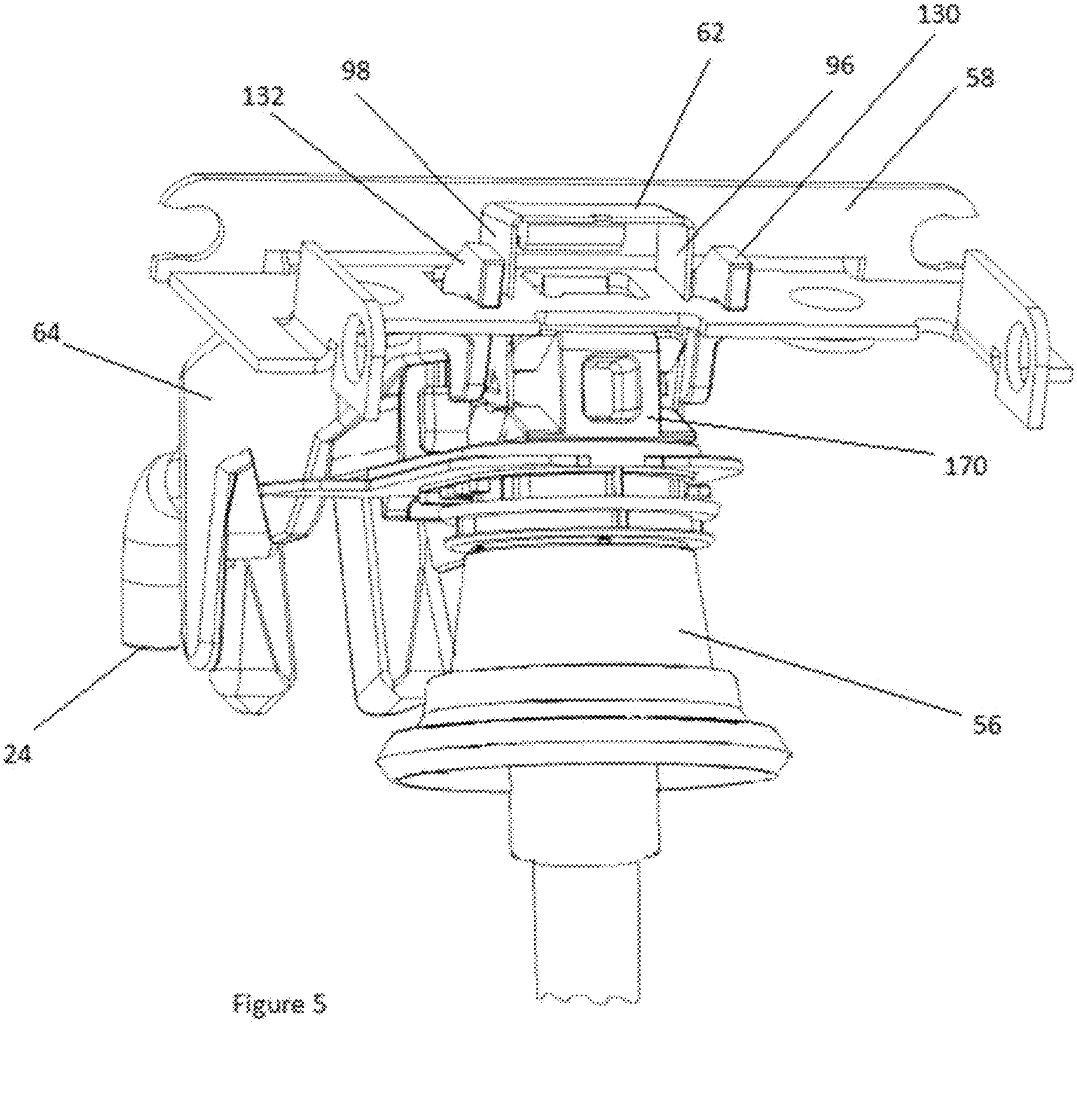
FIG. 5 is a partial rear perspective view of an actuator plate, a catch member, and an engagement member of the fluid dispenser housing shown in FIG. 1, showing the catch member engaged with a fluid pump of the mountable fluid dispenser shown in FIG. 1.

As shown in FIG. 4, the support member 32 is attached to the lower portion of the back wall 42, and has a foot portion 56 that extends forwardly from the back wall 42 to provide a ledge-like support for supporting the mountable fluid dispenser 12 when the mountable fluid dispenser 12 is received by the housing 10, or for supporting the table top fluid dispenser 14 when the table top fluid dispenser 14 is received by the housing 10.

The actuation mechanism 30 includes the actuator lever 20, an actuation plate 58, two springs 60, a catch member 62, and an engagement member 64. The actuator lever 20 has a hinged connection to the pump mounting body 28 for pivoting relative to the pump mounting body 28 between the rest position shown in FIG. 1 and the depressed position shown in FIG. 2, as is known in the art.

Figure 9:
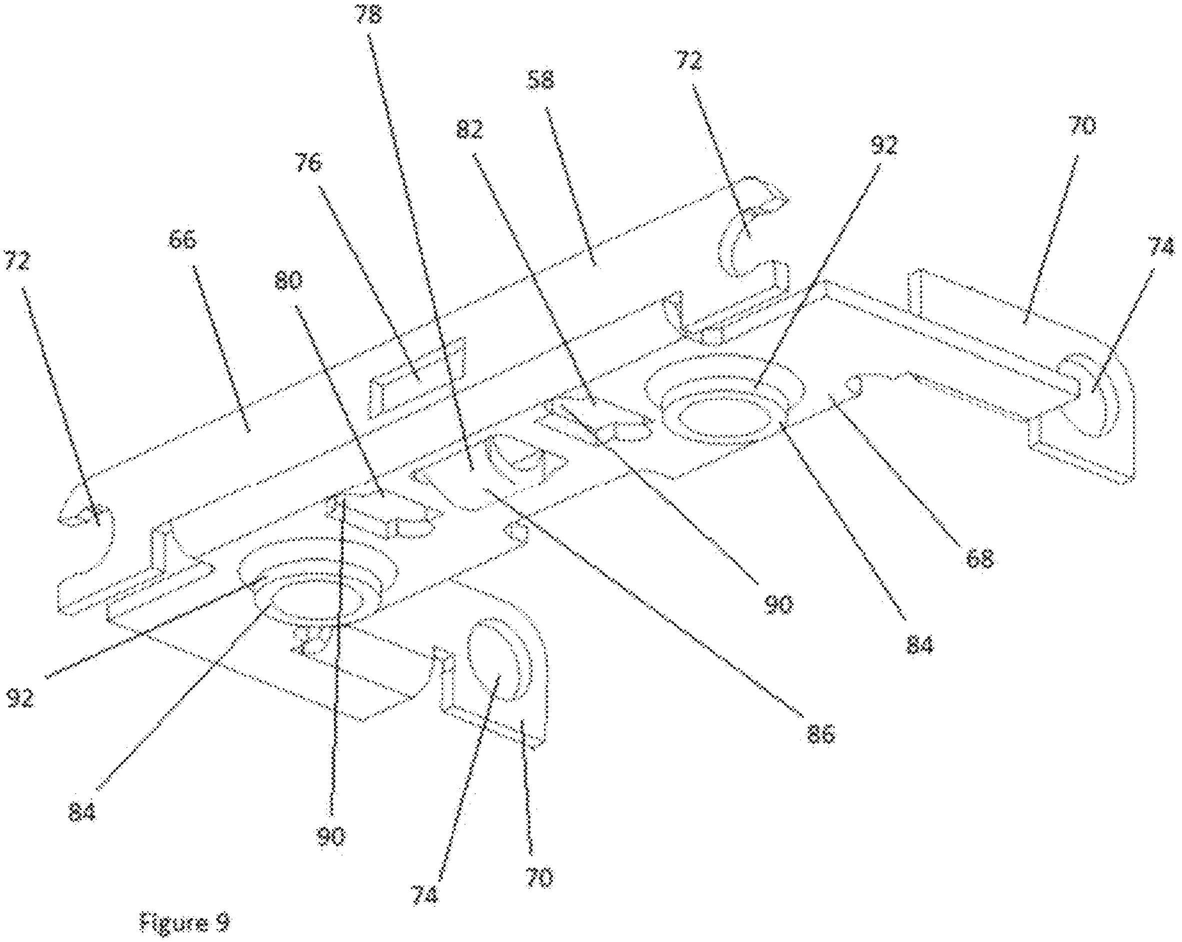
FIG. 9 is a bottom perspective view of the actuator plate shown in FIG. 5.
Figure 10:
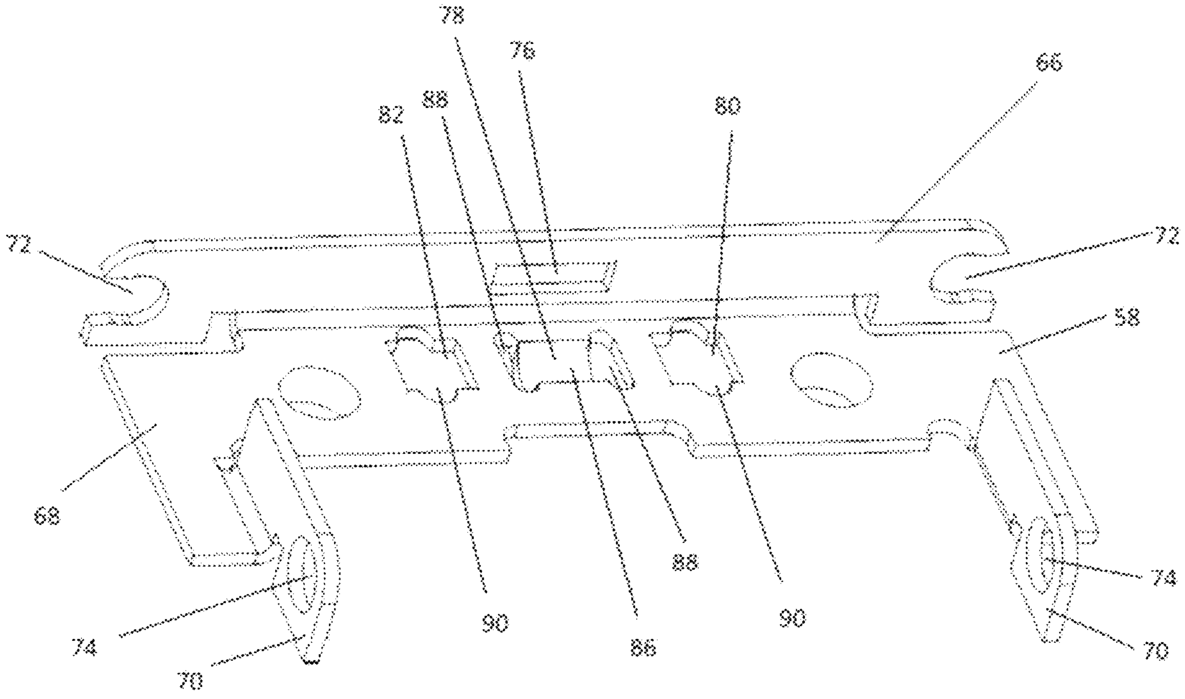
FIG. 10 is a rear perspective view of the actuator plate shown in FIG. 9.

The actuation plate 58 is best shown in FIGS. 9 and 10. The actuation plate 58 sits below the top wall 36 of the shroud 26, and has a front face portion 66, a main body portion 68 that is oriented 90 degrees relative to the front face portion 66, and two lever attachment portions 70 that extend rearwardly from the main body portion 68. The front face portion 66 has two laterally open lever attachment openings 72 and a rectangular central opening 76. The main body portion 68 has a central drive member 78, a left side attachment opening 80, a right side attachment opening 82, and a pair of spring receiving members 84. The central drive member 78 has a semi-cylindrical body 86 that extends downwardly from the main body portion 68, with slit-shaped openings 88 that extend through the main body portion 68 on the left and right sides of the semi-cylindrical body 86. The left side attachment opening 80 is spaced to the left of the central drive member 78, and the right side attachment opening 82 is spaced to the right of the central drive member 78. The left and right side attachment openings 80, 82 each have a generally rectangular shape, with a slot-like central portion 90 where the length of the attachment openings 80, 82 is extended in the front to back direction. The two spring receiving members 84 are spaced laterally outwardly from the left and right side attachment openings 80 and 82, respectively, and each have a truncated cylindrical body 92 that extends downwardly from the main body portion 68. The lever attachment portions 70 each have a circular opening 74. The actuator lever 20 attaches to the lever attachment openings 72 and the circular openings 74, and pivots the actuation plate 58 relative to the pump mounting body 28 when the actuator lever 20 is pivoted between the raised position and the depressed position, as is known in the art.

As can be seen in FIG. 13, each of the springs 60 extends from one of the spring receiving members 84 to the pump mounting body 28. The springs 60 push the actuation plate 58 upwardly away from the pump mounting body 28, so as to bias the actuator lever 20 towards the rest position shown in FIG. 1.

Figure 11A:
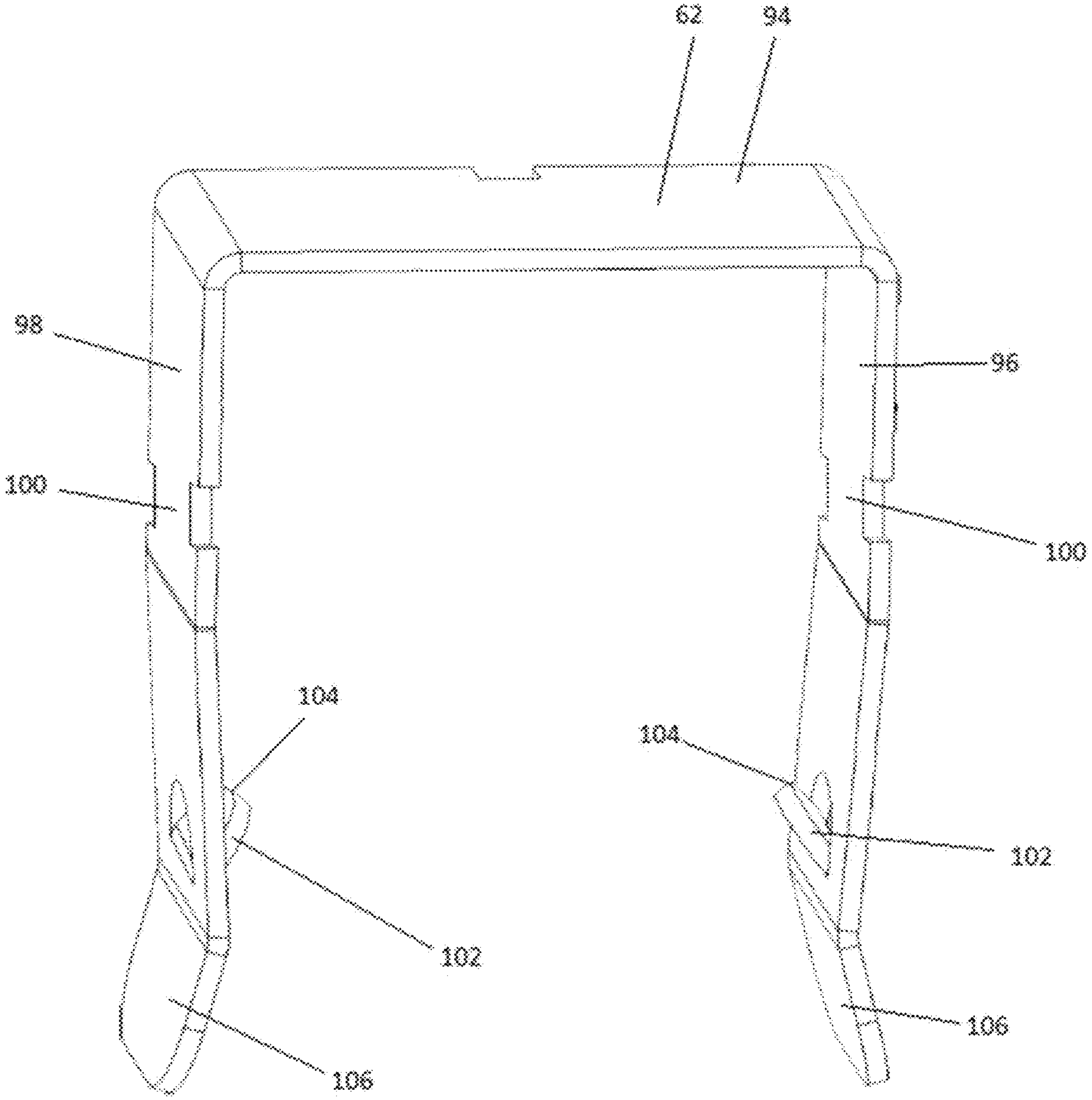
FIG. 11A is a rear perspective view of the catch member shown in FIG. 5.
Figure 118:
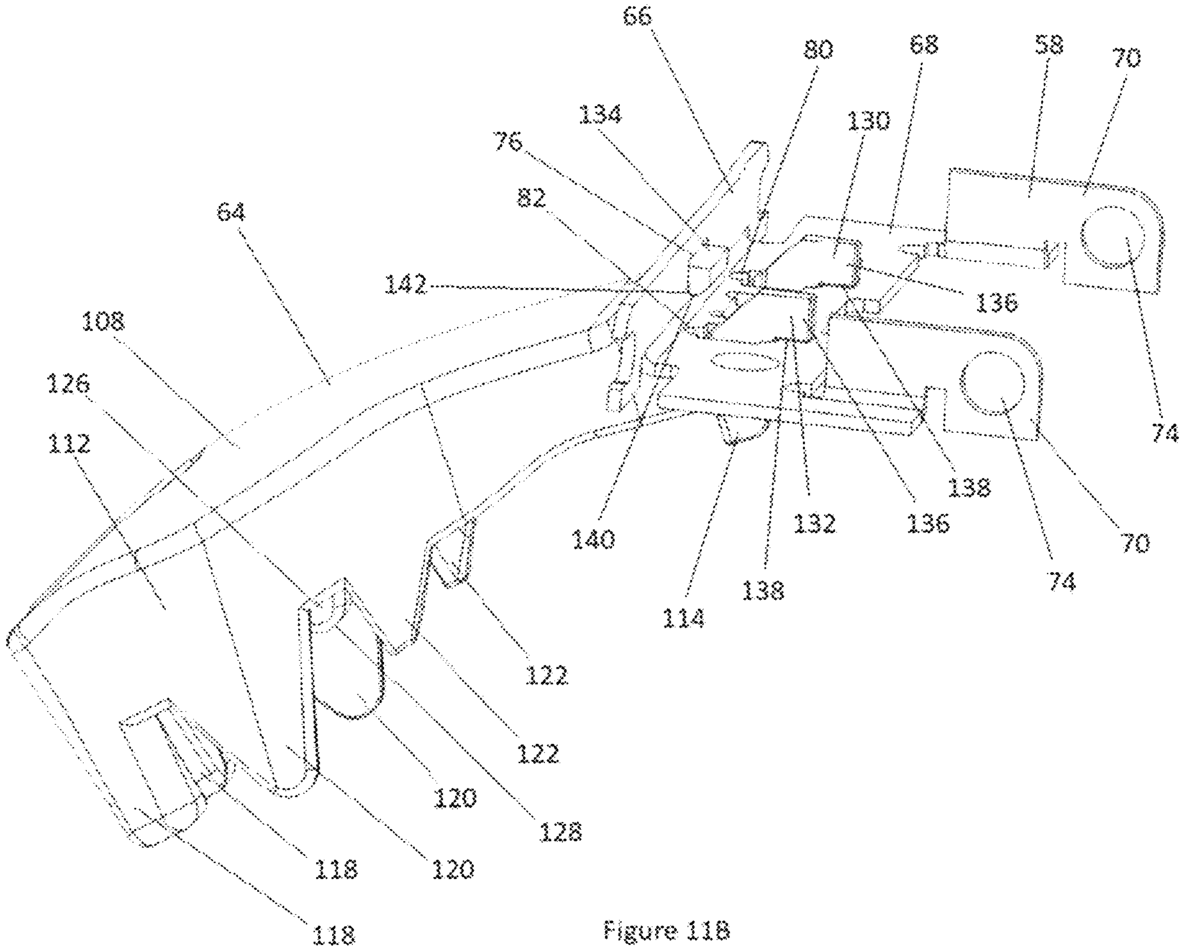
Figure 15:
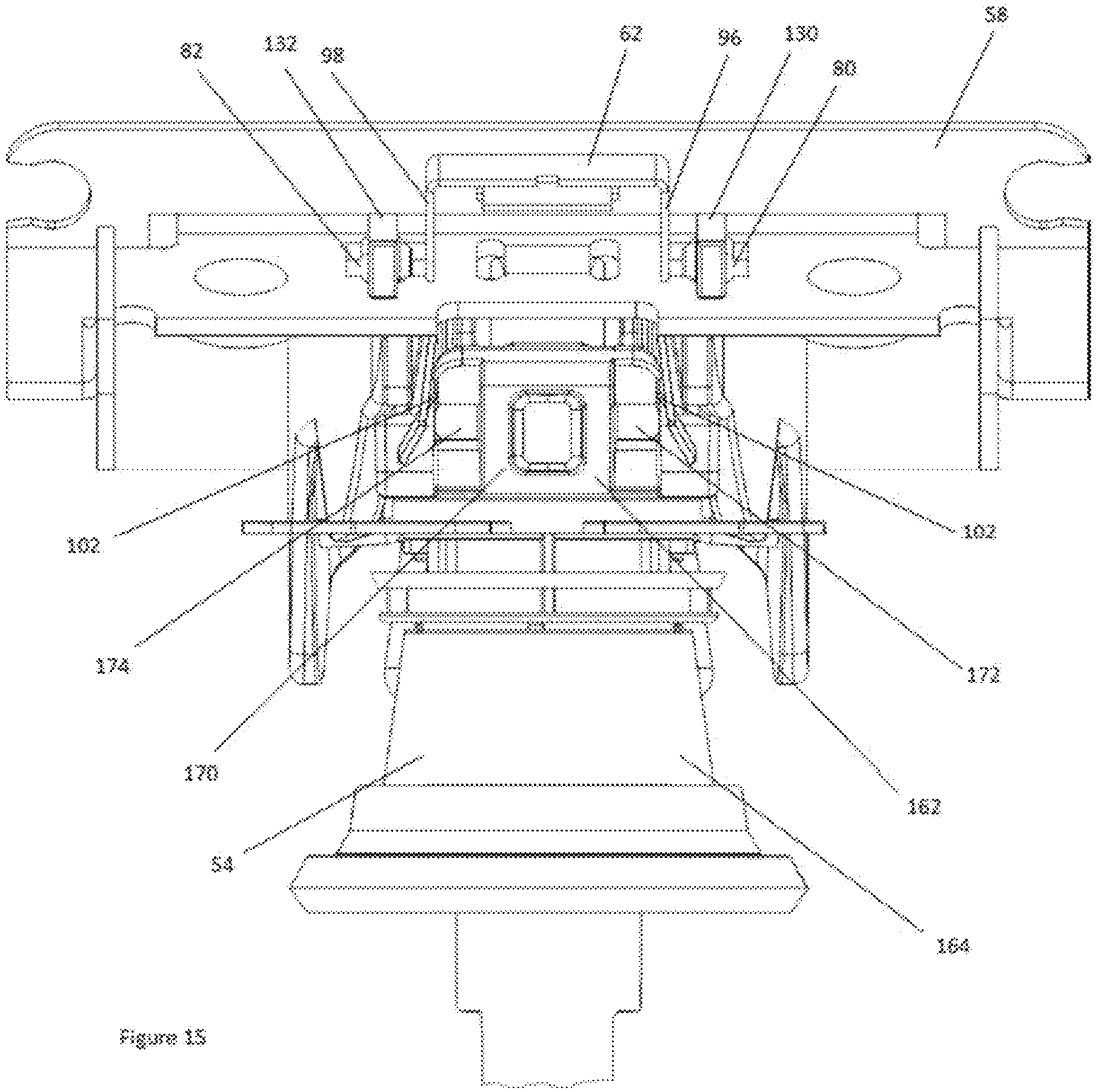
FIG. 15 is a partial rear view of the actuator plate, the catch member, the engagement member, and the fluid pump shown in FIG. 14, showing the catch member at an intermediate position relative to the fluid pump.
Figure 16:
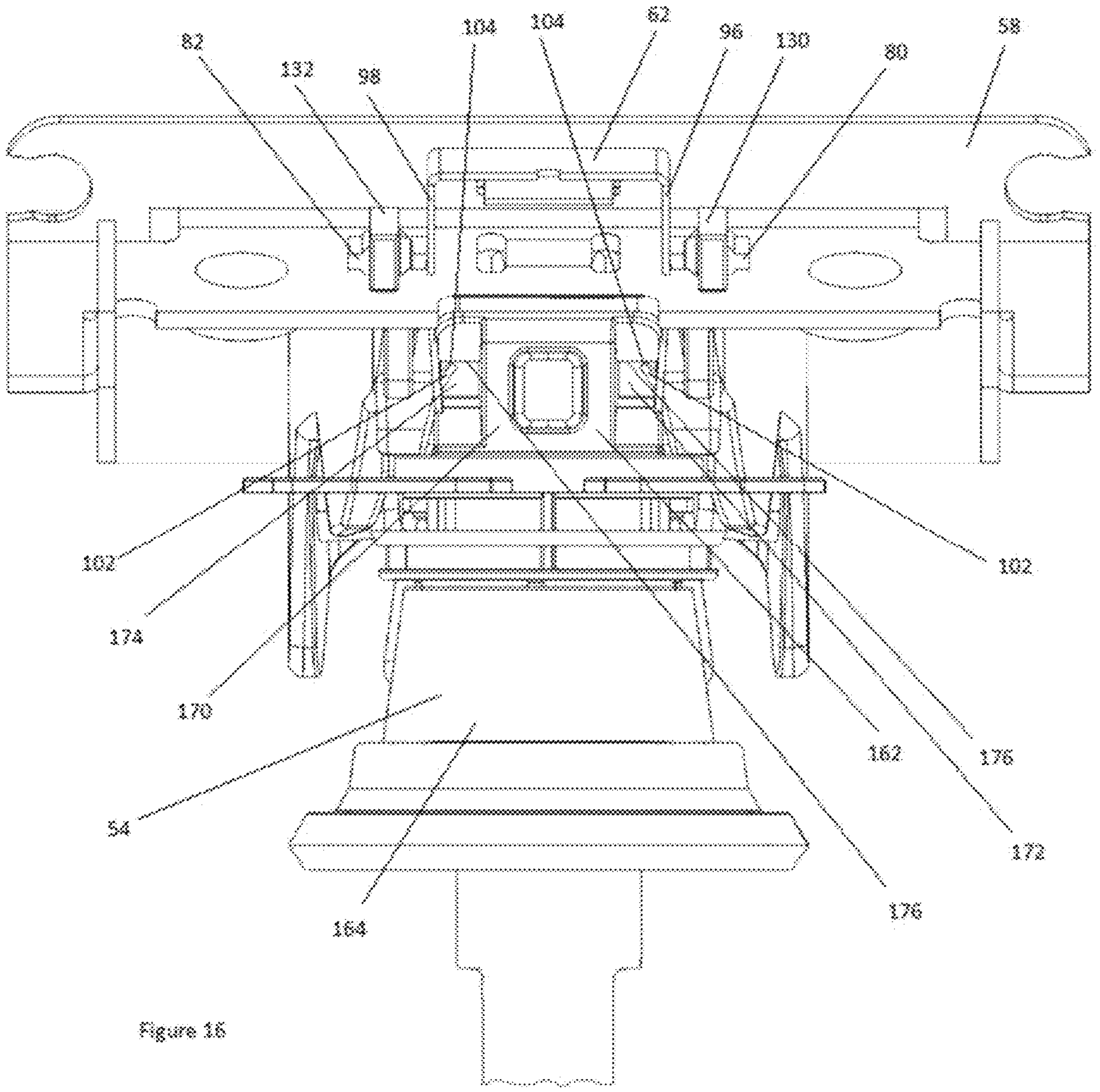
FIG. 16 is a partial rear view of the actuator plate, the catch member, the engagement member, and the fluid pump shown in FIG. 14, showing the catch member at a lowered position and engaged with the fluid pump.

As best shown in FIG. 11A, the catch member 62 has a top portion 94 that extends in the left-to-right direction, and two catch arms 96, 98 that extend downwardly from the top portion 94 from the left and right ends of the top portion 94, respectively. The catch arms 96, 98 each have an attachment portion 100 where the front-to-back width of the catch arms 96, 98 is reduced by cutouts in the front and back edges of the catch arms 96, 98. Each catch arm 96, 98 has a catch finger 102 that projects laterally inwardly and presents an upwardly directed catch surface 104. Each catch arm 96, 98 also has a terminal end portion 106 that is angled laterally outwardly. The catch arms 96, 98 are resiliently deflectable from the unbiased position shown in FIG. 11A to a deflected position as shown in FIG. 15.

As can be seen in FIGS. 5 and 13 to 16, the left and right catch arms 96, 98 extend downwardly through the left and right side attachment openings 80, 82 in the actuation plate 58, respectively. The slot-like central portion 90 of the left and right side attachment openings 80, 82 is wide enough in the front-to-back direction to permit insertion of the left and right catch arms 96, 98 downwardly through the openings 80, 82 during assembly. Once the catch arms 96, 98 are inserted down to the point where the attachment portion 100 is aligned with the openings 80, 82, the reduced front-to-back width of the attachment portion 100 allows the catch arms 96, 98 to move laterally inwardly into engagement with the laterally inner edges of the openings 80, 82. When positioned against the laterally inner edges of the openings 80, 82, the cutouts in the catch arms 96, 98 engage with the main body portion 68 of the actuation plate 58 to prevent movement of the catch arms 96, 98 upwardly or downwardly relative to the actuation plate 58.

Figure 7:
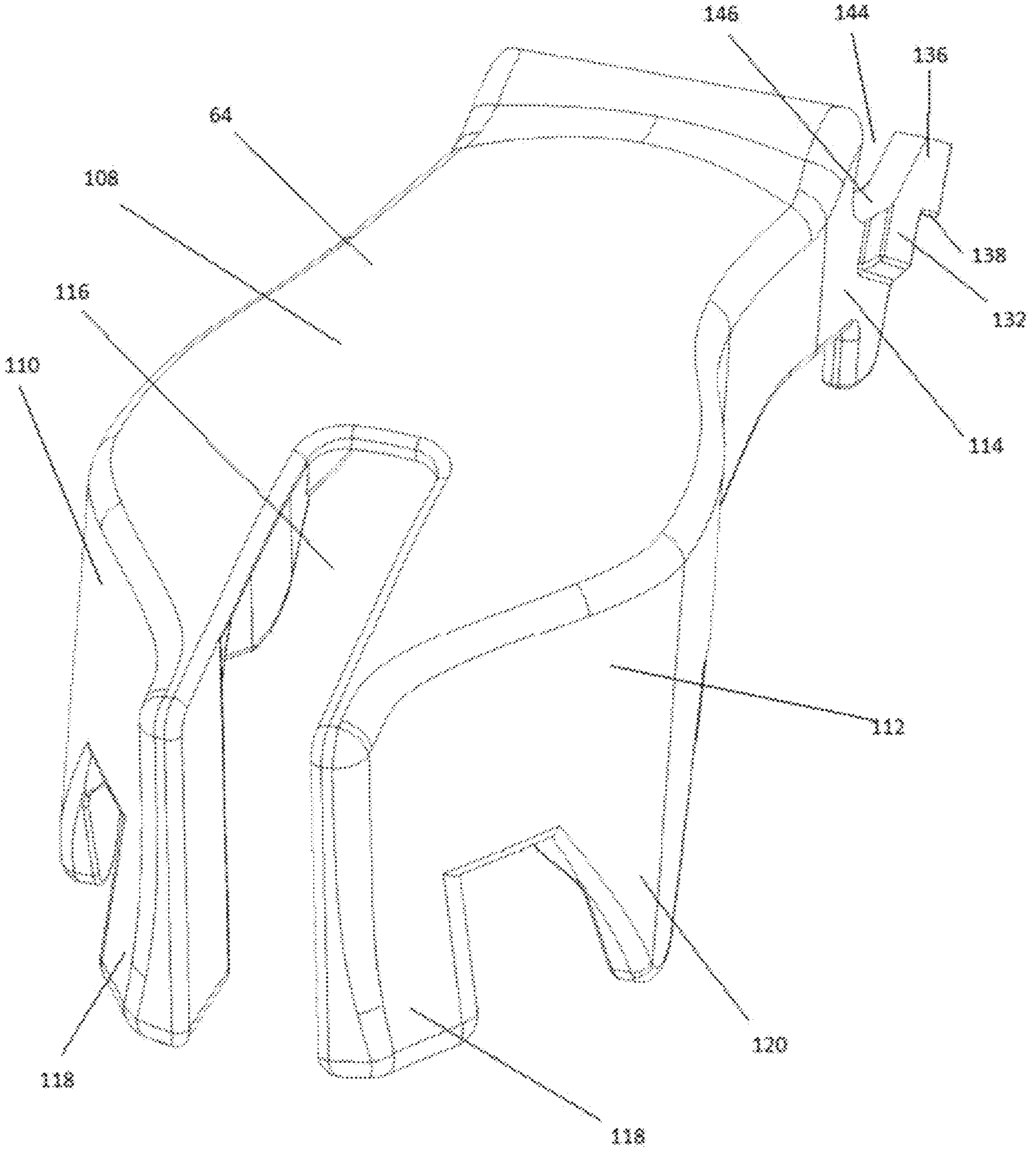
FIG. 7 is a front perspective view of the engagement member shown in FIG. 6.
Figure 8:
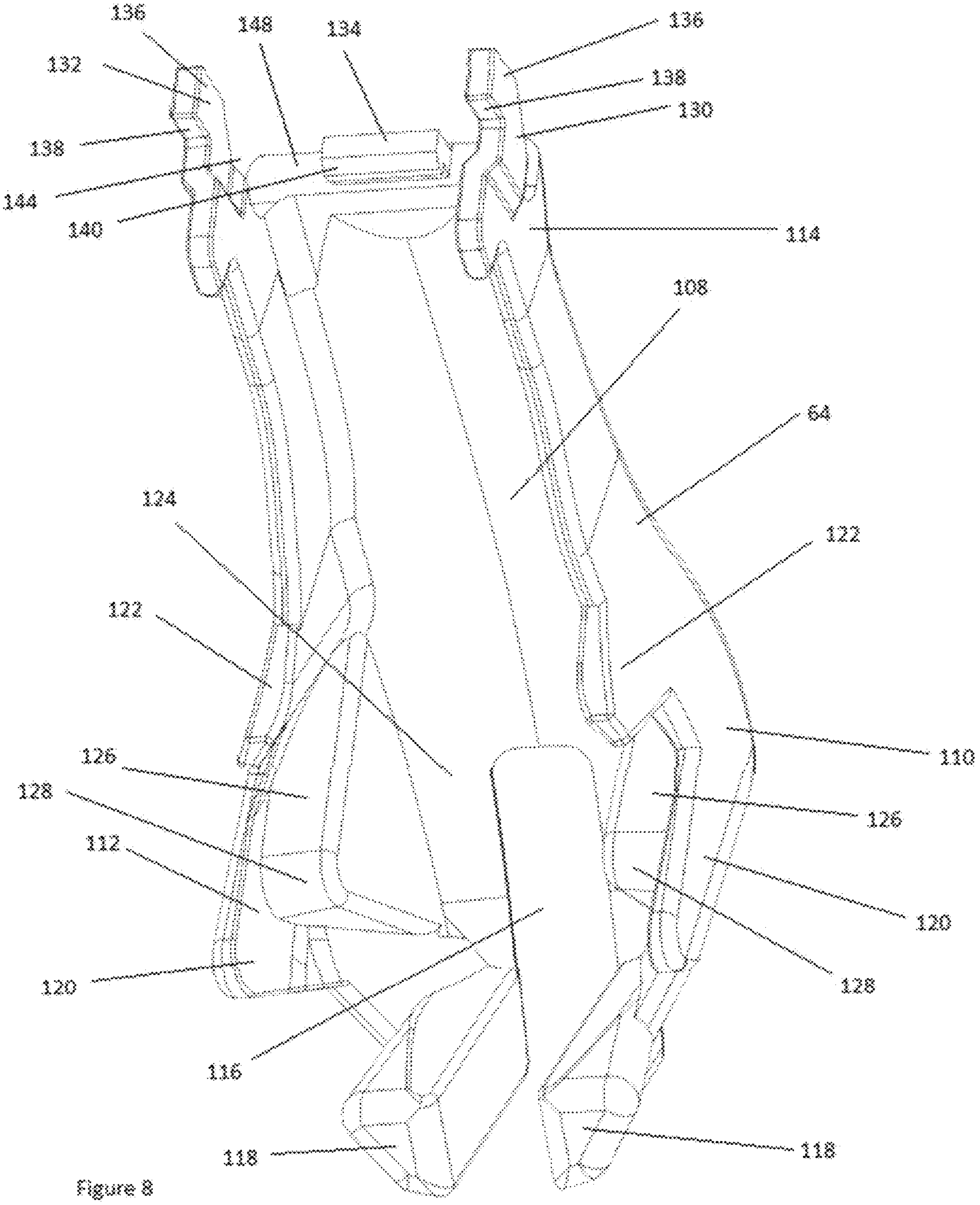
FIG. 8 is a bottom perspective view of the engagement member shown in FIG. 7.

The engagement member 64 is shown in FIGS. 7 and 8. The engagement member 64 has an upper wall 108, a left wall 110 that extends downwardly from a left side of the upper wall 108, a right wall 112 that extends downwardly from a right side of the upper wall 108, and a rear attachment portion 114. The upper wall 108, the left wall 110, and the right wall 112 define a forwardly and upwardly open slot-like spout tube opening 116. The left wall 110 and the right wall 112 each have a front tooth member 118, an intermediate tooth member 120, and a rear tooth member 122 that project downwardly, and which are spaced so as to define a generally circular pump engagement cavity 124 therebetween. The left wall 110 and the right wall 112 also each have an inner tooth member 126 that is positioned laterally inwardly from the intermediate tooth member 120, and which extends a shorter distance downwardly as compared to the intermediate tooth member 120. Each inner tooth member 126 presents a downwardly directed engagement surface 128.

The rear attachment portion 114 has a left side attachment arm 130 that extends rearwardly from the left wall 110, a right side attachment arm 132 that extends rearwardly from right wall 112, and an upper attachment body 134 that extends rearwardly from the upper wall 108. The left side attachment arm 130 and the right side attachment arm 132 each have an inverted L-like shape, with an upper projection 136 that extends rearwardly and presents a downwardly directed locking surface 138. The upper attachment body 134 has a generally rectangular shape, with a downwardly extended hook member 140 that presents a forwardly directed hook surface 142. The hook surface 142 is spaced rearwardly from the upper wall 108.

As can be seen in FIG. 7, the rear portion of the upper wall 108 curves upwardly adjacent to the left and right side attachment arms 130, 132, so that a plate engagement cavity 144 is defined between the upper wall 108 and the left and right side attachment arms 130, 132. As can be seen in FIG. 7, the right side attachment arm 132 presents an upwardly directed plate engagement surface 146 in the plate engagement cavity 144. The left side attachment arm 130 also presents an upwardly directed plate engagement surface 146 in the plate engagement cavity 144, but is not visible in FIG. 7. As can be seen in FIG. 8, the upper wall 108 presents a rearwardly directed plate contact surface 148 in the plate engagement cavity 144.

As can be seen in FIG. 11B, the engagement member 64 attaches to the actuation plate 58. When the engagement member 64 is attached to the actuation plate 58, the front end of the actuation plate 58 is positioned in the plate engagement cavity 144, with the front surface of the front face portion 66 engaged with the plate contact surface 148 of the upper wall 108, and with the front part of the bottom surface of the main body portion 68 engaged with the plate engagement surface 146 of the left and right side attachment arms 130, 132. The upper projection 136 of the left side attachment arm 130 extends through the left side attachment opening 80, and the upper projection 136 of the right side attachment arm 132 extends through the right side attachment opening 82, with the locking surfaces 138 of the upper projections 136 directed downwardly in engagement with the upper surface of the main body portion 68 of the actuation plate 58. The upper attachment body 134 extends through the rectangular central opening 76 in the front face portion 66 of the actuation plate 58, with the hook member 140 extending downwardly so that the hook surface 142 engages with the rear surface of the front face portion 66.

With the engagement member 64 attached to the actuation plate 58, the engagement member 64 pivots with the actuation plate 58 when the actuator lever 20 is pivoted between the rest position shown in FIG. 1 and the depressed position shown in FIG. 2.

As can be seen in FIGS. 5 and 14 to 16, when the left and right side attachment arms 130, 132 extend through the left and right side attachment openings 80, 82, respectively, the left and right side attachment arms 130, 132 are positioned in the slot-like central portion 90 of the openings 80, 82, spaced laterally outwardly from the catch arms 96, 98. As can be seen in FIG. 15, the left and right side attachment arms 130, 132 are sufficiently spaced from the catch arms 96, 98 to permit the catch arms 96, 98 to deflect laterally outwardly to the deflected position.

Figure 3:
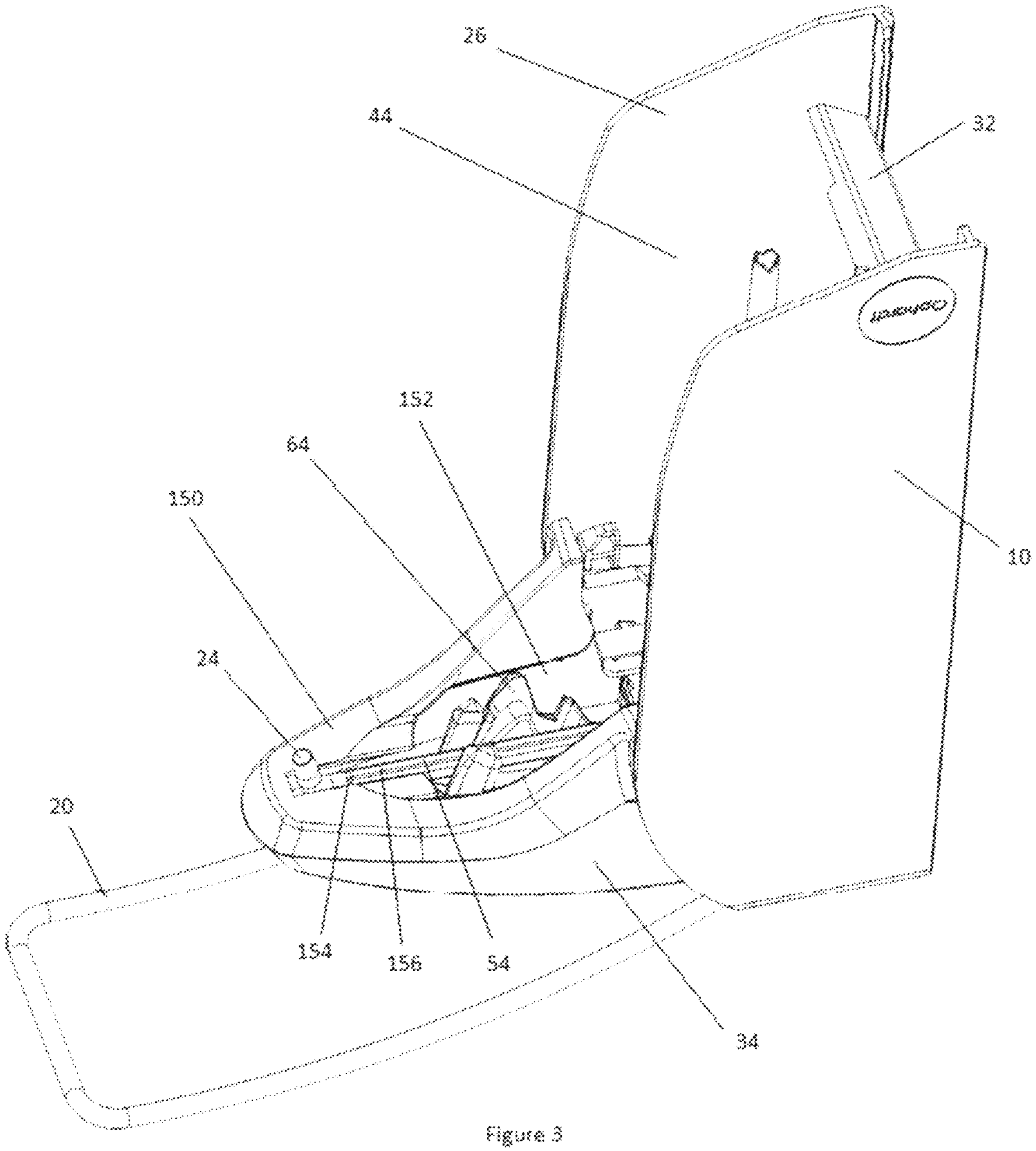
FIG. 3 is an inverted perspective view of the fluid dispenser housing and mountable fluid dispenser shown in FIG. 1, with a fluid reservoir of the mountable fluid dispenser omitted.

The face shield 34 is shown in FIGS. 1 to 3, and has a similar structure to that shown and described in U.S. Pat. No. 7,748,573 to Anhuf et al. As can be seen in FIG. 1, the face shield 34 substantially covers the fluid pump 54 of the mountable fluid dispenser 12, protecting the fluid pump 54 from contamination and damage. As is known in the art, the face shield 34 is removable from the shroud 26, and is movable relative to the shroud 26 and the pump mounting body 28 between a closed position as shown in FIG. 1 and an open position, not shown, in which the face shield 34 is raised to permit mounting of the mountable fluid dispenser 12 within the inner cavity 44 of the shroud 26.

As can be seen in FIG. 3, the underside of the face shield 34 has a partially enclosed front portion 150 and an open rear portion 152. The partially enclosed front portion 150 has a central slot opening 154 for receiving an elongated spout tube 156 of the fluid pump 54 of the mountable fluid dispenser 12. The open rear portion 152 has a larger opening for receiving the engagement member 64, and for allowing the engagement member 64 to pivot downwardly relative to the face shield 34 when the actuator lever 20 is depressed from the rest position to the depressed position.

The mountable fluid dispenser 12 has a fluid reservoir 158 and the fluid pump 54. Referring to FIG. 1, the fluid reservoir 22 is a plastic bottle that sits within the inner cavity 44 of the shroud 26, with a bottom surface 160 of the bottle resting on the foot portion 56 of the support member 32. The fluid reservoir 158 contains a supply of the hand cleaning fluid 22 that is dispensed from the mountable fluid dispenser 12. The hand cleaning fluid 22 may, for example, be hand sanitizer or hand soap. The reservoir 158 may have any suitable structure, such as that shown and described in U.S. Pat. No. 7,748,573 to Anhuf et al., and is removable from the housing 10 so that it can be refilled or replaced when the supply of fluid 22 within the reservoir 158 is running low, as is described and shown in more detail in U.S. Pat. No. 7,748,573 to Anhuf et al.

Figure 17:
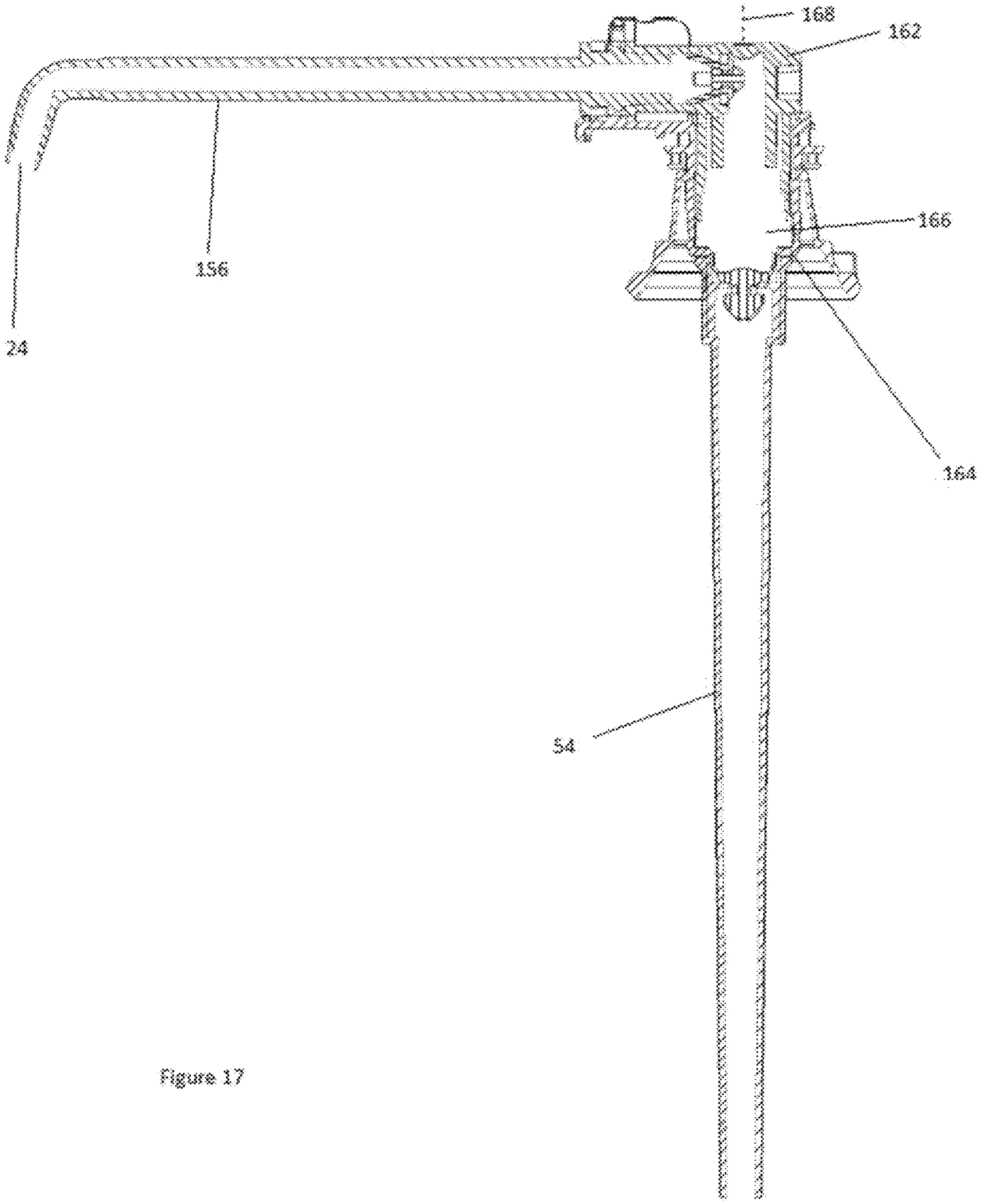
FIG. 17 is a cross-sectional view of the fluid pump shown in FIG. 6, showing a piston forming element of the fluid pump at a retracted position.
Figure 18:
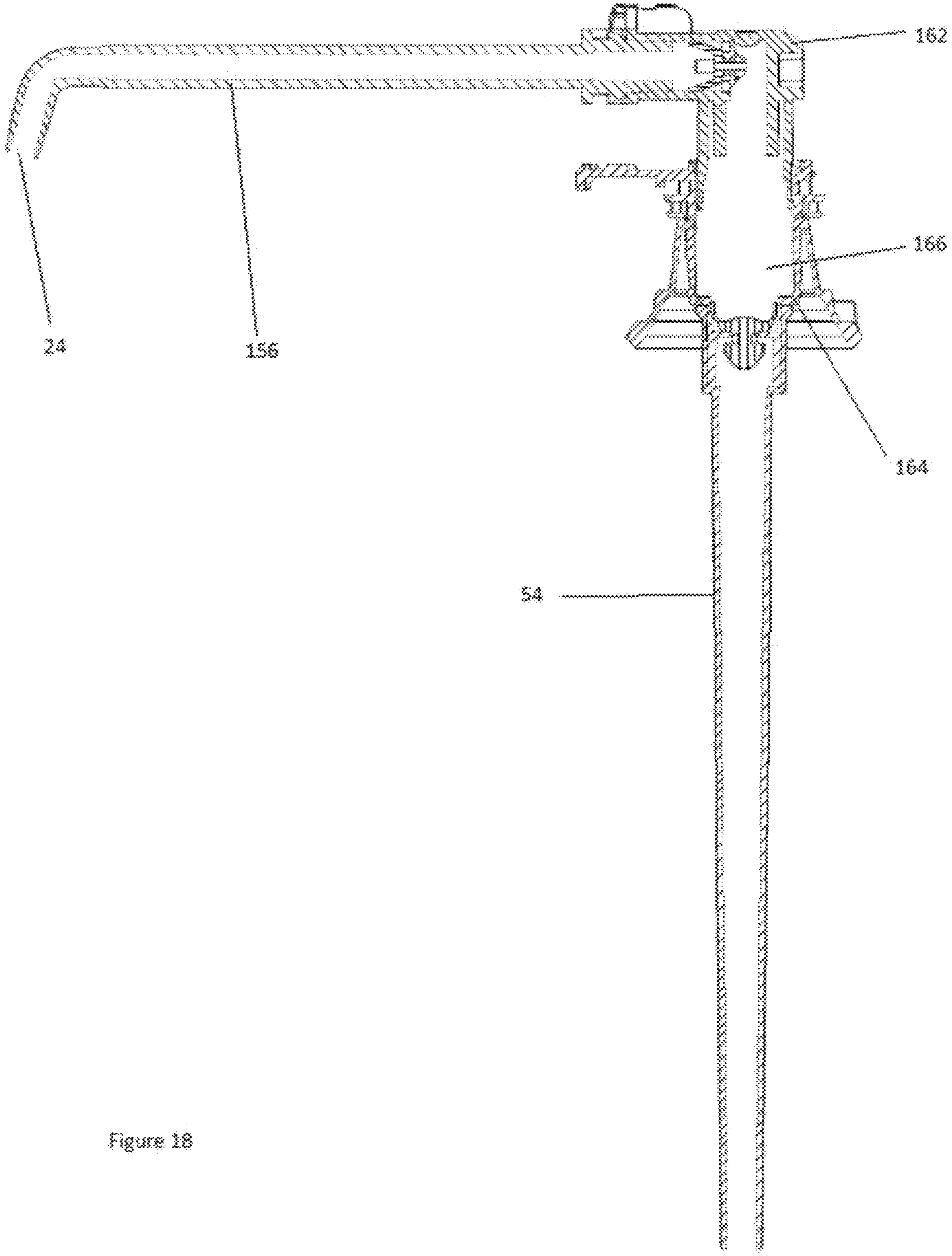
FIG. 18 is a cross-sectional view of the fluid pump the same as shown in FIG. 17, but showing the piston forming element at an extended position.

The fluid pump 54 is coupled to the fluid reservoir 158 for dispensing the fluid 22 contained in the fluid reservoir 158 out through the fluid outlet 24. As can be seen in FIGS. 17 and 18, the fluid pump 54 has a piston forming element 162 and a piston chamber forming body 164. The piston chamber forming body 164 defines a piston chamber 166 that slideably receives the piston forming element 162. The piston forming element 162 is slideable along a pump axis 168 relative to the piston chamber forming body 164 between an extended position, shown in FIG. 18, and a retracted position, shown in FIG. 17. As is known in the art, movement of the piston forming element 162 between the extended position and the retracted position draws fluid 22 out of the fluid reservoir 158 and discharges the fluid 22 out through the fluid outlet 24.

As can be seen in FIG. 13, the mounting fingers 52 extend laterally from the piston chamber forming body 164, and are received by the horizontal slots 50 in the pump mounting body 28. The engagement of the mounting fingers 52 with the horizontal slots 50 prevents the piston chamber forming body 164 from moving axially relative to the pump mounting body 28 when the mountable fluid dispenser 12 is received by the housing 10. The horizontal slots 50 are also referred to herein as the support element 50.

Figure 12:
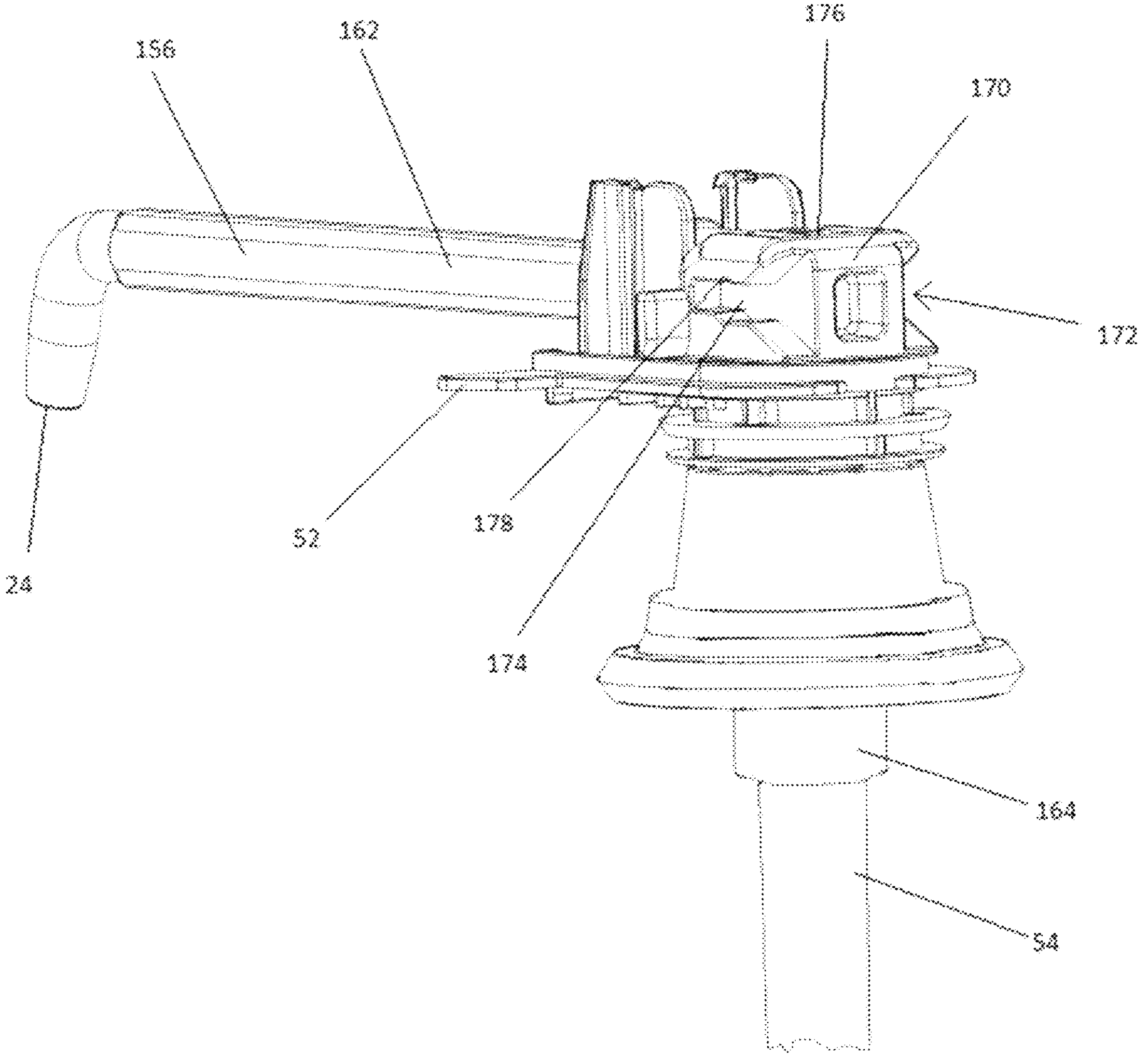
FIG. 12 is a partial rear perspective view of the fluid pump shown in FIG. 5.

As can be seen in FIG. 12, the piston forming element 162 has a catching member 170 for engaging with the catch member 62 of the actuation mechanism 30. The catching member 170 has a laterally open left side catching cavity 172, a laterally open right side catching cavity 174, and an upwardly directed upper driving surface 176. Each of the left and right side catching cavities 170, 174 have a downwardly directed catching surface 178.

Figure 14:
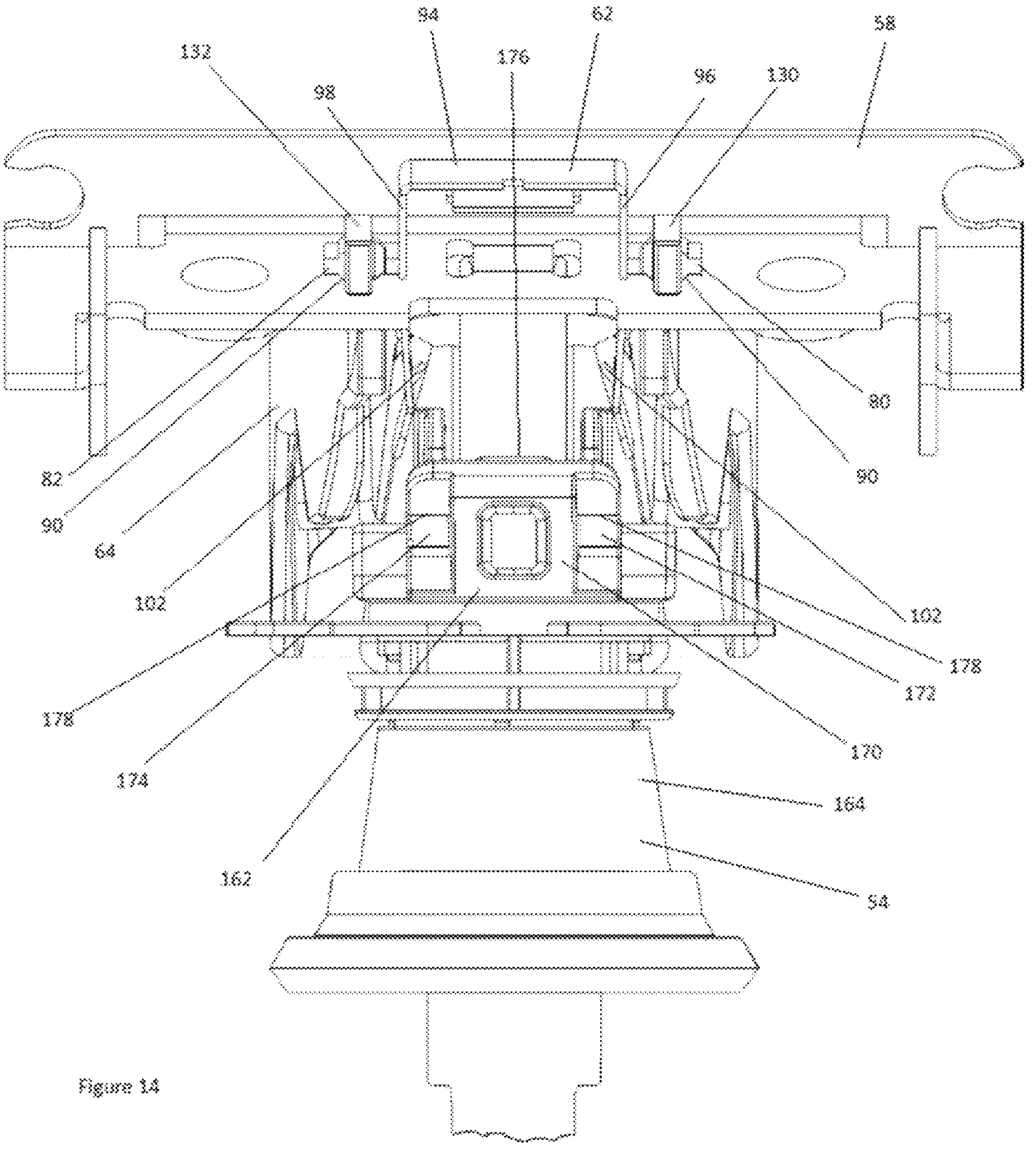
FIG. 14 is a partial rear view of the actuator plate, the catch member, the engagement member, and the fluid pump shown in FIG. 5, showing the catch member at the elevated position and disengaged from the fluid pump.

When the mountable fluid dispenser 12 is initially placed in the housing 10, the mounting fingers 52 are inserted rearwardly into the horizontal slots 48 in the pump mounting body 28, as shown in FIG. 13. Initially, the catching member 170 of the fluid pump 54 is spaced below the catch member 62 of the actuation mechanism 30, as can be seen in FIGS. 13 and 14. To engage the catch member 62 with the catching member 170, the actuator lever is depressed from the raised position to the depressed position. The movement of the actuator lever 20 from the raised position to the depressed position moves the catch member 62 relative to the catching member 170 from the elevated position shown in FIG. 14, through the intermediate position shown in FIG. 15, down to the lowered position shown in FIG. 16.

As the catch member 62 moves downwardly from the elevated position of FIG. 14 to the intermediate position shown in FIG. 15, the catch arms 96, 98 engage with the lateral outer surface of the catching member 170, which causes the catch arms 96, 98 to deflect laterally outwardly from the unbiased position shown in FIG. 14 to the deflected position shown in FIG. 15. When the catch member 62 reaches the lowered position of FIG. 16, the catch fingers 102 align with the left and right side catching cavities 172, 174, which allows the catch arms 96, 98 to move laterally inwardly from the deflected position to an engaged position, in which the catch fingers 102 extend into the catching cavities 172, 174 and the catch surfaces 104 are positioned adjacent to the catching surfaces 178. When the catch member 62 is at the lowered position, the semi-cylindrical body 86 on the actuation plate 58 also engages with the upper driving surface 176 on the catching member 170.

When the mountable fluid dispenser 12 is received in the housing 10 and the catch member 62 is engaged with the catching member 170, the fluid pump 54 can be activated by depressing the actuator lever 20 from the rest position shown in FIG. 1 to the depressed position shown in FIG. 2, as is known in the art. When the actuator lever 20 is pivoted downwardly from the rest position, the actuation plate 58 and the catch member 64 also pivot downwardly, which causes the semi-cylindrical body 86 to push downwardly on the upper driving surface 176 of the piston forming element 162 to thereby slide the piston forming element 162 axially inwardly relative to the piston chamber forming body 164 from the extended position shown in FIG. 18 towards the retracted position shown in FIG. 17. Upon release of the actuator lever 20, the springs 60 push the actuation plate 58 upwardly away from the pump mounting body 28, which causes the catch member 62 to move upwardly relative to the pump mounting body 28 from the lowered position towards the elevated position. As the catch member 62 moves upwardly, the catch surfaces 104 on the catch fingers 102 engage with the catching surfaces 178 in the catching cavities 172, 174, which pulls the piston forming element 162 axially outwardly relative to the piston chamber forming body 164 from the retracted position shown in FIG. 17 back to the extended position shown in FIG. 18.

As is known in the art, when the supply of fluid 22 within the fluid reservoir 158 is running low, the mountable fluid dispenser 12 can be removed from the housing 10 by opening the face shield 34 and sliding the mountable fluid dispenser 12 forwardly out of the housing 10.

Figure 19:
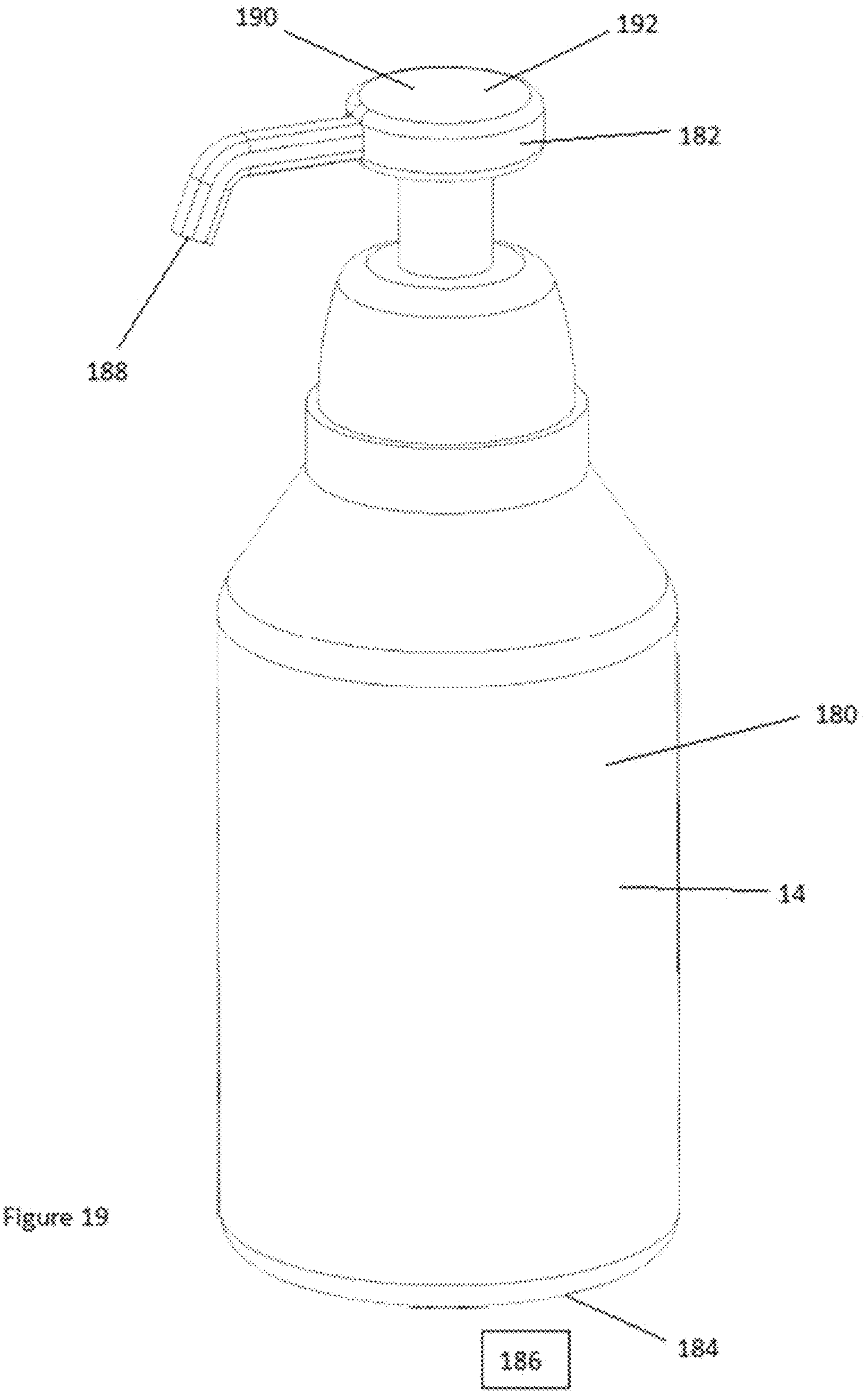
FIG. 19 is a perspective view of a table top fluid dispenser suitable for use with the fluid dispenser housing shown in FIG. 1, showing an activation member of the table top fluid dispenser at a raised position.
Figure 20:
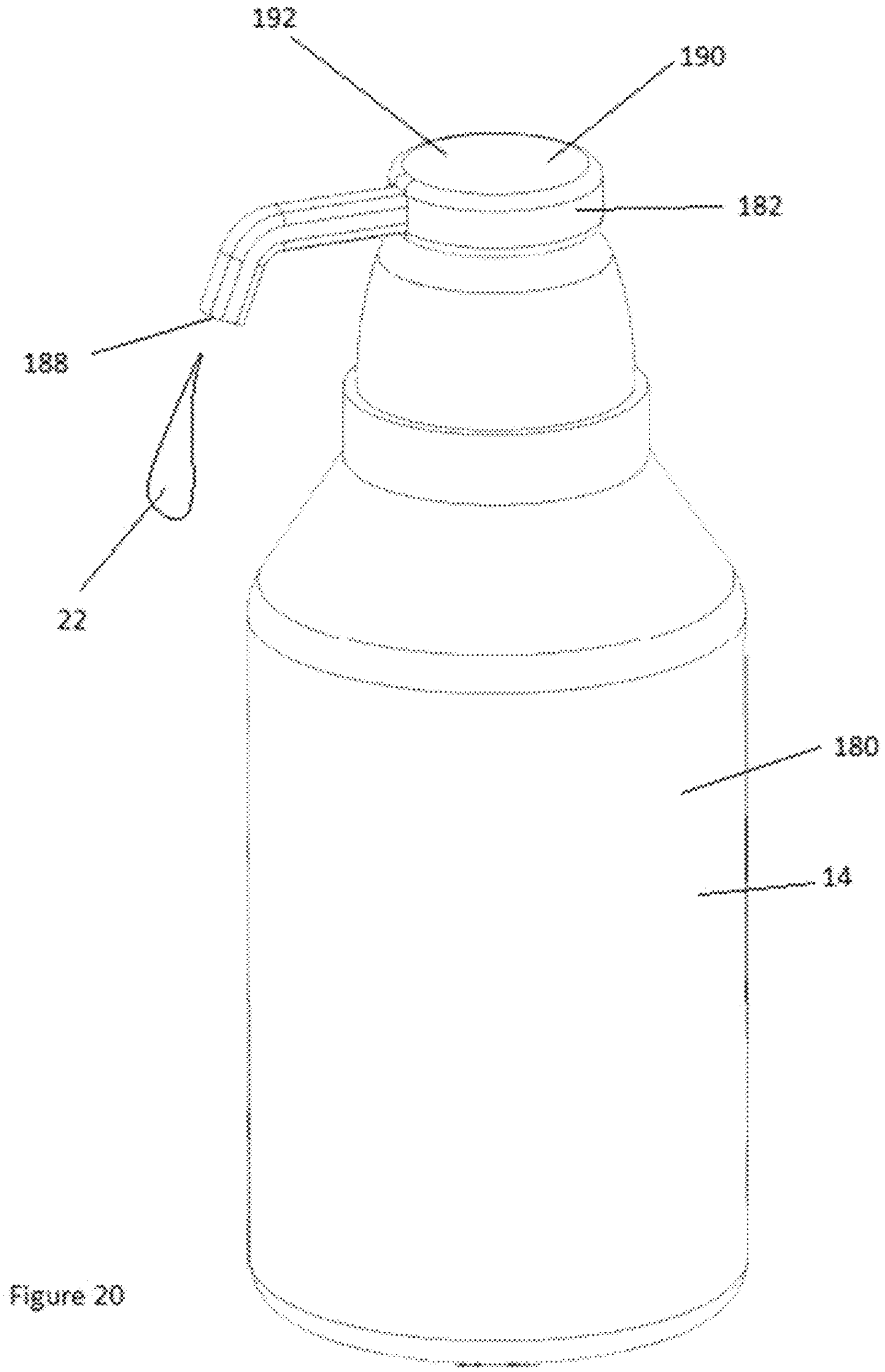
FIG. 20 is a perspective view of the table top fluid dispenser shown in FIG. 19, showing the activation member at a depressed position and fluid being dispensed from a dispenser outlet.

The engagement member 64 advantageously allows the housing 10 to receive a table top fluid dispenser 14, in addition to the mountable fluid dispenser 12. The table top fluid dispenser 14 is shown in FIGS. 19 and 20, and includes a bottle 180 and a pump mechanism 182. The bottle 180 has a bottom surface 184 that can be placed on a horizontal support surface 186, such as a table or a desk, so that the table top fluid dispenser 14 rests on the horizontal support surface 186 in an upright orientation as shown in FIGS. 19 and 20. The bottle 180 contains a supply of hand cleaning fluid 22, which may be the same or different than the hand cleaning fluid 22 contained in the fluid reservoir 158 of the mountable fluid dispenser 12.

The pump mechanism 182 extends through a top opening in the bottle 180 for dispensing the fluid 22 in the bottle 180 out through a dispenser outlet 188. The pump mechanism 182 includes an activation member 190 that is manually depressible from the raised position shown in FIG. 19 to the depressed position shown in FIG. 20. In the embodiment shown, the activation member 190 has a generally cylindrical shaped head 192 with the tube-like dispenser outlet 188 extending forwardly from the head 192. Upon movement of the activation member 190 from the raised position to the depressed position, the pump mechanism 182 dispenses an allotment of the fluid 22 out through the dispenser outlet 188.

The pump mechanism 182 could have any suitable structure for dispensing fluid 22 from the bottle 180, including for example any piston pump mechanism that is known in the art. Preferably, the pump mechanism 182 includes a biasing mechanism such as a spring, not shown, that biases the activation member 190 towards the raised position, so that the activation member 190 does not need to be manually pulled upwardly from the depressed position to the raised position after each activation.

The table top fluid dispenser 14 can be operated to dispense fluid 22 in a stand-alone mode, by manually depressing the activation member 190 while the dispenser 14 is resting on the horizontal support surface 186.

Figure 21:
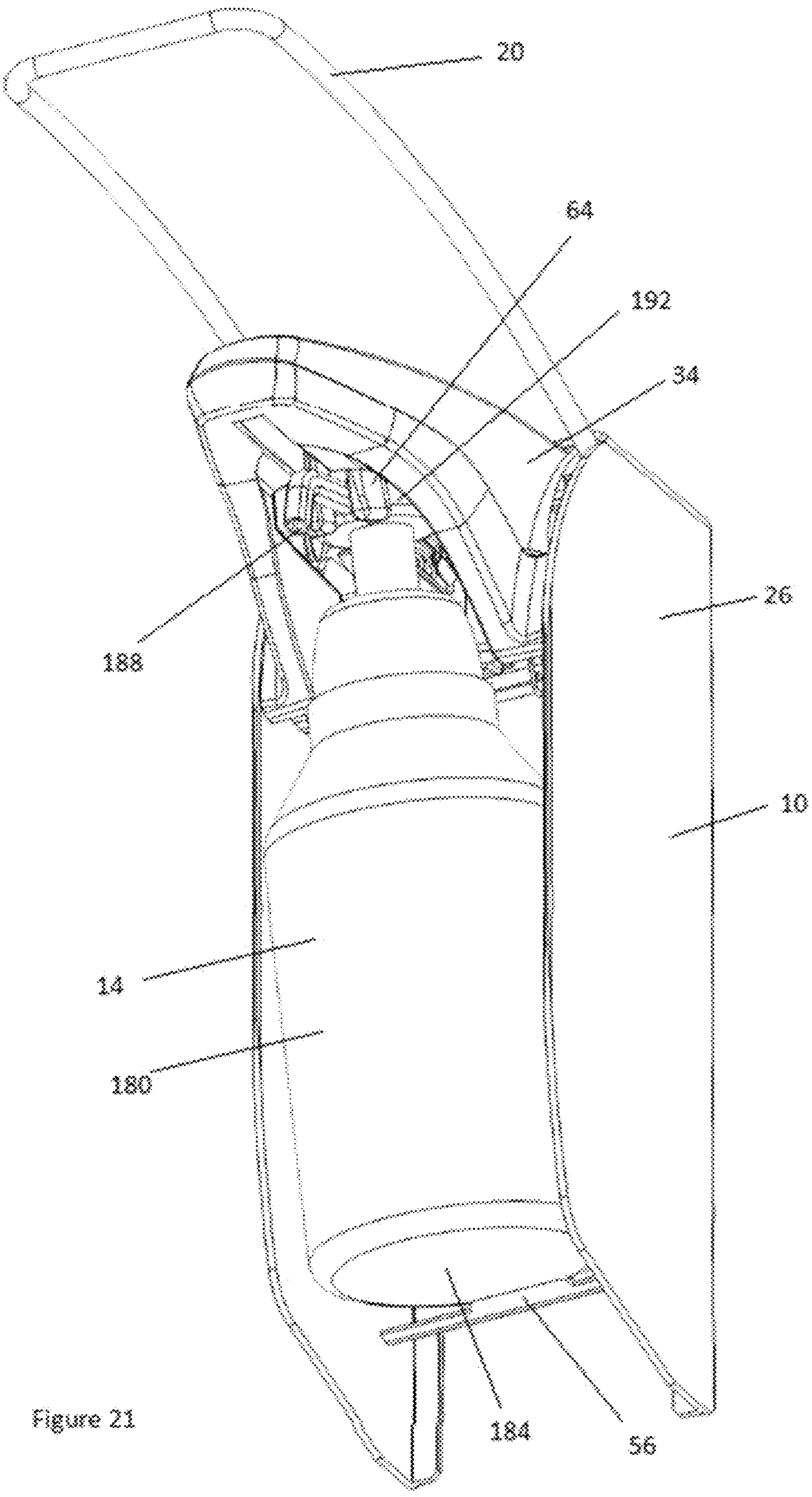
FIG. 21 is a bottom perspective view of the table top fluid dispenser shown in FIG. 19 received by the fluid dispenser housing shown in FIG. 1.
Figure 22:
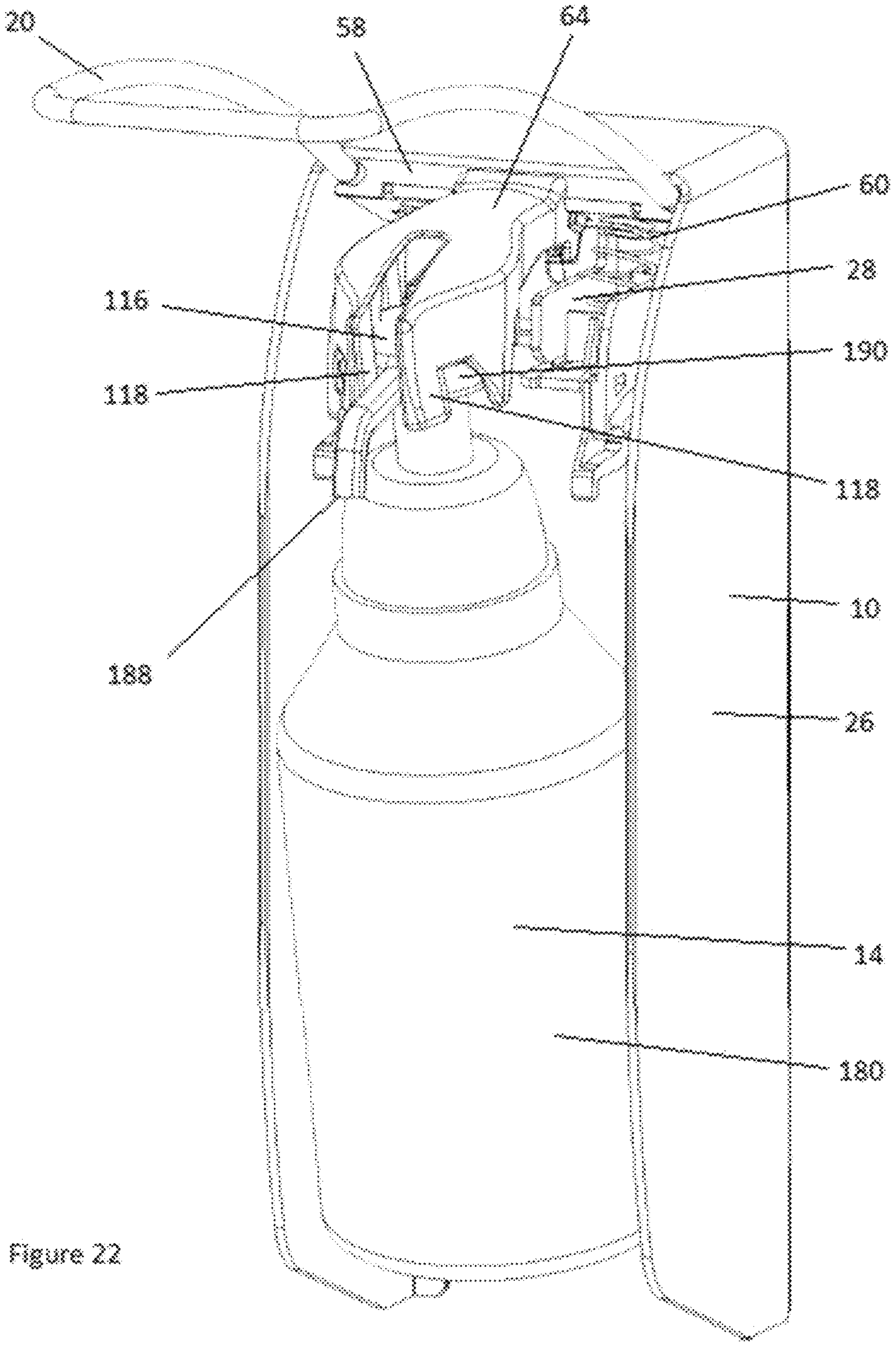
FIG. 22 is a front perspective view of the table top fluid dispenser and the fluid dispenser housing shown in FIG. 21, with the face shield omitted.
Figure 23:
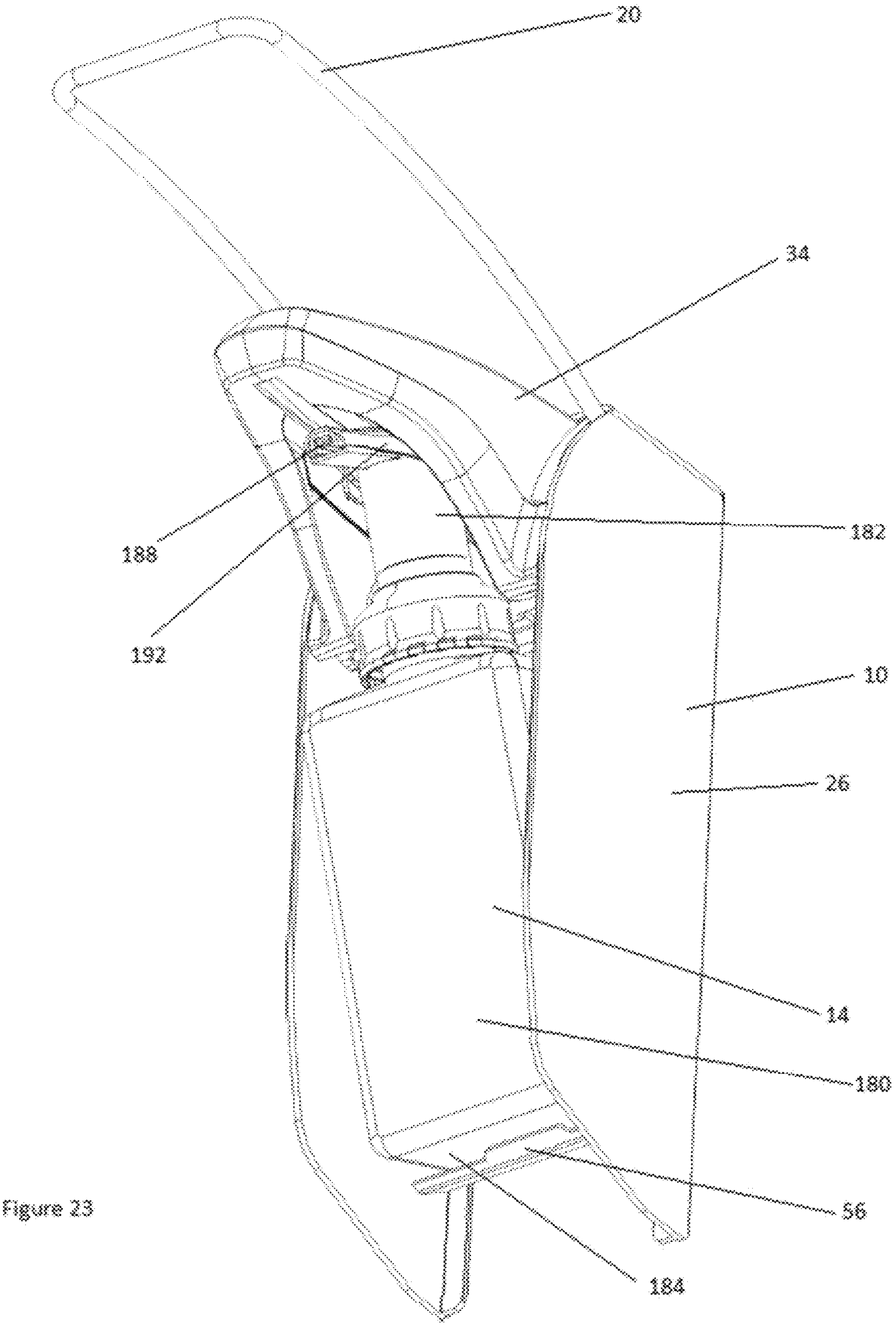
FIG. 23 is a bottom perspective view of a fluid dispenser housing containing a table top fluid dispenser in accordance with a second embodiment of the present invention.

With the engagement member 64 attached to the actuation plate 58 of the housing the housing 10 is able to receive the table top fluid dispenser 14 for dispensing fluid 22 from the table top fluid dispenser 14 in a housed mode, as shown in FIGS. 21 and 22. To place the table top fluid dispenser 14 in the housing 10, the table top fluid dispenser 14 is held below the engagement member 64, and then raised until the generally cylindrical head 192 is positioned within the generally circular pump engagement cavity 124 of the engagement member 64, with the top surface of the head 192 positioned adjacent to the engagement surfaces 128 of the inner tooth members 126, and with the dispenser outlet 188 extending forwardly between the front tooth members 118. The bottom surface 184 of the bottle 180 is then placed on the foot portion 56 of the support member 32 to hold the table top fluid dispenser 14 in place in the inner cavity 44 of the shroud 26. The front tooth members 118 engage with the front surface of the head 192 so as to prevent the table top fluid dispenser 14 from tipping forward and falling out of the housing 10. The front tooth members 118 maintain the dispenser outlet 188 facing forwardly for dispensing the fluid 22 onto a user's hand.

To activate the table top fluid dispenser 14 in the housed mode, the actuator lever is pivoted from the rest position shown in FIG. 1 to the depressed position shown in FIG. 2. The pivoting of the actuator lever 20 downwardly causes the actuation plate 58 to also pivot downwardly, which in turn causes the attached engagement member 64 to pivot downwardly relative to the support member 32. When the actuator lever 20 is moved from the rest position to the depressed position, the engagement member 64 moves from the first position shown in FIG. 22 to a second position, not shown, in which the engagement member 64 is positioned closer to the support member 32 than when in the first position. The movement of the engagement member 64 from the first position to the second position causes the engagement surfaces 128 on the inner tooth members 126 to push downwardly on the top surface of the activation member 190, which causes the activation member 190 to move from the raised position to the depressed position. The movement of the activation member 190 from the raised position to the depressed position causes the pump mechanism 182 to dispense an allotment of the fluid 22 from the bottle 180.

When the actuator lever 20 is released, the springs 60 move the actuation plate 58 upwardly, causing the attached engagement member 64 to move from the lower second position back to the higher first position. As the force of the engagement surfaces 128 pushing downwardly on the top surface of the activation member 190 is released, the internal biasing mechanism in the table top fluid dispenser 14 causes the activation member 190 to return to the raised position. With the engagement member 64 at the first position and the activation member 190 at the raised position, the table top fluid dispenser 14 is ready to be activated again when needed by depressing the actuator lever 20. When the supply of fluid 22 is running low, the table top fluid dispenser 14 can be removed from the housing 10 by sliding the bottom of the bottle 180 forwardly away from the foot portion 56 of the support member 32, and lowering the table top fluid dispenser 14 away from the engagement member 64. The table top fluid dispenser 14 can also be pushed upwardly against the engagement member 64 so as to move the activation member 190 towards the depressed position, thereby reducing the height of the table top fluid dispenser 14 so that the fluid dispenser 14 can be more easily removed from the housing 10.

The engagement member 64 preferably provides flexibility in how the housing 10 is used, by allowing the housing 10 to receive and dispense fluid 22 from both the mountable fluid dispenser 12 and the table top fluid dispenser 14. Optionally, the engagement member 64 could be provided separately from the rest of the housing 10, and could be used to retrofit an existing housing 10 to allow the housing 10 to be able to receive and dispense fluid 22 from a table top fluid dispenser 14, in addition to the mountable fluid dispenser 12. Preferably, the rear attachment portion 114 of the engagement member 64 is configured to attach to the actuation plate 58 using pre-existing features of the actuation plate 58. For example, in the embodiment shown, the left and right side attachment arms 130, 132 are configured to be received by the left and right side attachment openings 80, 82 in the actuation plate 58, which openings 80, 82 are already present in the plate 58 for receiving the catch arms 96, 98. The upper attachment body 134 is likewise received by the pre-existing rectangular central opening 76 in the actuation plate 58.

Figure 6:
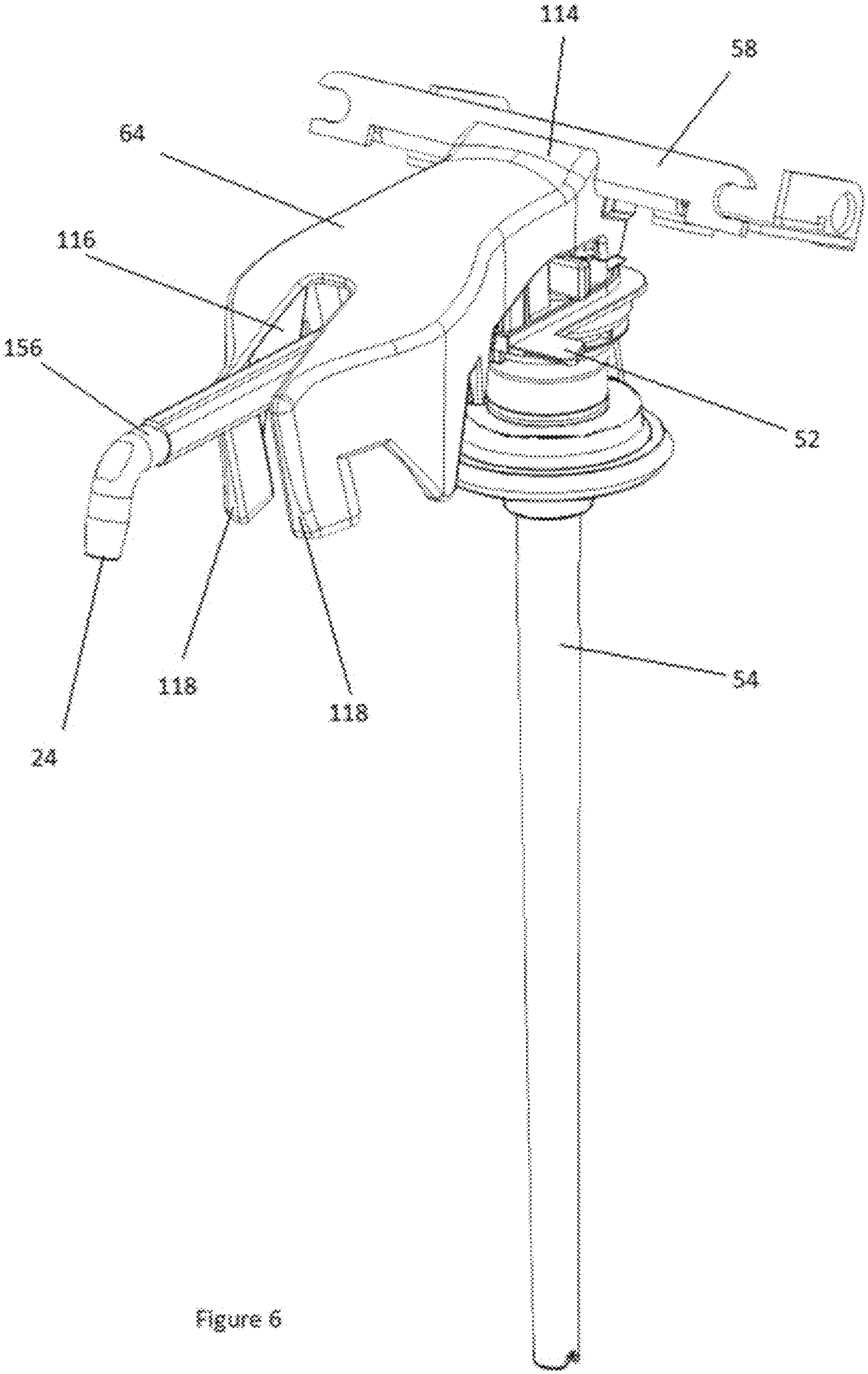
FIG. 6 is a front perspective view of the actuator plate, the catch member, the engagement member, and the fluid pump shown in FIG. 5.

Preferably, the engagement member 64 can be attached to the housing 10 without interfering with the ability of the housing 10 to receive and dispense fluid from the mountable fluid dispenser 12. For example, in the embodiment shown in FIGS. 1 to 22, the left and right side attachment arms 130, 132 are positioned laterally outwardly from the catch arms 96, 98, so as not to interfere with the ability of the catch arms 96, 98 to engage with the catching member 170 of the mountable fluid dispenser 12. Furthermore, as can be seen in FIG. 6, the spout tube opening 116 in the engagement member 64 allows the elongated spout tube 156 of the mountable fluid dispenser 12 to extend through the engagement member 64.

Reference is now made to FIGS. 23 to 32, which show a fluid dispensing system in accordance with a second embodiment of the present invention. Like numerals are used to denote like components. The housing 10 shown in FIGS. 23 to 32 is identical to the housing shown in FIGS. 1 to 22, with the only difference being that the engagement member 64 has a different structure to allow the housing 10 to receive a different type of table top fluid dispenser 14. The housing 10 shown in FIGS. 23 to 32 is able to receive a mountable fluid dispenser 12 identical to the one shown in FIGS. 1 to 22.

Figure 25:
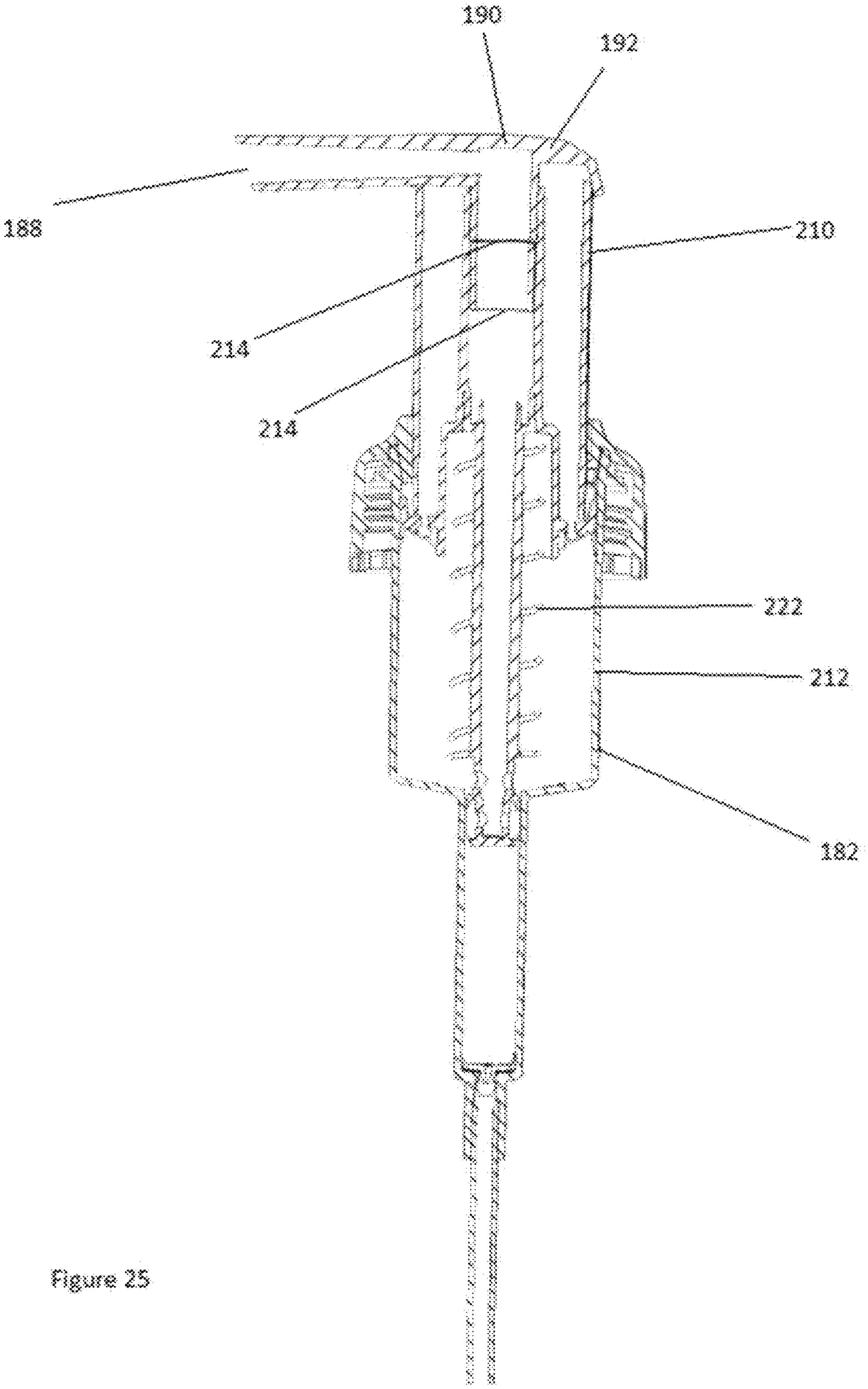
FIG. 25 is a cross-sectional view of the table top fluid dispenser shown in FIG. 24, showing an activation member of the table top fluid dispenser at a raised position.
Figure 26:
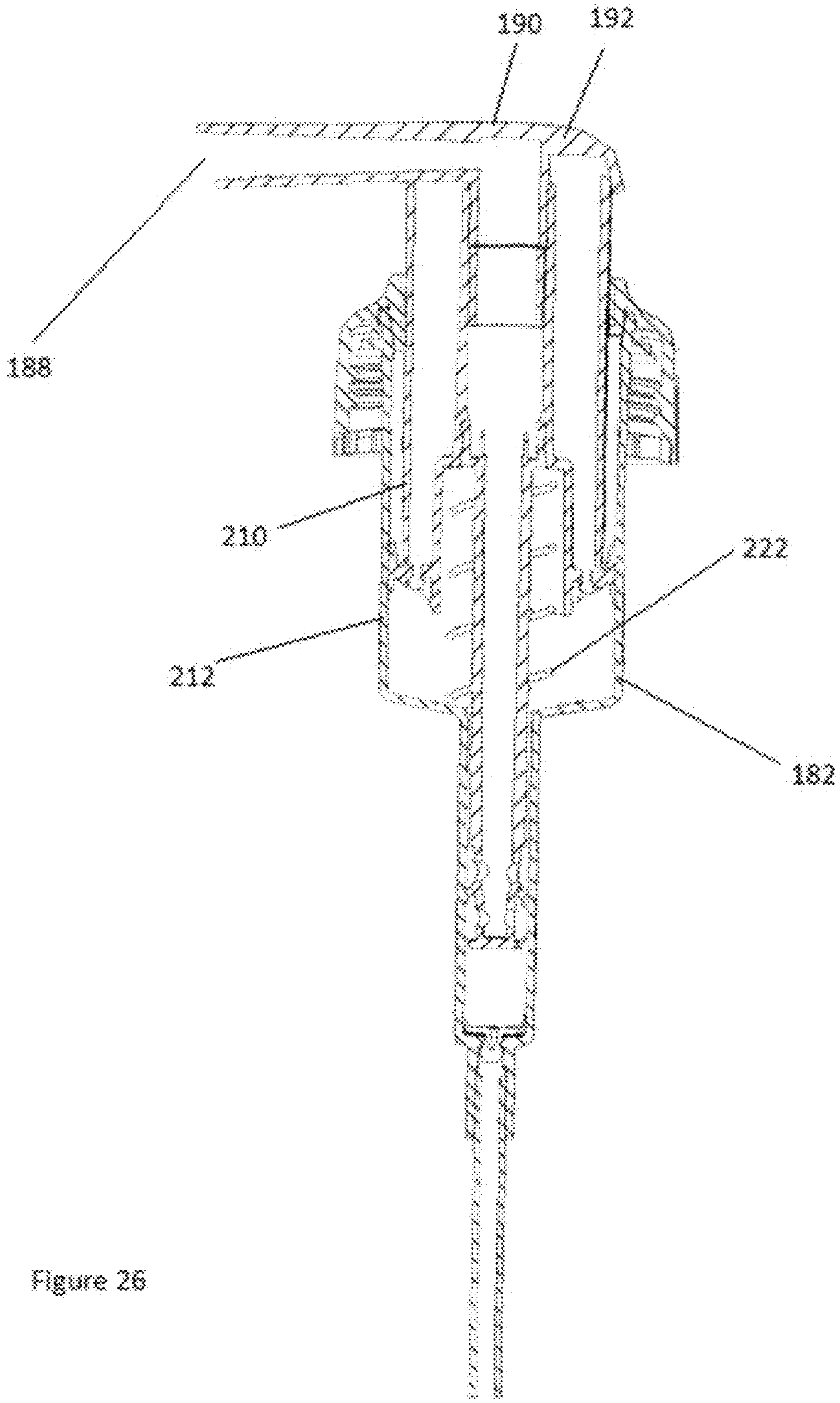
FIG. 26 is a cross-sectional view of the table top fluid dispenser the same as FIG. 25, but showing the activation member at a depressed position.
Figure 27:
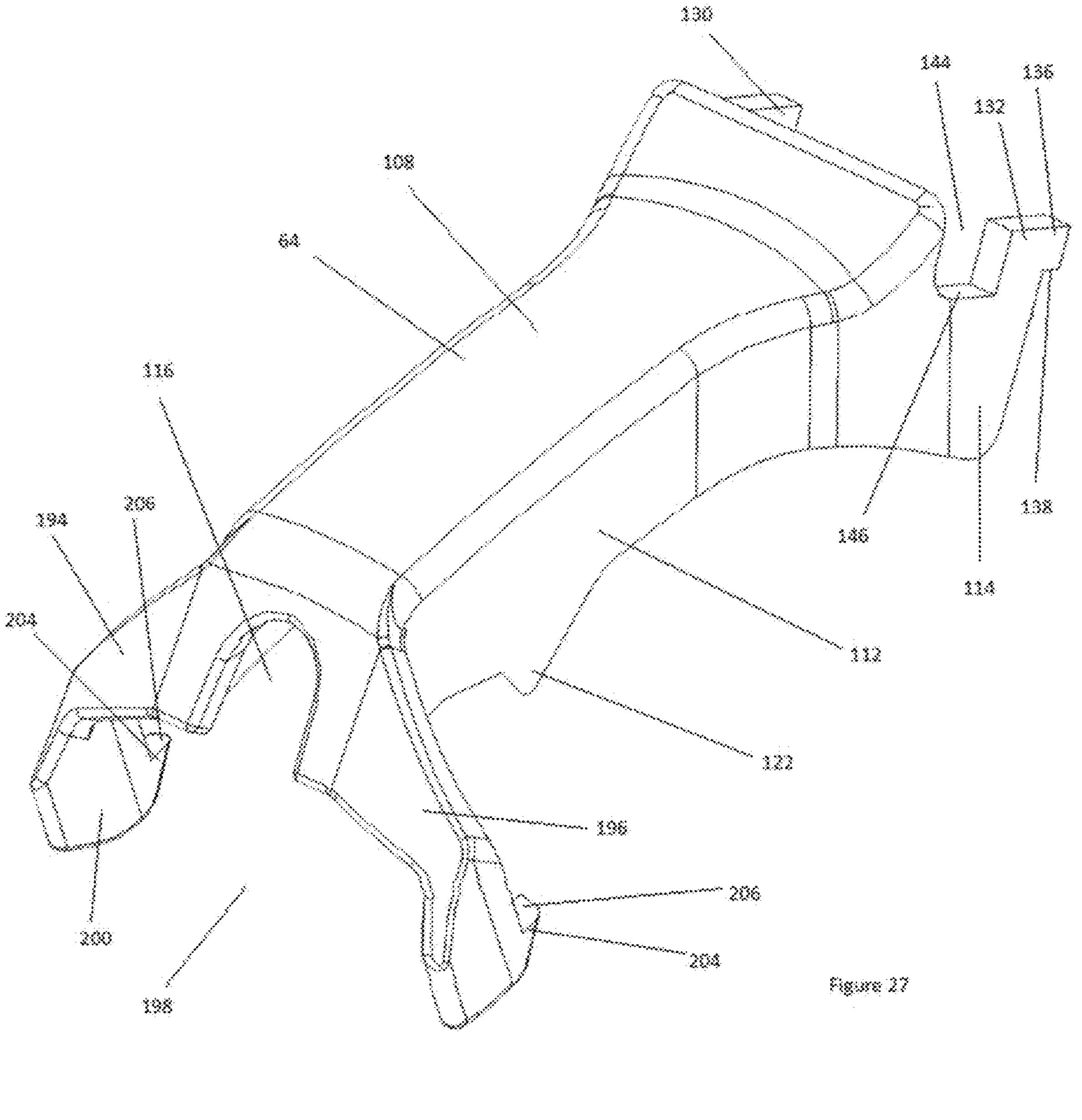
FIG. 27 is a front perspective view of an engagement member of the fluid dispenser housing shown in FIG. 23.
Figure 28:
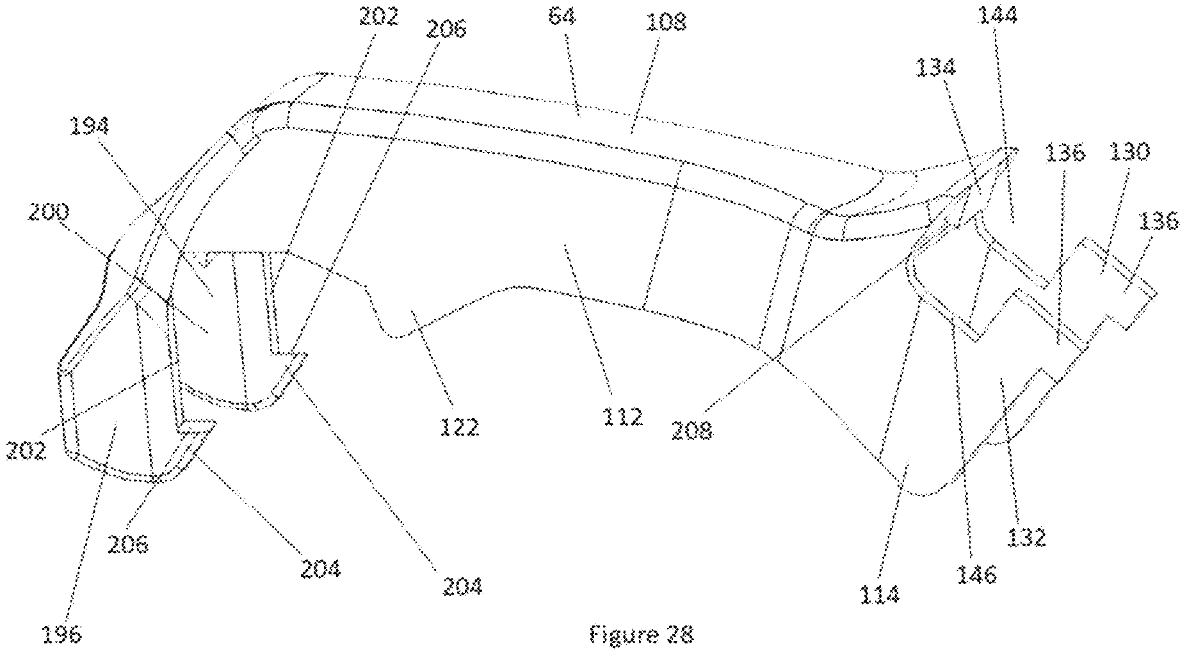
FIG. 28 is a side perspective view of the engagement member shown in FIG. 27.
Figure 29:
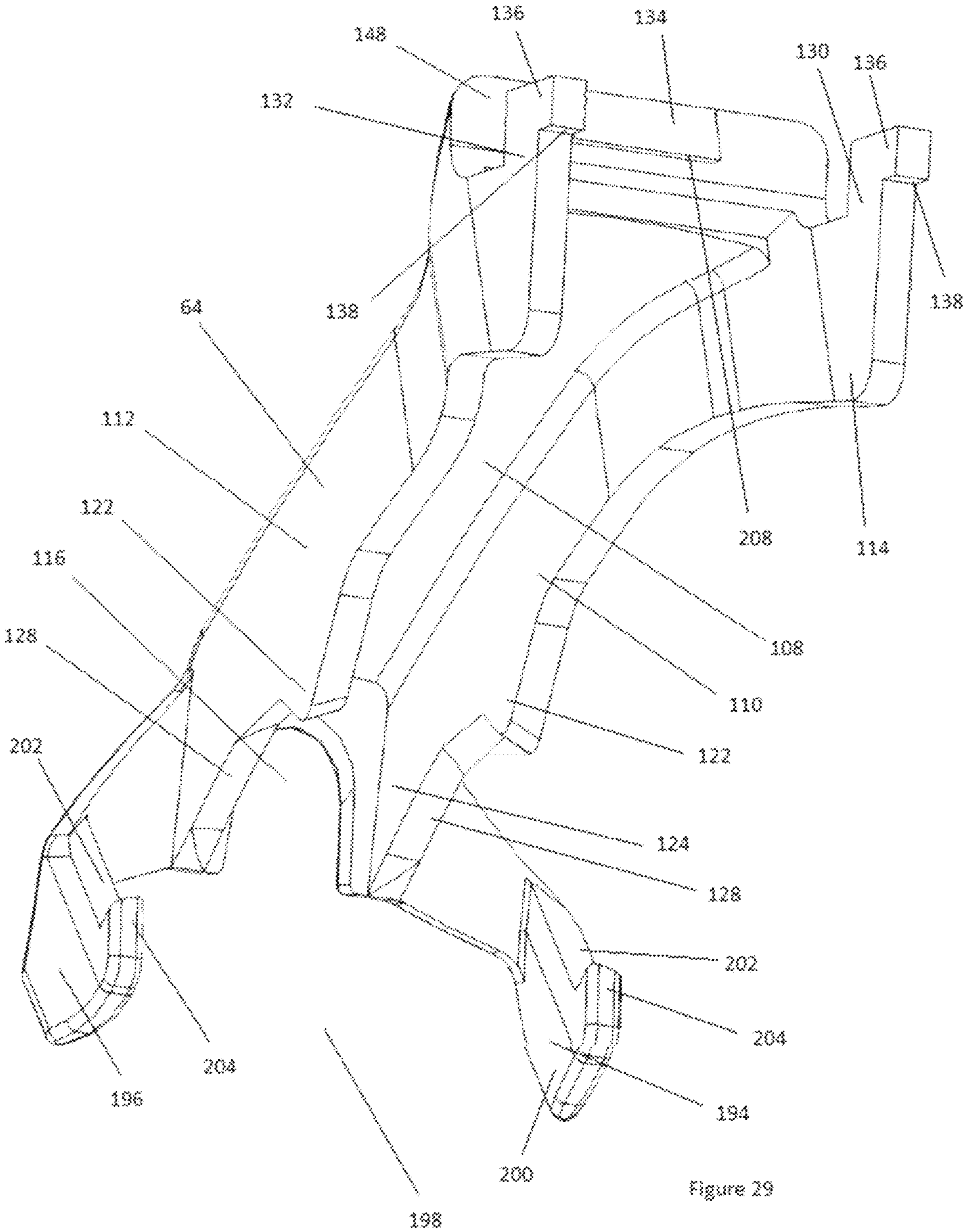
FIG. 29 is a bottom perspective view of the engagement member shown in FIG. 27.

The fluid dispensing system shown in FIGS. 23 to 32 incorporates the engagement member 64 shown in FIGS. 27 to 29. The engagement member 64 has an upper wall 108, a left wall 110, a right wall 112, a rear attachment portion 114, a left pump engagement arm 194 that extends laterally outwardly from the front of the left wall 110, and a right pump engagement arm 196 that extends laterally outwardly from the front of the right wall 112. As best shown in FIG. 29, the left wall 110 and the right wall 112 each have a downwardly extending rear tooth member 122, and a downwardly directed engagement surface 128 positioned forwardly of the rear tooth member 122. The upper wall 108 defines a forwardly open spout tube opening 116.

As can be seen in FIG. 27, a pump receiving opening 198 is defined between the left pump engagement arm 194 and the right pump engagement arm 196. Each of the left and right pump engagement arms 194, 196 has a laterally inwardly directed pump holding surface 200. As can be seen in FIG. 28, each of the left and right pump engagement arms 194, 196 also has a rearwardly directed pump locking surface 202 and a lower hook member 202 that presents an upwardly directed pump carrying surface 206.

The rear attachment portion 114 of the engagement member 64 shown in FIGS. 27 to 29 is similar to the rear attachment portion 114 of the engagement member 64 shown in FIGS. 1 to 22, and includes left and right side attachment arms 130, 132 as well as an upper attachment body 134. As can be seen in FIG. 28, the upper attachment body 134 does not have a hook member 140 as in the embodiment shown in FIGS. 1 to 22, but instead has a generally triangular cross-sectional geometry, with a downwardly directed plate catch surface 208. As in the embodiment shown in FIGS. 1 to 22, in the embodiment shown in FIGS. 23 to 32 the engagement member 64 is attached to the actuation plate 58 by inserting the left and right side attachment arms 130, 132 through the left and right side attachment openings 80, 82, and inserting the upper attachment body 134 through the rectangular central opening 76. As in the embodiment shown in FIGS. 1 to 22, in the embodiment shown in FIGS. 23 to 32 the left and right side attachment arms 130, 132 are spaced laterally outwardly from the catch arms 96, 98, so as not to interfere with the attachment of a mountable fluid dispenser 12 to the catch member 62.

Figure 24:
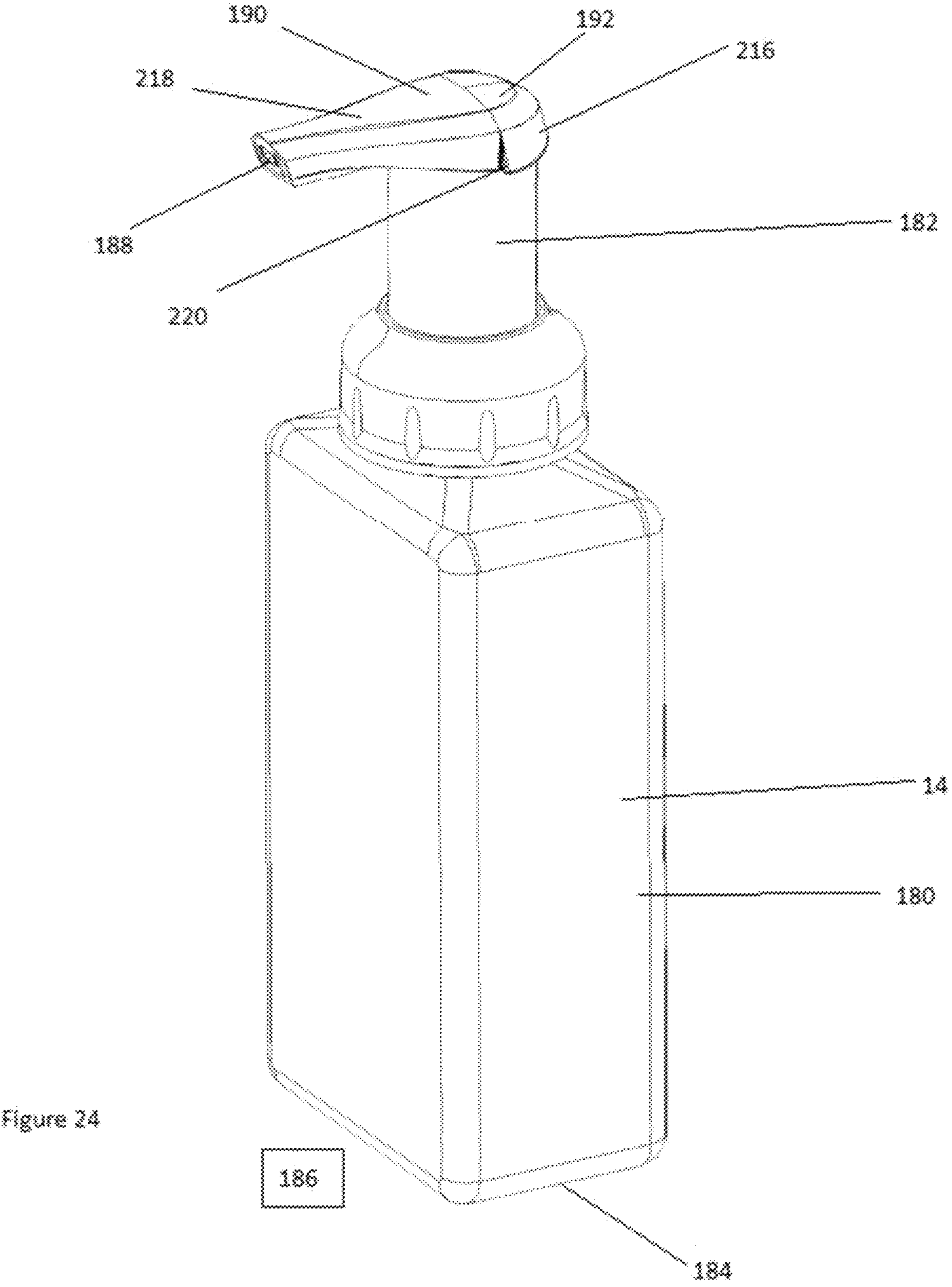
FIG. 24 is a perspective view of the table top fluid dispenser shown in FIG. 23.

The engagement member 64 shown in FIGS. 27 to 29 is configured to allow the table top fluid dispenser 14 shown in FIGS. 24 to 26 to be received by the housing 10. As can be seen in FIG. 24, the table top fluid dispenser 14 has a bottle 180 and a pump mechanism 182. The bottle 180 has a bottom surface 184 that can be placed on a horizontal support surface 186 so that the table top fluid dispenser 14 sits in an upright orientation as shown in FIG. 24, ready for operation in a stand-alone mode.

As can be seen in FIGS. 25 and 26, the pump mechanism 182 includes a piston element 210 and a piston chamber body 212. The piston element 210 is slideable relative to the piston chamber body 212 between the raised position shown in FIG. 25 and the depressed position shown in FIG. 26. Movement of the piston element 210 from the raised position to the depressed position causes the pump mechanism 182 to draw fluid from the bottle 180 and discharge the fluid from the dispenser outlet 188 in a manner as is known in the art. In the embodiment shown, the piston element 210 includes two foam generating screens 214 for generating foam in a manner as is known in the art. In other embodiments, the foam generating screens 214 could be omitted and the pump mechanism 182 could be configured to dispense liquid instead of foam. The pump mechanism 182 also includes an internal biasing mechanism 222, in the form of a spring, which biases the piston element 210 towards the raised position.

As can be seen in FIG. 24, the activation member 190 has a head 192 that can be manually depressed to activate the pump mechanism 182 when the table top fluid dispenser 14 is operated in the stand-alone mode. The head 192 has a rounded rear portion 216 and an elongated front portion 218 that defines the dispenser outlet 188. As shown in FIG. 24, on the right side of the head 192 where the rounded rear portion 216 meets the elongated front portion 218, the rounded rear portion 216 extends further laterally outwardly than the elongated front portion 218, so as to present a forwardly directed pump lock surface 220. Although not shown in the drawings, a symmetrically identical pump lock surface 220 is also presented on the left side of the head 192.

Figure 30:
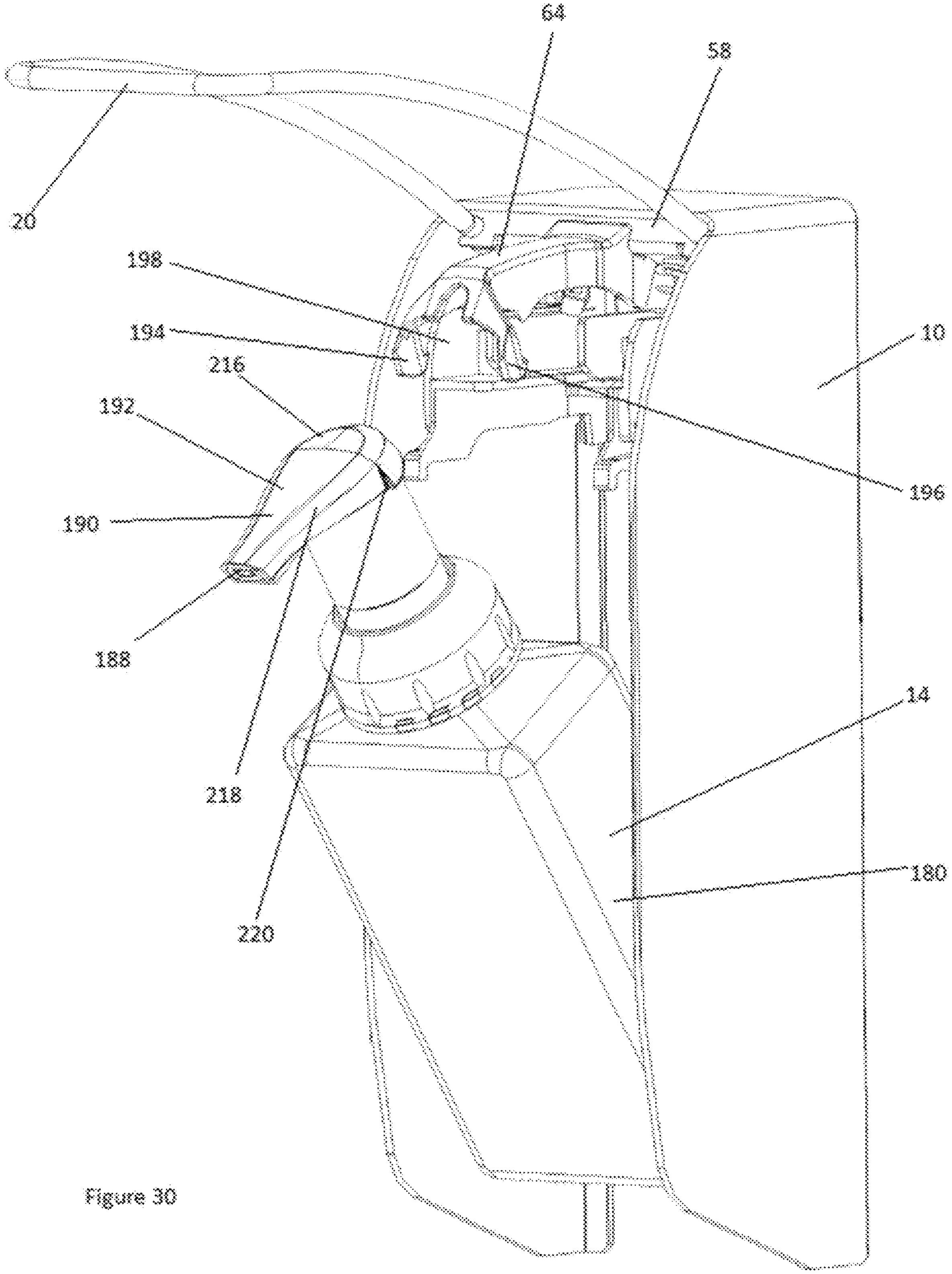
FIG. 30 is a perspective view of the fluid dispenser housing and the table top fluid dispenser shown in FIG. 23, with the face shield omitted, and showing the table top fluid dispenser at a tilted mounting position.
Figure 31:
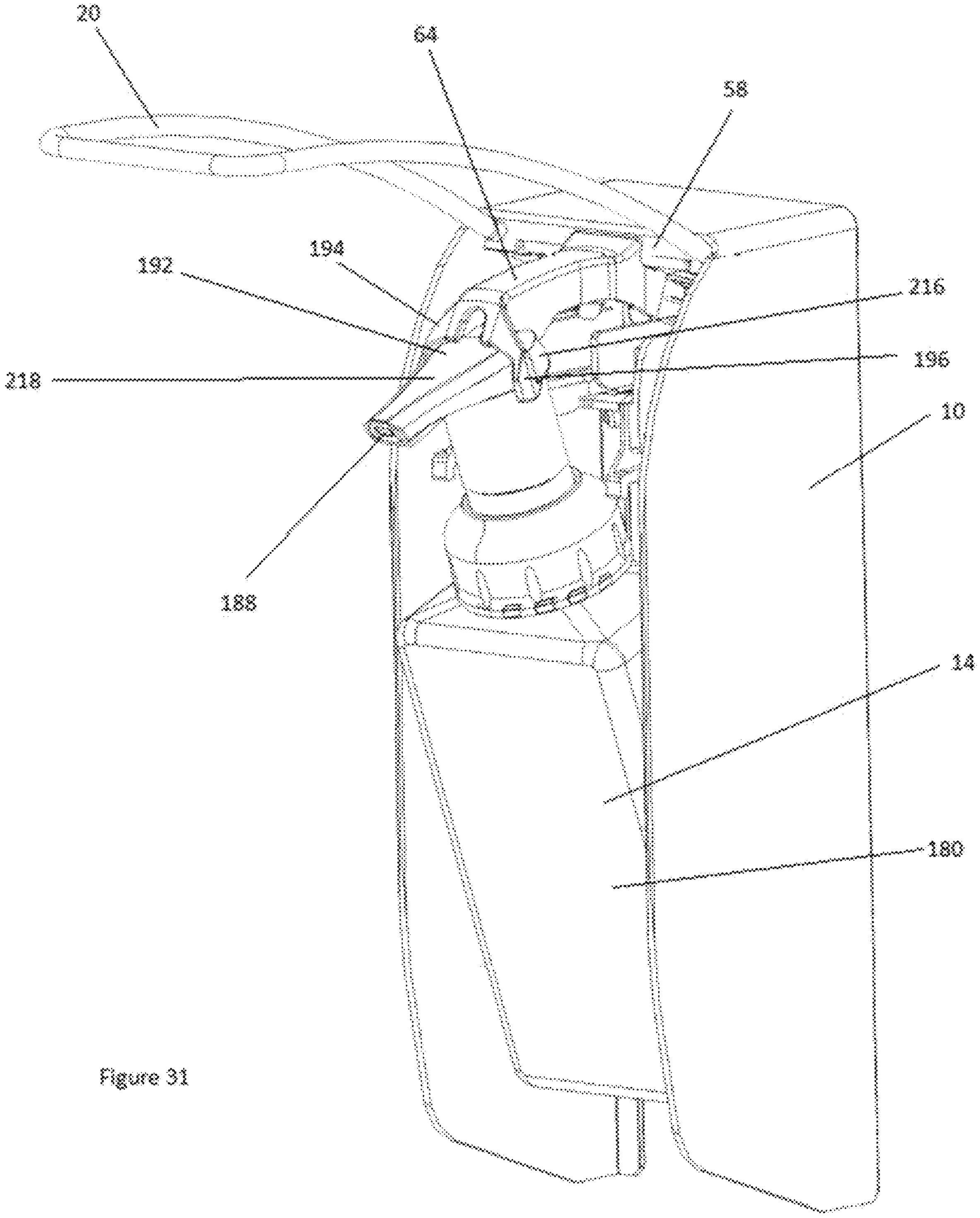
FIG. 31 is a perspective view of the fluid dispenser housing and the table top fluid dispenser shown in FIG. 23, with the face shield omitted, and showing the table top fluid dispenser at a mounted position.

To mount the table top fluid dispenser 14 in the housing 12, the table top fluid dispenser 14 can be tilted forwardly as shown in FIG. 30, and the bottom surface 184 of the bottle 180 can be placed on the foot portion 56 of the support member 32. The table top fluid dispenser 14 can then be tilted backwards so that the rounded rear portion 216 of the head 192 slides rearwardly into the pump receiving opening 198 of the engagement member 64, as shown in FIG. 31. As the head 192 slides into the pump receiving opening 198, the left and right pump engagement arms 194, 196 deflect slightly outwardly until the rounded rear portion 216 of the head 192 moves rearwardly past the pump locking surfaces 202 of the left and right pump engagement arms 194, 196, at which point the left and right pump engagement arms 194, 196 snap laterally inwardly to engage with the head 192 in a snap fit. When the head 192 is engaged with the engagement member 64 in the snap fit, the rear surface of the head 192 engages with the rear tooth members 122, the top surface of the head 192 engages with the engagement surfaces 128 of the left and right walls 110, 112, the left and right side surfaces of the elongated front portion 218 of the head 192 engage with the pump holding surfaces 200 of the left and right pump engagement arms 194, 196, the pump lock surfaces 220 of the head 192 engage with the pump locking surfaces 202 of the left and right pump engagement arms 194, 196, and the bottom surface of the rounded rear portion 216 of the head 192 engages with the pump carrying surfaces 206 of the left and right pump engagement arms 194, 196. The various points of engagement between the engagement member 64 and the head 192 hold the head 192 in place, with for example the pump locking surfaces 202 preventing the table top fluid dispenser 14 from falling forwardly out of engagement with engagement member 64, and with the pump holding surfaces 200 helping to prevent the table top fluid dispenser 14 from tilting to the side or becoming rotationally misaligned with the engagement member 64.

Figure 32:
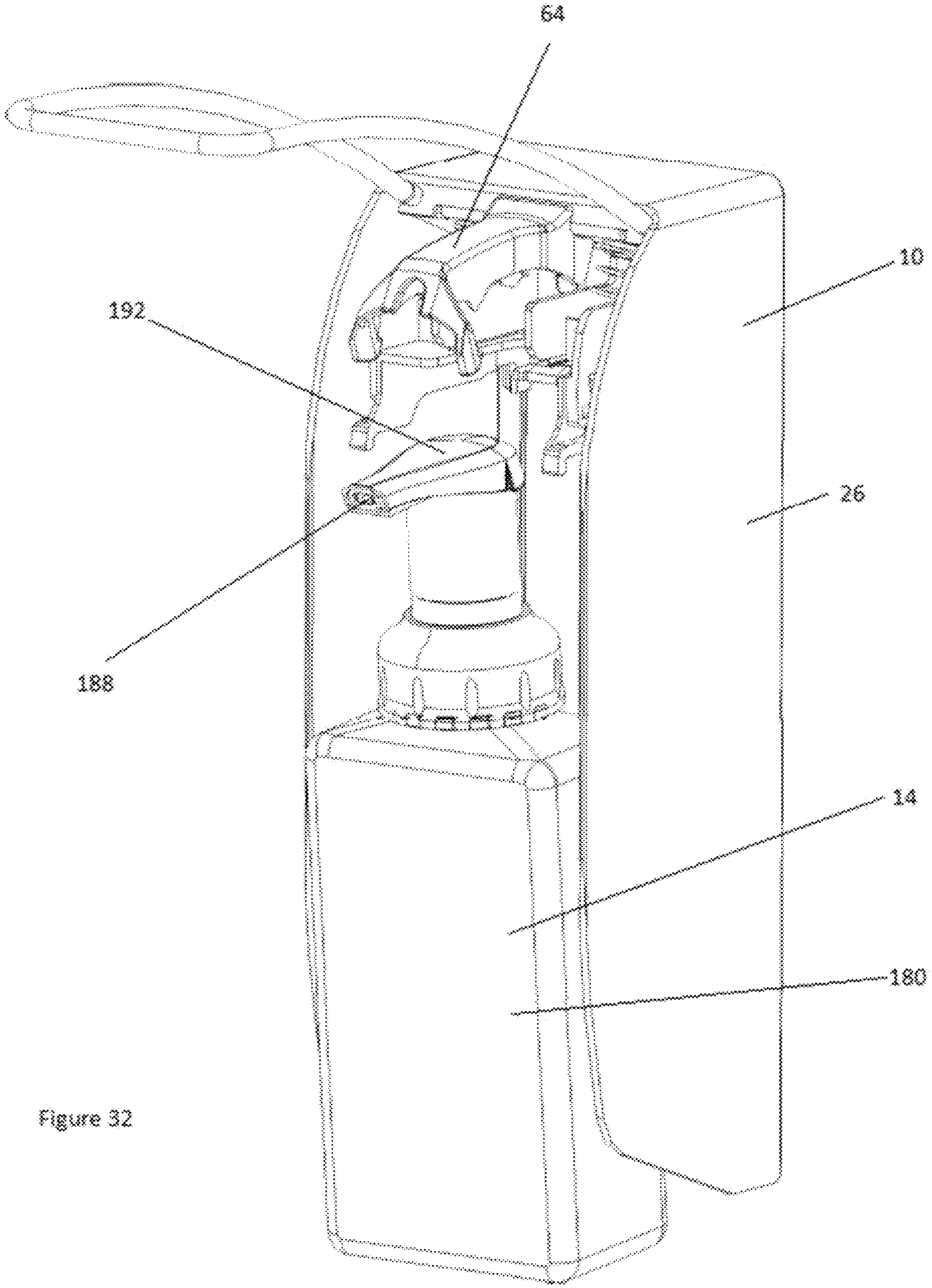
FIG. 32 is a perspective view of the fluid dispenser housing and the table top fluid dispenser shown in FIG. 23, with the face shield omitted, and showing the table top fluid dispenser at a lowered mounting position.

An alternative method of mounting the table top fluid dispenser 14 in the housing is by positioning the fluid dispenser 14 below the engagement member 64 as shown in FIG. 32. The fluid dispenser 14 can then be raised into engagement with the engagement member 64, and the position of the head 192 adjusted to adopt the snap fit position as shown in FIG. 31 and as described above.

An advantage of using the tilting method to mount the table top fluid dispenser 14 in the housing 10 is that the fluid dispenser 14 does not need to extend below the bottom of the shroud 26 during the mounting procedure. This may be advantageous, for example, if the housing 10 is mounted in an area where there is little or no space for the fluid dispenser 14 to be extend below the bottom of the shroud 26.

Once the table top fluid dispenser 14 is mounted in the housing 10 as shown in FIG. 31, the fluid 22 is dispensed from the dispenser 14 in the same manner as described above with respect to the embodiment shown in FIGS. 1 to 22. In particular, the actuator lever 20 is depressed from the rest position to the depressed position, which causes the actuation plate 58 and the attached engagement member 64 to pivot towards the support member 32. The movement of the engagement member 64 towards the support member 32 causes the engagement surfaces 128 on the engagement member 64 to push downwardly on the top of the activation member 190, which causes the activation member 190 to move from the raised position to the depressed position. The movement of the activation member 190 from the raised position to the depressed position causes the pump mechanism 182 to dispense an allotment of fluid 22 out through the dispenser outlet 188. When the actuator lever 20 is released, the springs 60 push the actuation plate 58 and the attached engagement member 64 back upwardly, away from the support member 32, and the internal biasing mechanism 222 in the table top fluid dispenser 14 pushes the activation member 190 back up to the raised position. The engagement of the pump carrying surfaces 206 on the engagement member 64 with the bottom surface of the head 192 also helps to lift the activation member 190 upwardly to the raised position.

As in the embodiment shown in FIGS. 1 to 22, the engagement member 64 shown in FIGS. 23 to 32 has the advantage that it does not interfere with the ability of the housing 10 to receive the mountable fluid dispenser 12. As in the previous embodiment, the left and right side attachment arms 130, 132 are spaced laterally outwardly from the catch arms 96, 98, and do not interfere with the engagement of the catch arms 96, 98 with the catching member 170. The spout tube opening 116 also allows the elongated spout tube 156 of the fluid pump 54 to extend through the engagement member 64. The engagement member 64 shown in FIGS. 23 to 32 also has the additional advantage of allowing the table top fluid dispenser 14 to be mounted in the housing 10 by tilting the head 192 of the fluid dispenser 14 rearwardly into the pump receiving opening 198 in the manner as described above.

The engagement member 64 shown in FIGS. 23 to 32 is adapted to permit mounting of a table top fluid dispenser 14 having the particular head shape as shown in FIG. 24. The engagement member 64 shown in FIGS. 1 to 22 is adapted to permit mounting of a table top fluid dispenser 14 having a generally circular head shape as shown in FIG. 19. In some embodiments of the invention, the engagement member 64 may be configured to engage with table top fluid dispensers 14 that have a generic or common head shape, so that the housing 10 will be able to receive a variety of different table top fluid dispensers 14 that may, for example, be produced by a number of different manufacturers. In other embodiments of the invention, the engagement member 64 may be configured to engage with table top fluid dispensers 14 that have a particular head shape that is unique to a single manufacturer, so that only table top fluid dispensers 14 made by that single manufacturer can be operated in the housing 10.

Reference is now made to FIGS. 33 to 46, which show a fluid dispensing system in accordance with a third embodiment of the present invention Like numerals are used to denote like components. The fluid dispenser housing 10 shown in FIGS. 33 to 46 is similar to the housing 10 shown in FIGS. 1 to 22, with the notable difference that the face shield 34 forms part of the actuation mechanism 30, and pivots between a raised position, shown in FIG. 39, and a lowered position, shown in FIG. 40, upon movement of the actuator lever from the rest position to the depressed position. The pivoting motion of the face shield 34 allows the face shield 34 to perform the functions of the actuation plate 58, the catch member 62, and the engagement member 64 in the previous embodiments.

The fluid dispensing system includes the fluid dispenser housing 10, a mountable fluid dispenser 12, a first table top fluid dispenser 14, and a second table top fluid dispenser 300. The fluid dispenser housing 10 has a shroud 26, a pump mounting body 28, an actuation mechanism 30, and a support member 32.

Figure 33:
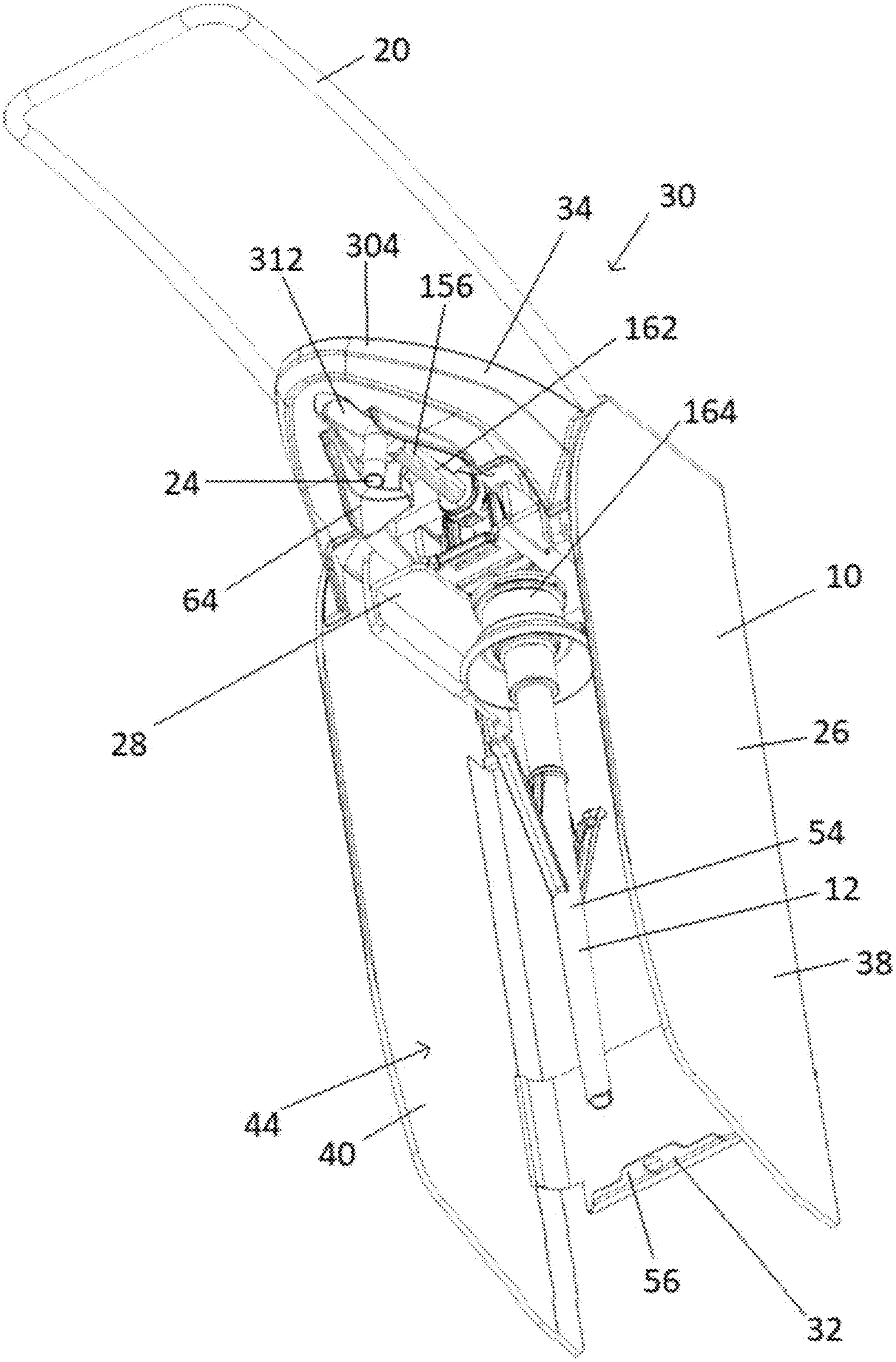
FIG. 33 is a perspective view of a fluid dispenser housing containing a mountable fluid pump in accordance with a third embodiment of the present invention.
Figure 36:
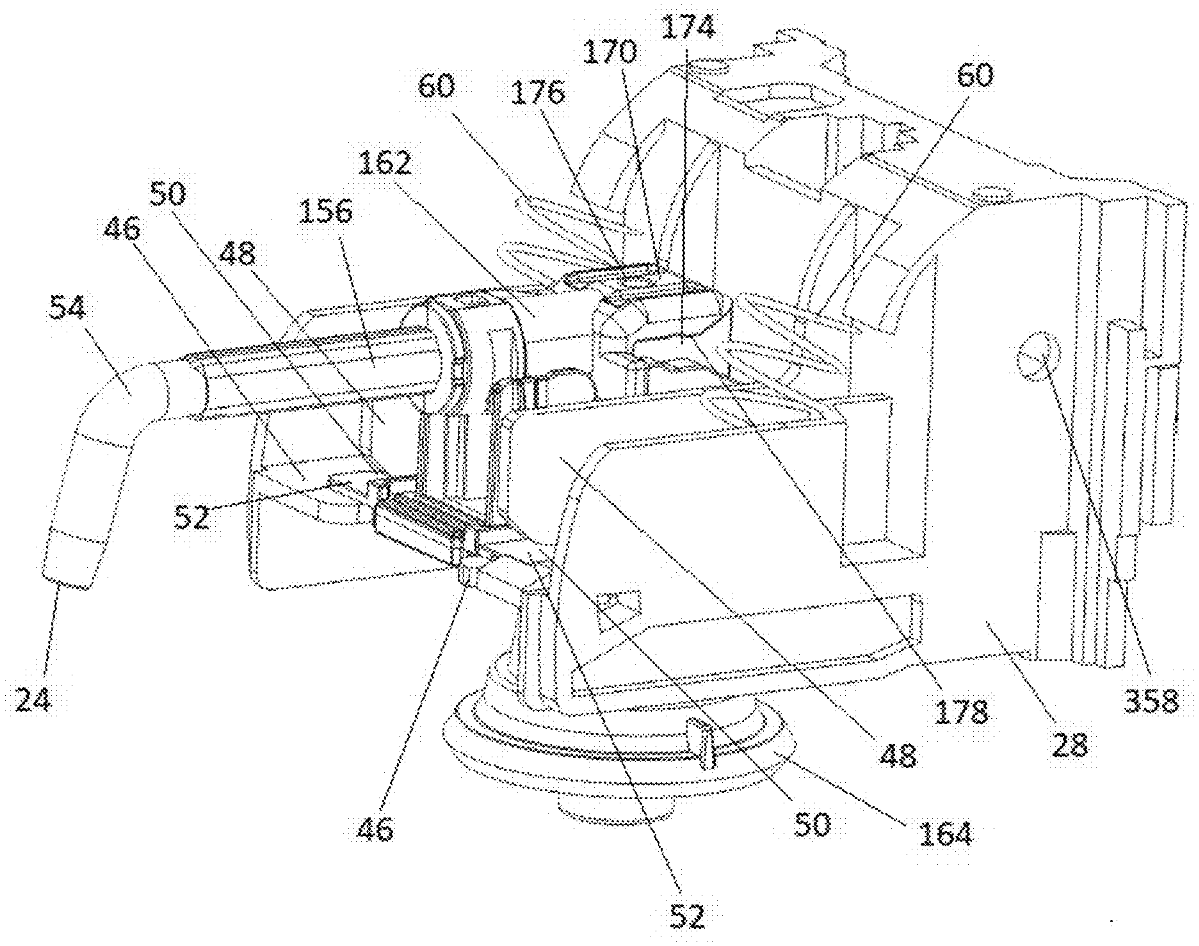
FIG. 36 is a perspective view of a pump mounting body of the fluid dispenser housing and an upper portion of the mountable fluid pump shown in FIG. 33.

As in the previous embodiments, the shroud 26 has a horizontal top wall 36 and two spaced vertical side walls 38 that define an inner cavity 44 therebetween. As can be seen in FIG. 33, the pump mounting body 28 is positioned near the top of the inner cavity 44 of the shroud 26. The pump mounting body 28 is best shown in FIG. 36. As in the previous embodiments, the pump mounting body 28 has two horizontal shoulder members 46 and two vertical holding members 48, each of the vertical holding members 48 being spaced a short distance above a respective one of the horizontal shoulder members 46 so as to define a horizontal slot 50 therebetween. As in the previous embodiments, the horizontal slots 50 are configured to receive a pair of mounting fingers 52 that extend laterally outwardly from a fluid pump 54 of the mountable fluid dispenser 12.

As can be seen in FIG. 36, the pump mounting body 28 has a face shield mounting hole 358 on the right side of the pump mounting body 28. Although not visible in the drawings, the left side of the pump mounting body 28 also has a face shield mounting hole 358.

The actuation mechanism 30 includes the actuator lever 20, the face shield 34, and two springs 60. The actuator lever 20 is identical to the actuator lever 20 shown in the previous embodiments.

Figure 34:
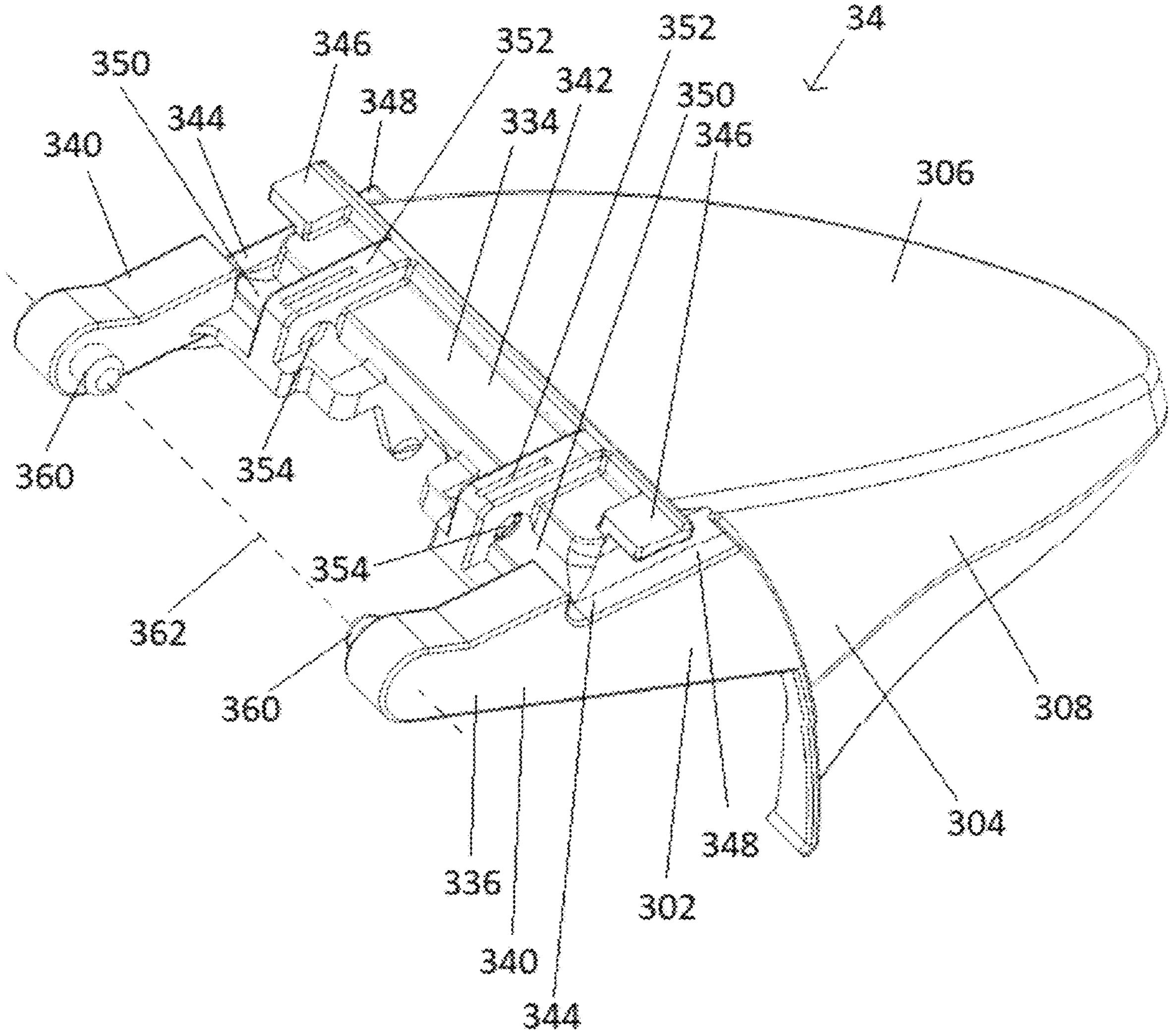
FIG. 34 is a top perspective view of a face shield of the fluid dispenser housing shown in FIG. 33.
Figure 35:
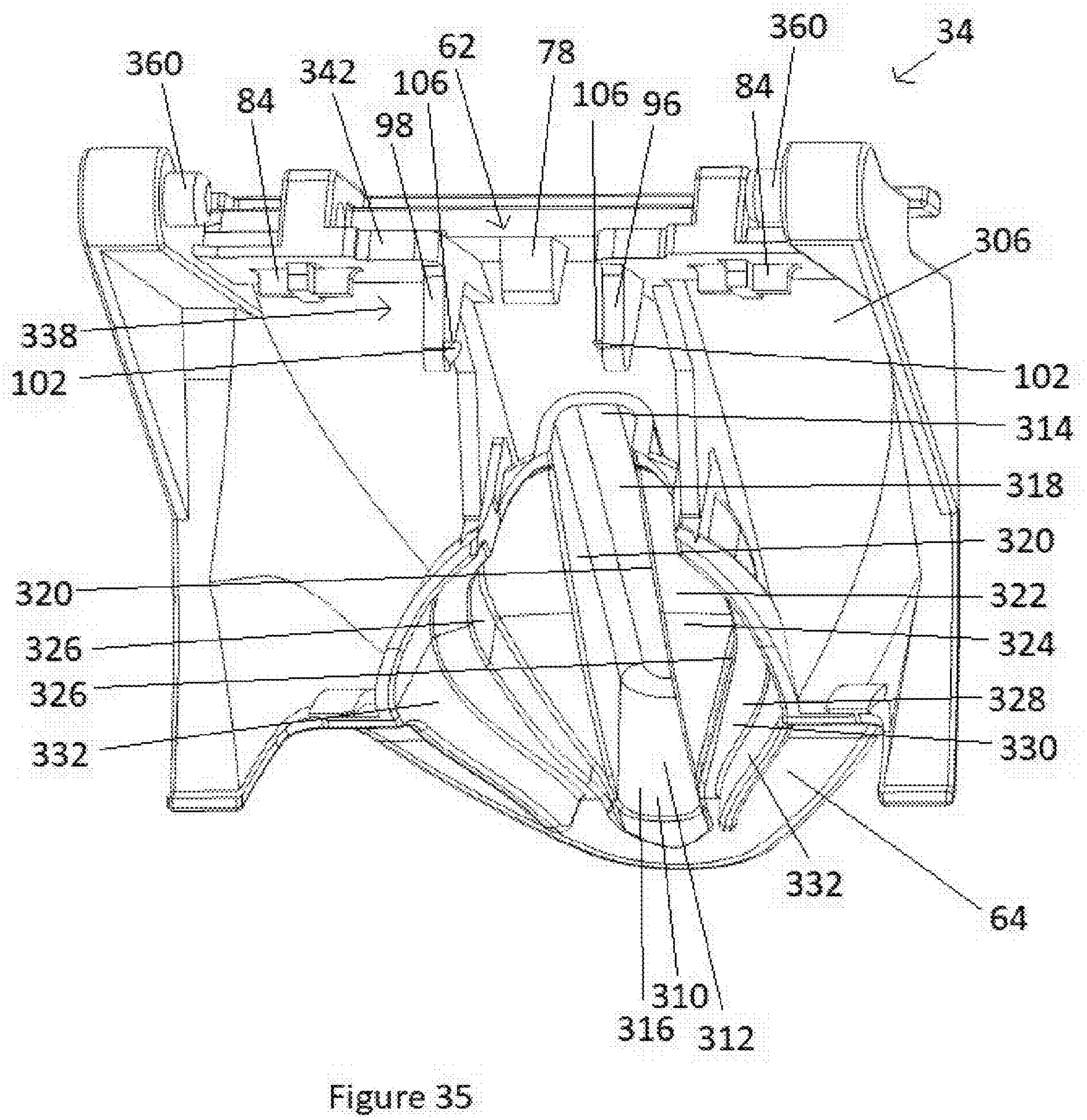
FIG. 35 is a bottom perspective view of the face shield shown in FIG. 34.

The face shield 34 is best shown in FIGS. 34 and 35. The face shield 34 includes a nose portion 304, which extends forwardly from the shroud 26, and a housing attachment portion 302, which is positioned below the top wall 36 of the shroud 26. The nose portion 304 has an upper wall 306 and two side walls 308. As can be seen in FIG. 35, an engagement member 64 is positioned adjacent to the underside of the upper wall 306. The engagement member 64 may be integrally formed with the rest of the face shield 34, or optionally could be a separate component that is attached to the nose portion 304 with a snap fit, for example.

The engagement portion 64 defines a central cavity 310 with a stepped construction. The central cavity 310 has a central channel 312 with an open rear end 314 and a closed front end 316. The central channel 312 has a top surface 318 that is positioned near the upper wall 306 of the face shield 34. Two channel side surfaces 320 extend downwardly from the top surface 318, with the central channel 312 being defined between the top surface 318 and the channel side surfaces 320.

The central cavity 310 also has a first engagement portion 322 that is positioned below the central channel 312. The first engagement portion 322 has a first engagement surface 324 that extends laterally outwardly from the two channel side surfaces 320 of the central channel 312. Two first engagement portion side surfaces 326 extend downwardly from the first engagement surface 324.

The central cavity 310 also has a second engagement portion 328 that is positioned below the first engagement portion 322. The second engagement portion 328 has a second engagement surface 330 that extends laterally outwardly from the two first engagement portion side surfaces 326. Two second engagement portion side surfaces 332 extend downwardly from the second engagement surface 330.

The housing attachment portion 302 has two arms 340 that extends rearwardly from the side walls 308 of the nose portion 304, and a central body 342 that extends between the two arms 340 adjacent to the upper wall 306 of the nose portion 304. The arms 340 and the central body 334 of the housing attachment portion 302 define a lever engagement section 334, a housing engagement section 336, and a pump engagement section 338.

The lever engagement section 334 is best shown in FIG. 34, and is located adjacent to the nose portion 304 and above the pump engagement section 338. The lever engagement section 334 includes two L-shaped channels 344 that each have a front portion 348 that extends rearwardly over one of the arms 304, and a rear portion 350 that extends laterally inwardly over the central body 342. The central body 342 has upper tabs 346 that extend laterally outwardly over the front portions 348 of the L-shaped channels 344. The central body 342 also has two bore-forming bodies 352 that extend over the rear portions 350 of the L-shaped channels 344. Each of the bore-forming bodies 352 defines a laterally oriented borehole 354.

Figure 38:
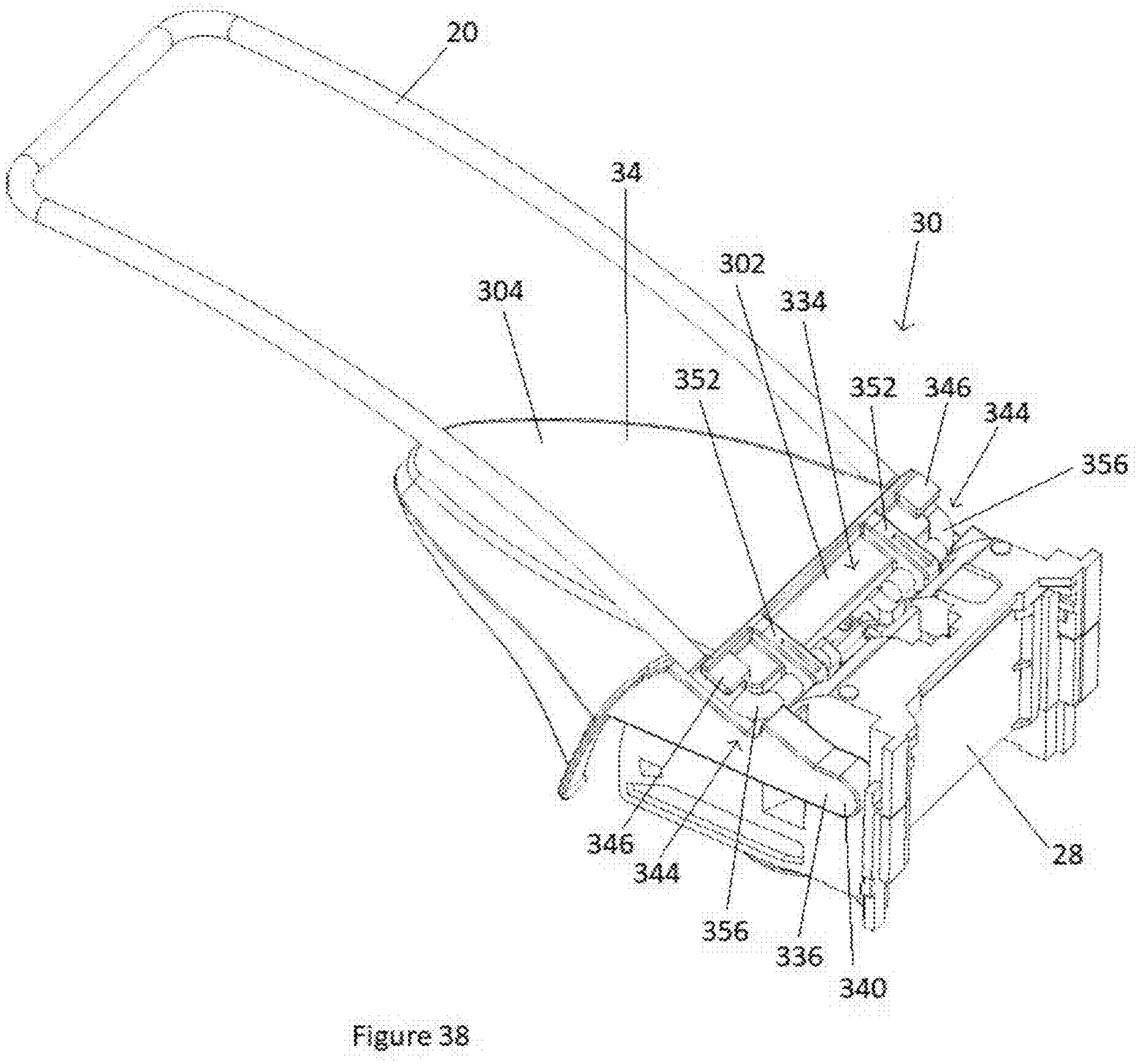
FIG. 38 is a perspective view of the face shield, the pump mounting body, and a lever of the fluid dispenser housing shown in FIG. 33.

As can be seen in FIG. 38, the L-shaped channels 344 are configured to receive the L-shaped ends 356 of the actuator lever 20, with the L-shaped ends extending rearwardly over the front portions 348 of the L-shaped channels 344, below the upper tabs 346, and laterally inwardly over the rear portions 350 of the L-shaped channels 344, and through the boreholes 354.

The housing engagement section 336 is defined by the rear ends of the arms 340. As can be seen in FIG. 34, at the end of each arm 340 there is a laterally inwardly extended cylindrical mounting finger 360. The mounting fingers 360 extend along a face shield pivot axis 362, and are configured to engage with the face shield mounting holes 358 in the pump mounting body 28 so as to permit the face shield 34 to pivot relative to the pump mounting body 28 about the axis 362.

The pump engagement section 338 is best shown in FIG. 35, and is located adjacent to the nose portion 304 and below the lever engagement section 334. The pump engagement section 338 has a similar structure and function as the actuation plate 58 and the catch member 62 in the previous embodiments. The pump engagement section 338 is defined by the central body 342, and has a central drive member 78 that extends downwardly near the center of the central body 342; two catch arms 96, 98 spaced laterally outwardly from the central drive member 78 that extend downwardly; and two spring receiving members 84 spaced laterally outwardly from the catch arms 96, 98 that also extend downwardly.

Each catch arm 96, 98 has a catch finger 102 that projects laterally inwardly and presents an upwardly directed catch surface 104. As in the previous embodiments, the catch arms 96, 98 are resiliently deflectable. Together, the catch arms 96, 98 and the central drive member 78 function as a catch member 62.

Each of the springs 60 extends from one of the spring receiving members 84 to the pump mounting body 28. The springs 60 push the central body 342 of the face shield 34 upwardly away from the pump mounting body 28, so as to bias the face shield 34 towards the rest position shown in FIG. 39. When the actuator lever 20 is pulled downwardly, the actuator lever 20 pushes downwardly against the central body 342, compressing the springs and causing the face shield 34 to pivot about the face shield pivot axis 362 from the rest position shown in FIG. 39 to the lowered position shown in FIG. 40.

The support member 32 extends between the side walls 38, 40 near the bottom of the shroud 26, and has a foot portion 56 that extends forwardly to provide a ledge-like support for supporting the mountable fluid dispenser 12 when the mountable fluid dispenser 12 is received by the housing 10, or for supporting the first or second table top fluid dispenser 14, 300 when the first or second table top fluid dispenser 14, 300 is received by the housing 10. Although not shown in the drawings, the support member 32 is optionally adjustable to select the height of the foot portion 56 relative to the rest of the housing 10. Any suitable mechanism for adjusting the height of the support member 32 could be used, including for example that described in U.S. Pat. No. 10,743,719 to Ophardt et al., issued Aug. 18, 2020, which is incorporated herein by reference. In embodiments in which the height of the support member 32 is adjustable, the position of the foot portion 56 can be selected to accommodate the height of the fluid dispenser 12, 14, 300 to be mounted in the housing 10.

The mountable fluid dispenser 12 shown in FIGS. 33 to 46 is nearly identical to the one shown in FIGS. 1 to 22. The mountable fluid dispenser 12 has a fluid reservoir 158, not shown, and a fluid pump 54. As in the previous embodiments, the fluid reservoir 158 is a plastic bottle that sits within the inner cavity 44 of the shroud 26, and may have any suitable structure. The fluid reservoir 158 contains a supply of the fluid 22 that is dispensed from the mountable fluid dispenser 12.

The fluid pump 54 is coupled to the fluid reservoir 158 for dispensing the fluid 22 contained in the fluid reservoir 158 out through the fluid outlet 24. As in the previous embodiments, the fluid pump 54 has a piston forming element 162 and a piston chamber forming body 164, and movement of the piston forming element 162 relative to the piston chamber forming body 164 between an extended position and a retracted position draws fluid 22 out of the fluid reservoir 158 and discharges the fluid 22 out through the fluid outlet 24.

As in the previous embodiments, the piston chamber forming body 164 has mounting fingers 52 that are received by the horizontal slots 50 in the pump mounting body 28, as shown in FIG. 36. The engagement of the mounting fingers 52 with the horizontal slots 50 prevents the piston chamber forming body 164 from moving axially relative to the pump mounting body 28 when the mountable fluid dispenser 12 is received by the housing 10.

Figure 37:
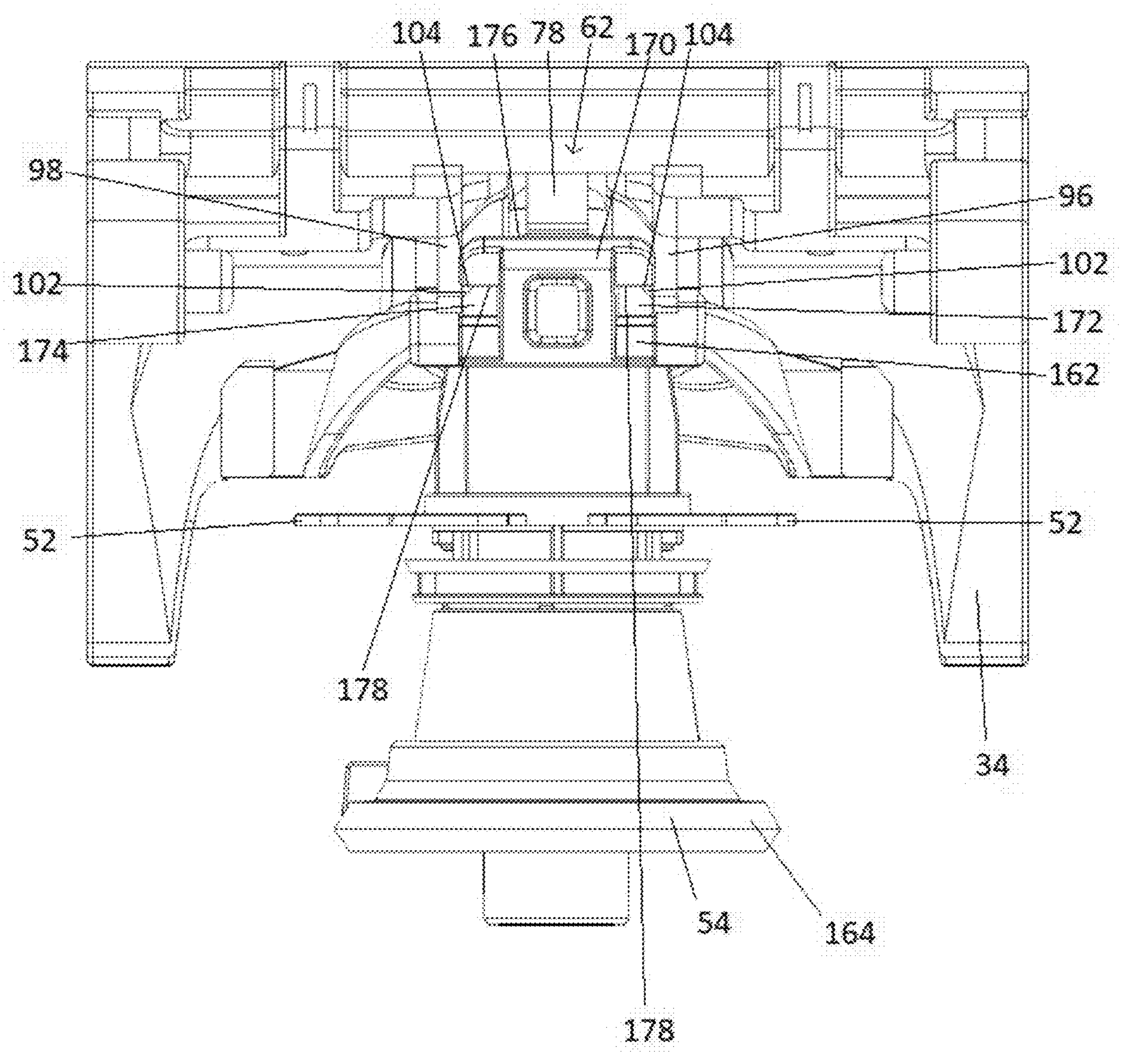
FIG. 37 is a rear view of the upper portion of the mountable fluid pump shown in FIG. 36 engaged with the face shield shown in FIG. 34.

As in the previous embodiments, the piston forming element 162 has a catching member 170 for engaging with the central drive member 78 and the catch arms 96, 98 of the actuation mechanism 30 of the housing 10. As shown in FIG. 37, the catching member 170 has a laterally open left side catching cavity 172, a laterally open right side catching cavity 174, and an upwardly directed upper driving surface 176. Each of the left and right side catching cavities 170, 174 have a downwardly directed catching surface 178.

As in the previous embodiments, when the mountable fluid dispenser 12 is initially placed in the housing 10, the mounting fingers 52 are inserted rearwardly into the horizontal slots 50 in the pump mounting body 28. Initially, the catching member 170 of the fluid pump 54 is spaced below the catch arms 96, 98 of the actuation mechanism 30. To engage the catch arms 96, 98 with the catching member 170, the actuator lever 20 is depressed from the raised position shown in FIG. 39 to the depressed position shown in FIG.

40. The movement of the actuator lever 20 from the raised position to the depressed position pivots the face shield 34 from the rest position to the lowered position, which brings the catch arms 96, 98 downwardly into engagement with the catching member 170. As in the previous embodiments, as the catch arms 96, 98 move downwardly they engage with the lateral outer surface of the catching member 170 and flex outwardly. When the catch fingers 102 are aligned with the left and right side catching cavities 172, 174, the catch arms 96, 98 move laterally inwardly to an engaged position, as shown in FIG. 37, in which the catch fingers 102 extend into the catching cavities 172, 174. When the face shield 34 is at the lowered position, the central drive member 78 also engages with the upper driving surface 176 on the catching member 170.

Figure 39:
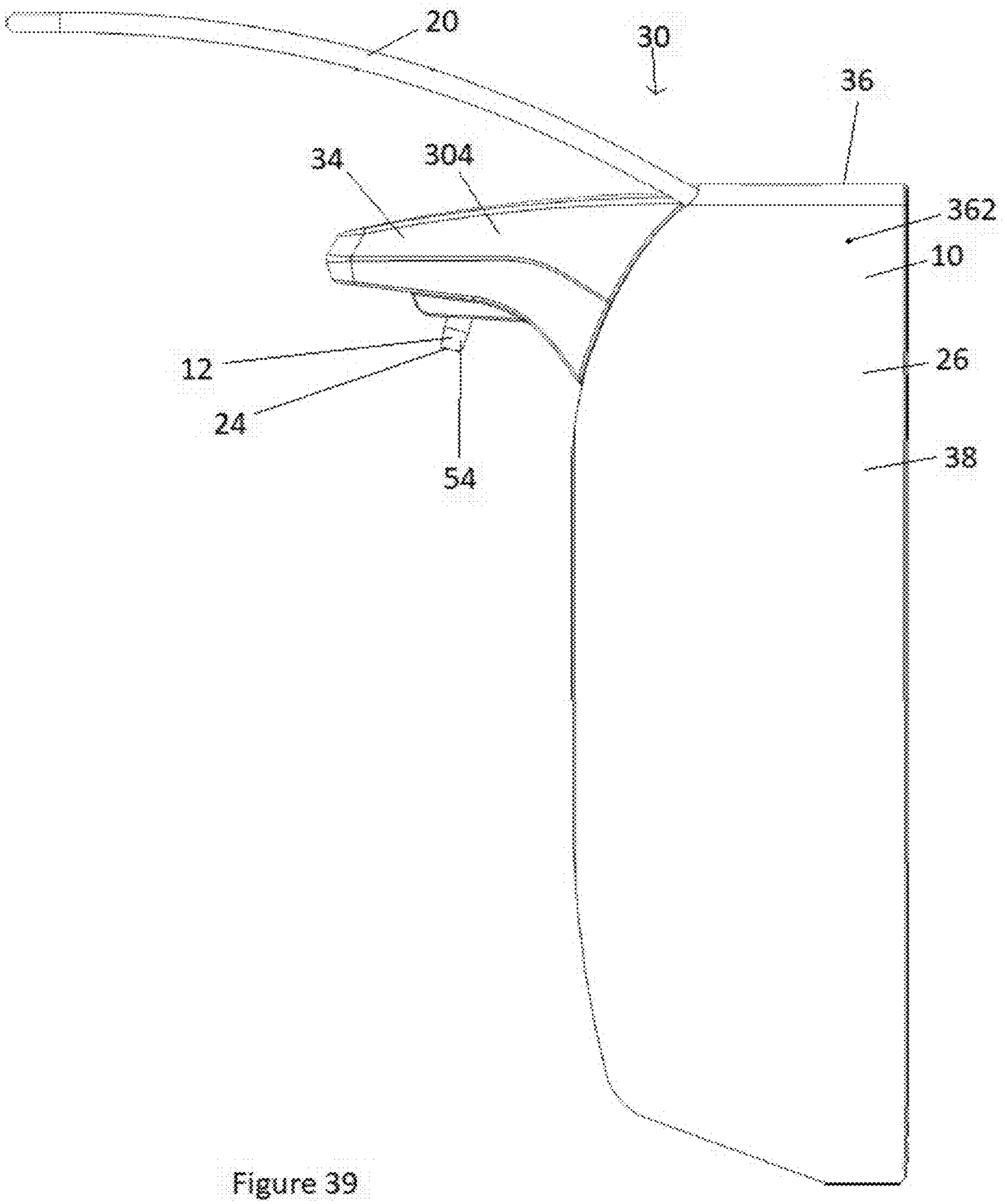
FIG. 39 is a side view of the fluid dispenser housing containing the mountable fluid pump shown in FIG. 33, with the lever shown in a raised position.
Figure 40:
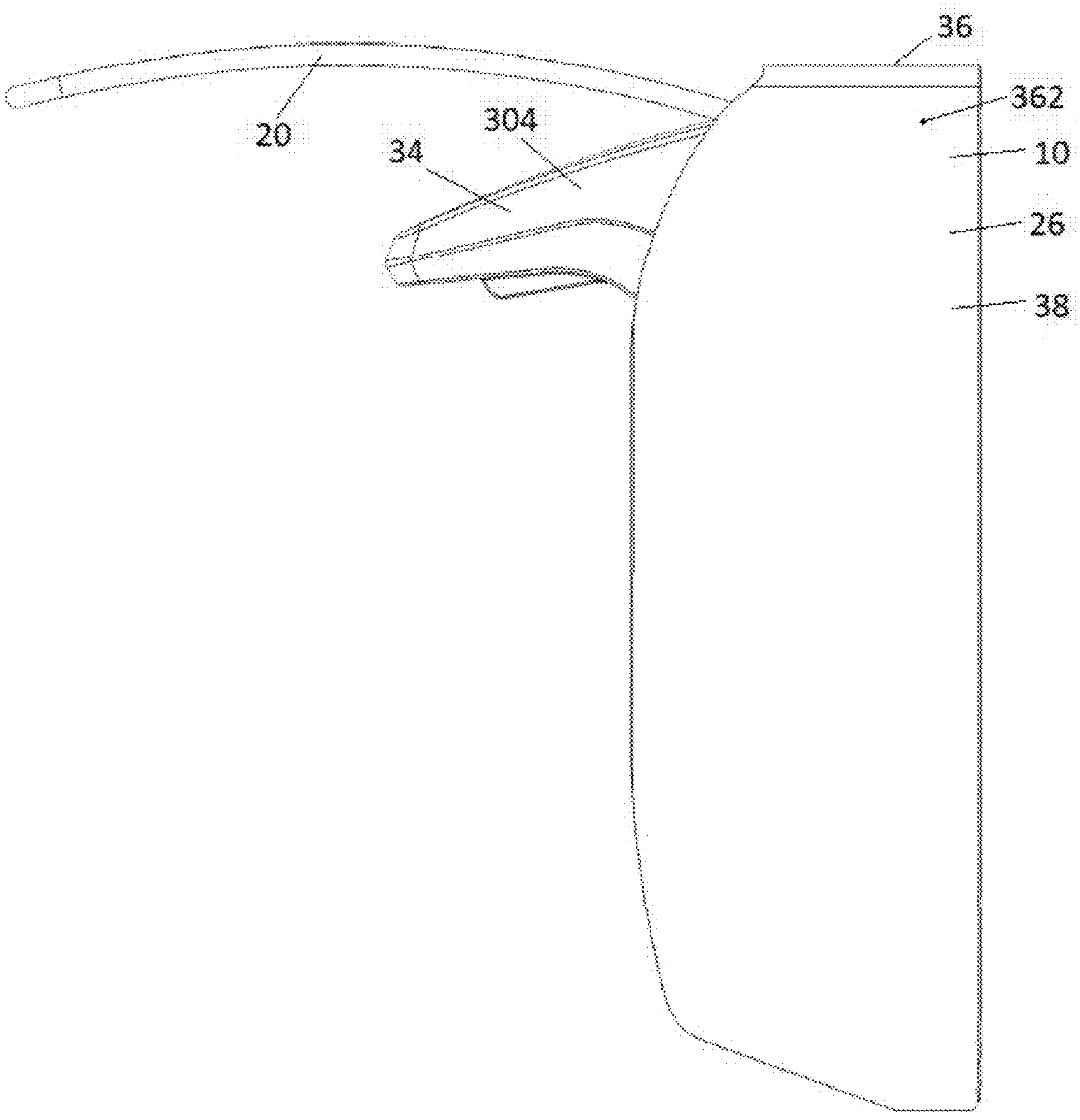
FIG. 40 is a side view of the fluid dispenser housing containing the mountable fluid pump shown in FIG. 33, with the lever shown in a lowered position.

When the mountable fluid dispenser 12 is received in the housing 10 and the catch arms 96, 98 are engaged with the catching member 170, the fluid pump 54 can be activated by depressing the actuator lever 20 from the rest position shown in FIG. 39 to the depressed position shown in FIG. 40. When the actuator lever 20 is pivoted downwardly from the rest position, the face shield 34 also pivots downwardly, which causes the central drive member 78 to push downwardly on the upper driving surface 176 of the piston forming element 162 to thereby slide the piston forming element 162 axially inwardly relative to the piston chamber forming body 164 from the extended position towards the retracted position. Upon release of the actuator lever 20, the springs 60 push the central body 342 of the face shield 34 upwardly away from the pump mounting body 28, which causes the catch arms 96, 98 to move upwardly relative to the pump mounting body 28. As the catch arms 96, 98 move upwardly, the catch surfaces 104 on the catch fingers 102 engage with the catching surfaces 178 in the catching cavities 172, 174, which pulls the piston forming element 162 axially outwardly relative to the piston chamber forming body 164 from the retracted position to the extended position.

As in the previous embodiments, the engagement member 64 does not interfere with the ability of the housing 10 to receive and dispense fluid 22 from the mountable fluid dispenser 12. When the mountable fluid dispenser 12 is received by the housing 10, the elongated spout tube 156 of the fluid pump 54 extends through the central channel 312 of the engagement member 64.

Figure 41:
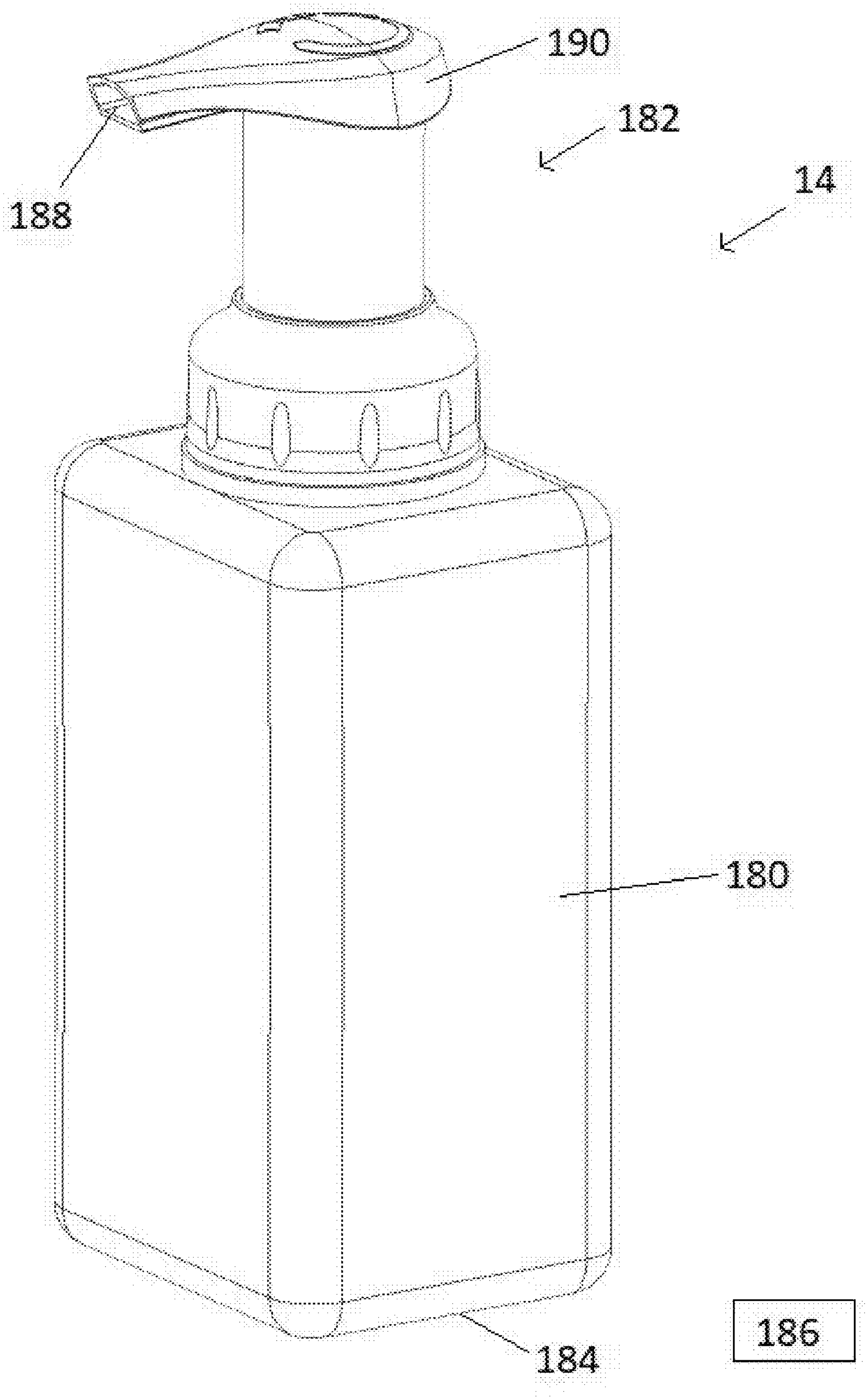
FIG. 41 is a perspective view of a first table top fluid dispenser suitable for use with the fluid dispenser housing shown in FIG. 33.

The first table top fluid dispenser 14 is shown in FIG. 41, and includes a bottle and a pump mechanism 182. The bottle 180 has a bottom surface 184 that can be placed on a horizontal support surface 186, such as a table or a desk, so that the first table top fluid dispenser 14 rests on the horizontal support surface 186 in an upright orientation as shown in FIG. 41. The bottle 180 contains a supply of hand cleaning fluid 22, which may be the same or different than the fluid 22 contained in the fluid reservoir 158 of the mountable fluid dispenser 12. Optionally, the first table top fluid dispenser 14 is configured to dispense a foam.

Similarly to the previous embodiments, the pump mechanism 182 includes an activation member 190 that is manually depressible from a raised position to a depressed position. Upon movement of the activation member 190 from the raised position to the depressed position, the pump mechanism 182 dispenses an allotment of the fluid 22 out through a dispenser outlet 188 of the activation member 190. Preferably, the pump mechanism 182 includes a biasing mechanism such as a spring, not shown, that biases the activation member 190 towards the raised position, so that the activation member 190 does not need to be manually pulled upwardly from the depressed position to the raised position after each activation.

The first table top fluid dispenser 14 can be operated to dispense fluid 22 in a stand-alone mode, by manually depressing the activation member 190 while the dispenser 14 is resting on the horizontal support surface 186.

Figure 42:
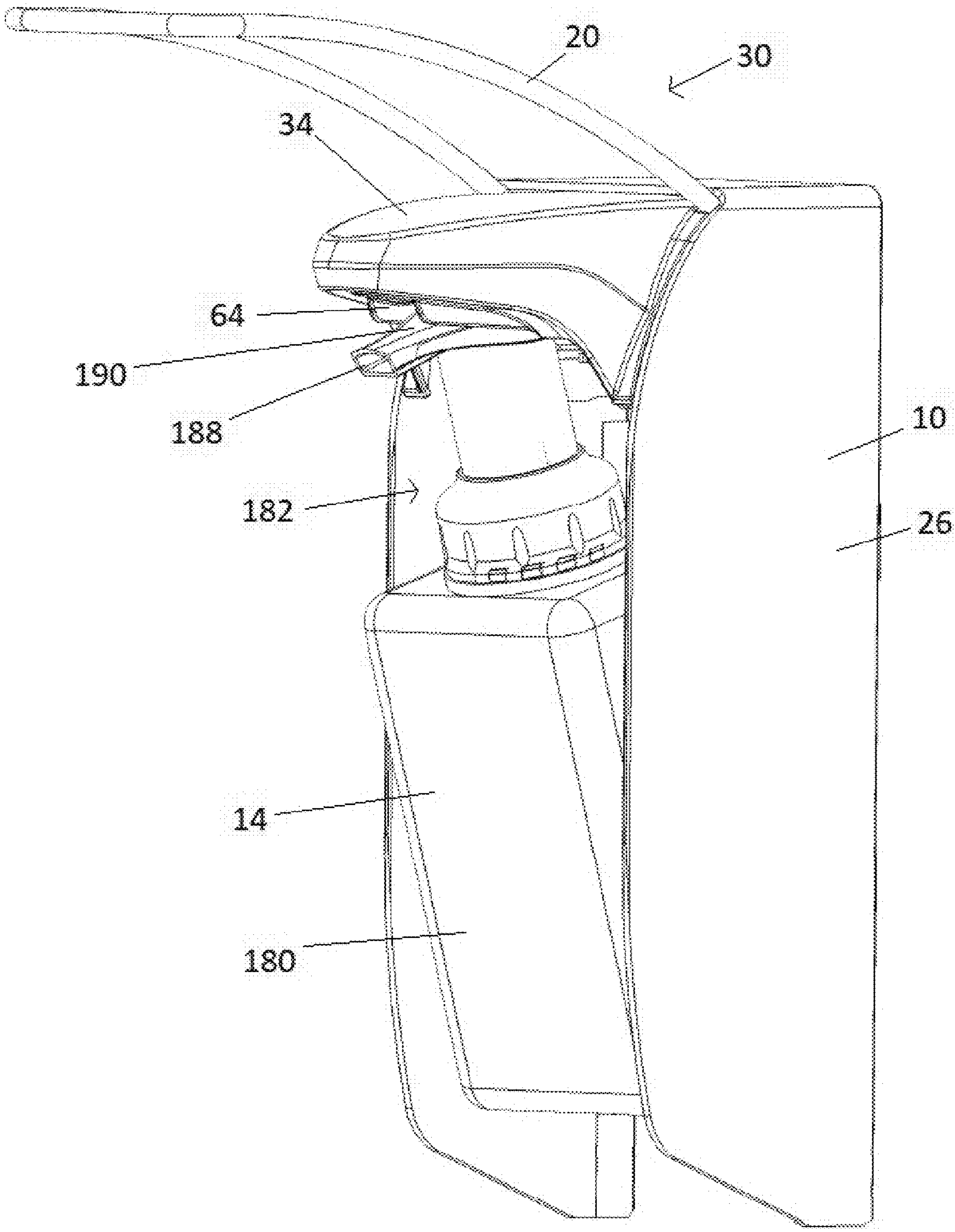
FIG. 42 is a perspective view of the fluid dispenser housing shown in FIG. 33 containing the first table top fluid dispenser shown in FIG. 41, with the lever shown in the raised position.

Similarly to the previous embodiments, the housing 10 is also able to receive the first table top fluid dispenser 14 for dispensing fluid 22 from the first table top fluid dispenser 14 in a housed mode, as shown in FIG. 42. To place the first table top fluid dispenser 14 in the housing 10, the first table top fluid dispenser 14 is held below the nose portion 304 of the face shield 34, and then raised until the activation member 190 is positioned within the second engagement portion 328 of the engagement member 64, with the top surface of the activation member 190 positioned adjacent to the second engagement surface 330. The bottom surface 184 of the bottle 180 is then placed on the foot portion 56 of the support member 32 to hold the first table top fluid dispenser 14 in place in the inner cavity 44 of the shroud 26. In some embodiments of the invention, the height of the foot portion 56 may be adjusted to position the first table top fluid dispenser 14 at the correct height relative to the engagement member 64. Alternatively, the height of the first table top fluid dispenser 14 may be selected to engage with the engagement member 64 without requiring adjustment of the support member 32.

The size and shape of the second engagement portion 328 of the engagement member 64 is selected to receive the activation member 190 of the first table top fluid dispenser 14, with the second engagement portion side surfaces 332 engaging with the activation member 190 to prevent the first table top fluid dispenser 14 from tipping forward and falling out of the housing 10.

Figure 43:
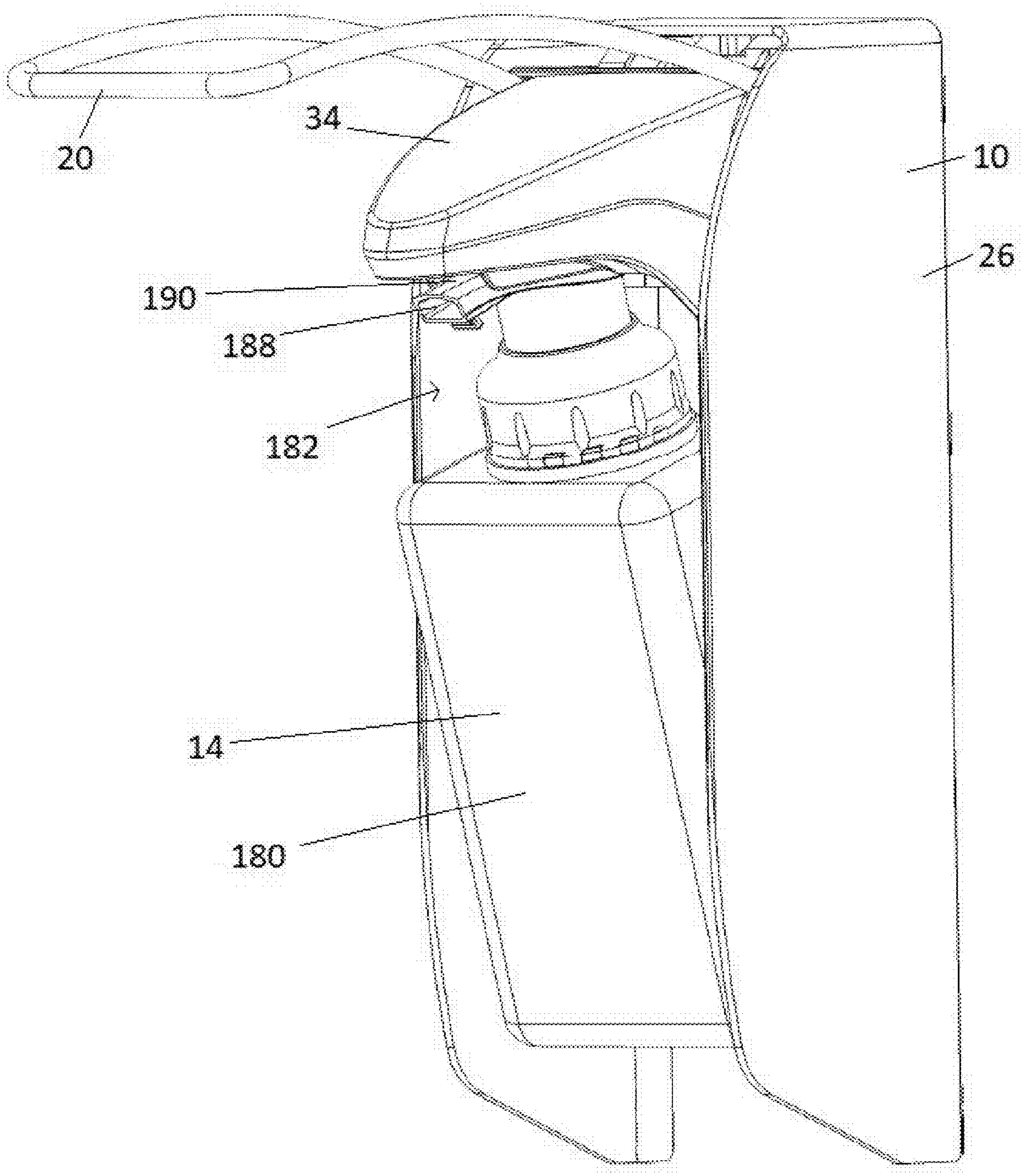
FIG. 43 is a perspective view of the fluid dispenser housing containing the first table top fluid dispenser shown in FIG. 42, with the lever shown in the lowered position.
Figure 44:
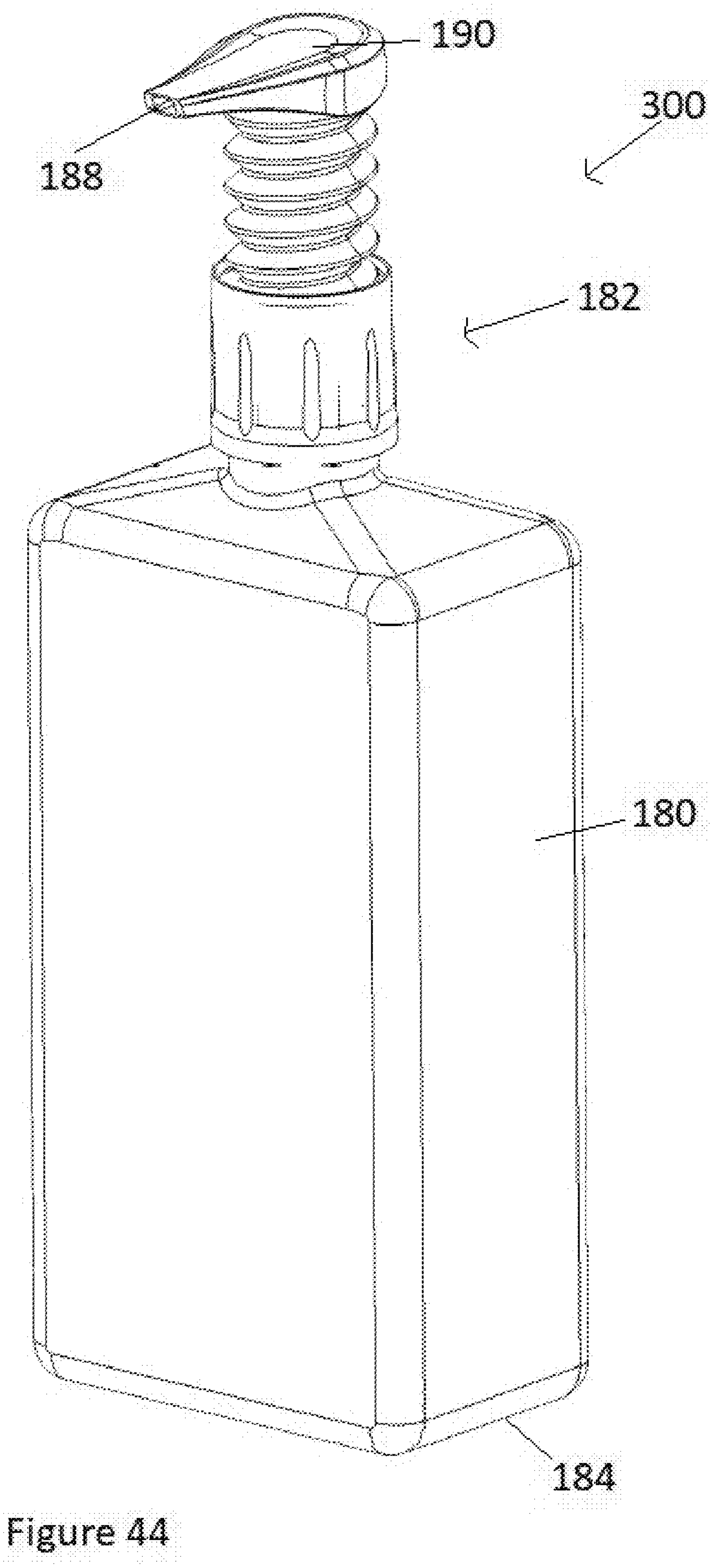
FIG. 44 is a perspective view of a second table top fluid dispenser suitable for use with the fluid dispenser housing shown in FIG. 33.

To activate the first table top fluid dispenser 14 in the housed mode, the actuator lever 20 is pivoted from the rest position shown in FIG. 43 to the depressed position shown in FIG. 44. The pivoting of the actuator lever 20 downwardly causes the face shield 34 and thus the engagement member 64 to pivot downwardly relative to the support member 32. The downwards movement of the engagement member 64 causes the second engagement surface 330 on the engagement member 64 to push downwardly on the top surface of the activation member 190, which causes the activation member 190 to move from the raised position to the depressed position. The movement of the activation member 190 from the raised position to the depressed position causes the pump mechanism 182 to dispense an allotment of the fluid 22 from the bottle 180.

When the actuator lever 20 is released, the springs 60 move the face shield 34 upwardly. As the force of the second engagement surface 330 pushing downwardly on the top surface of the activation member 190 is released, the internal biasing mechanism in the first table top fluid dispenser 14 causes the activation member 190 to return to the raised position.

The second table top fluid dispenser 300 is shown in FIG. 44, and also includes a bottle 180 and a pump mechanism 182. The bottle 180 contains a supply of fluid 22, which may be the same or different than the fluid 22 contained in the fluid reservoir 158 of the mountable fluid dispenser 12 and the fluid 22 contained in the bottle 180 of the first table top fluid dispenser 14. Optionally, the second table top fluid dispenser 300 is configured to dispense a lotion.

Similarly to the first table top fluid dispenser 14, the pump mechanism 182 of the second table top fluid dispenser 300 includes an activation member 190 that is manually depressible from a raised position to a depressed position. Upon movement of the activation member 190 from the raised position to the depressed position, the pump mechanism 182 dispenses an allotment of the fluid 22 out through a dispenser outlet 188 of the activation member 190. Preferably, the pump mechanism 182 includes a biasing mechanism that biases the activation member 190 towards the raised position, so that the activation member 190 does not need to be manually pulled upwardly from the depressed position to the raised position after each activation.

Figure 45:
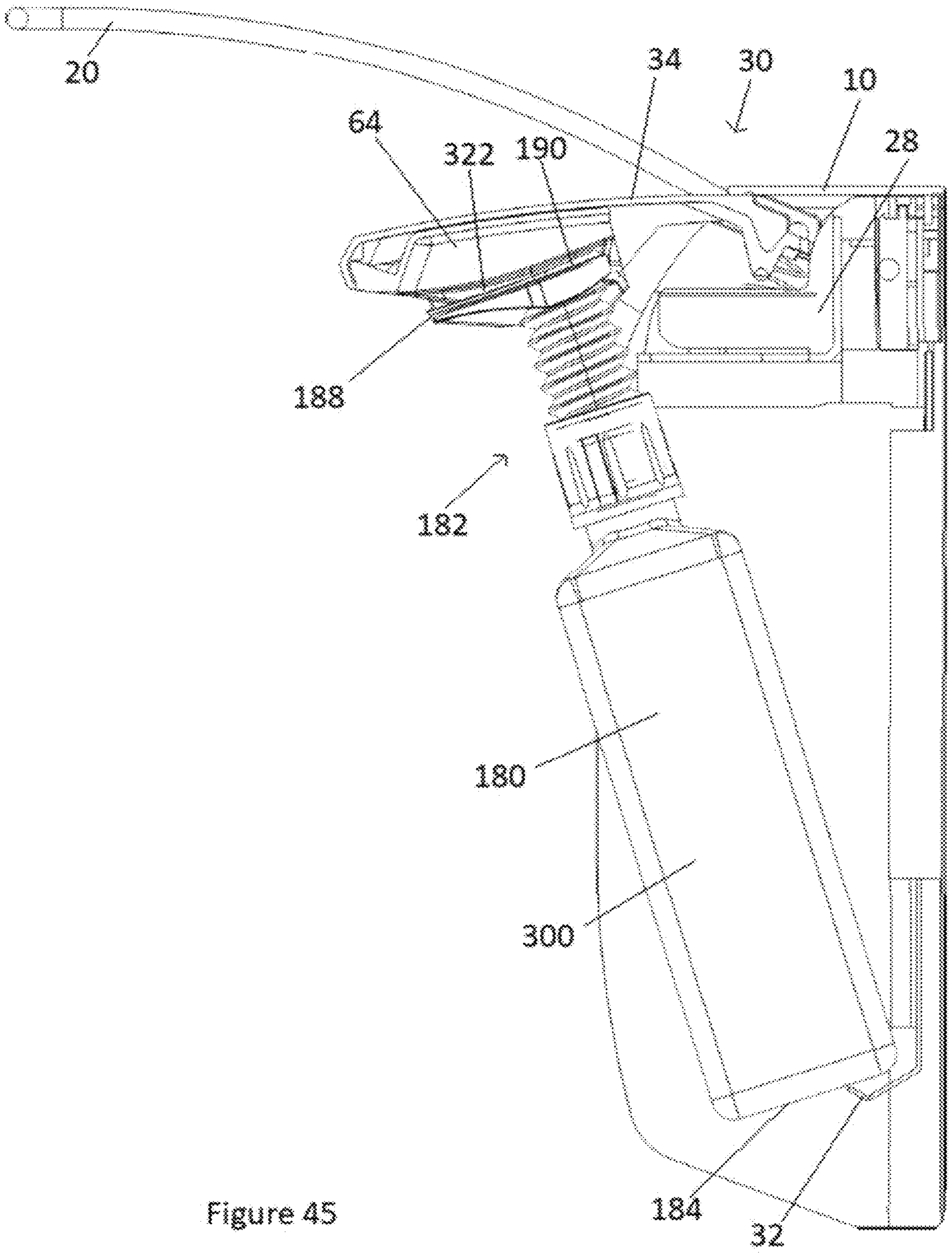
FIG. 45 is a partial cross-sectional side view of the fluid dispenser housing shown in FIG. 33 containing the second table top fluid dispenser shown in FIG. 44, with the lever shown in the raised position.
Figure 46:
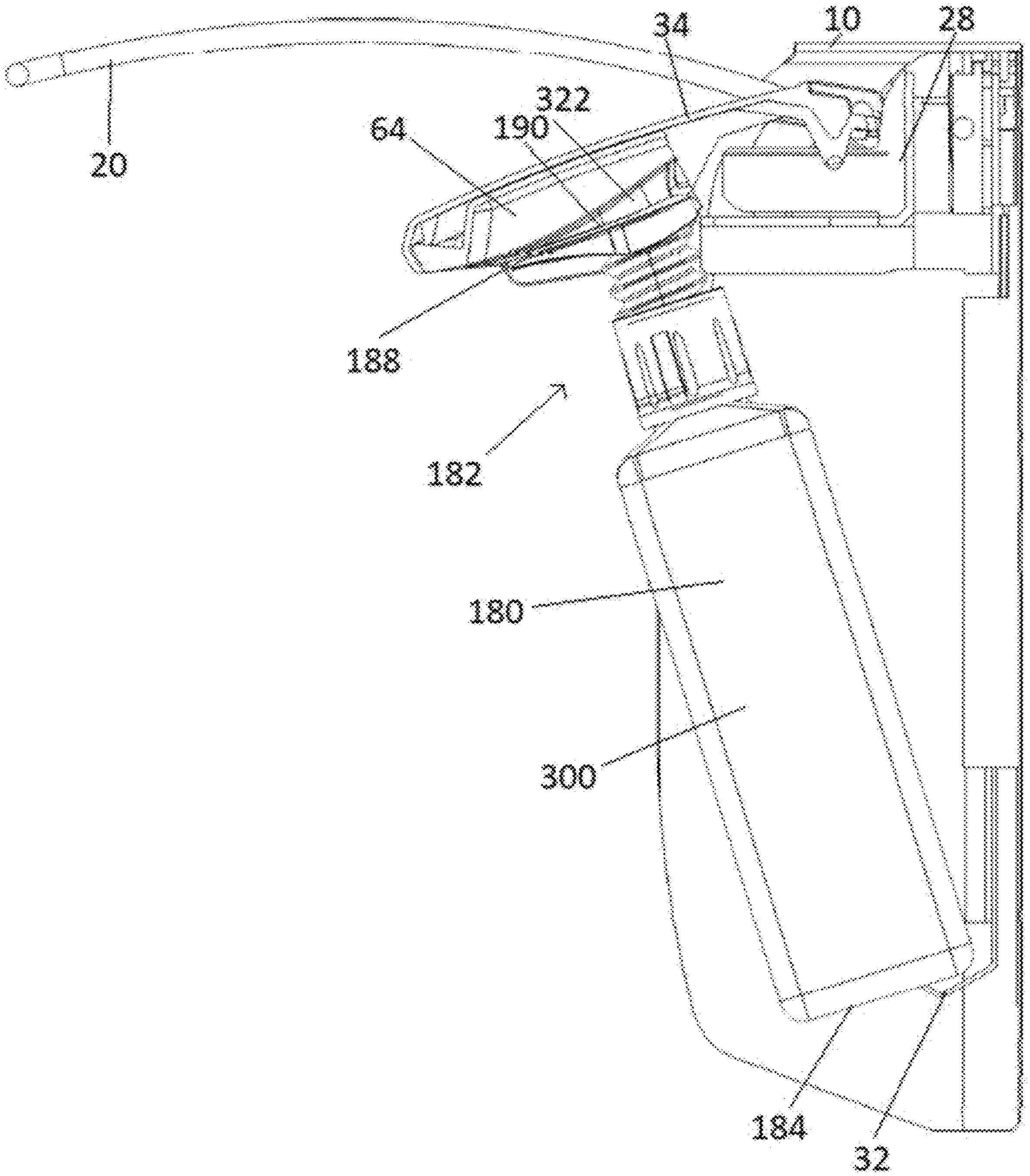
FIG. 46 is a partial cross-sectional side view of the fluid dispenser housing containing the second table top fluid dispenser shown in FIG. 45, with the lever shown in the lowered position.

The second table top fluid dispenser 300 can be operated to dispense fluid 22 in a stand-alone mode, or can be received by the housing 10 for operation in a housed mode, as shown in FIGS. 45 and 46.

To place the second table top fluid dispenser 300 in the housing 10, the second table top fluid dispenser 300 is held below the nose portion 304 of the face shield 34, and then raised until the activation member 190 is positioned within the first engagement portion 322 of the engagement member 64, with the top surface of the activation member 190 positioned adjacent to the first engagement surface 324. The bottom surface 184 of the bottle 180 is then placed on the foot portion 56 of the support member 32 to hold the second table top fluid dispenser 300 in place in the inner cavity 44 of the shroud 26. In some embodiments of the invention, the height of the foot portion 56 may optionally be adjusted to position the second table top fluid dispenser 300 at the correct height relative to the engagement member 64.

The size and shape of the first engagement portion 322 of the engagement member 64 is selected to receive the activation member 190 of the second table top fluid dispenser 300, with the first engagement portion side surfaces 326 engaging with the activation member 190 to prevent the second table top fluid dispenser 300 from tipping forward and falling out of the housing 10.

To activate the second table top fluid dispenser 300 in the housed mode, the actuator lever 20 is pivoted from the rest position shown in FIG. 45 to the depressed position shown in FIG. 46. The pivoting of the actuator lever 20 downwardly causes the face shield 34 and thus the engagement member 64 to pivot downwardly relative to the support member 32. The downwards movement of the engagement member 64 causes the first engagement surface 324 on the engagement member 64 to push downwardly on the top surface of the activation member 190, which causes the activation member 190 to move from the raised position to the depressed position. The movement of the activation member 190 from the raised position to the depressed position causes the pump mechanism 182 to dispense an allotment of the fluid 22 from the bottle 180.

When the actuator lever 20 is released, the springs 60 move the face shield 34 upwardly. As the force of the first engagement surface 324 pushing downwardly on the top surface of the activation member 190 is released, the internal biasing mechanism in the second table top fluid dispenser 300 causes the activation member 190 to return to the raised position.

The fluid dispensing system shown in FIGS. 33 to 46 has many of the same advantages as the systems depicted in FIGS. 1 to 32, including the ability to dispense fluid 22 from both mountable fluid dispensers 12 and table top fluid dispensers 14, 300 using the same housing 10. As in the previous embodiments, the engagement member 64 for engaging with the table top fluid dispensers 14, 300 does not interfere with the ability of the housing 10 to receive the mountable fluid dispenser 12.

Furthermore, in the third embodiment shown in FIGS. 33 to 46, use of the pivoting face shield 34 to activate the fluid dispensers 12, 14, 300 allows the actuation mechanism 30 to have a simplified construction, without requiring a separate actuation plate 58 and catch member 62. The pivoting face shield 34 also allows the engagement member 64 to be located entirely within the nose portion 304 of the face shield 34, away from the catch arms 96, 98 and the central drive member 78.

The fluid dispensing system in accordance with the third embodiment also allows multiple different table top fluid dispensers 14, 300 with actuation members 190 having different shapes and sizes to be received by the same housing 10. In embodiments in which the support member 32 is adjustable, the adjustable support member 32 furthermore allows the housing 10 to accommodate table top fluid dispensers 14, 300 having different heights.

An additional advantageous feature of the present invention is that it allows multiple fluid dispensers 12, 14, 300 having different stroke lengths to be activated by the same fluid dispenser housing 10. The stroke length refers to the distance that a moveable component of the pump mechanism 182, such as the activation member 190 or the piston forming element 162, moves when activated to dispense an allotment of fluid 22. For example, in the embodiment shown in FIGS. 33 to 52, the mountable fluid dispenser 12 has a stroke length of about 11 mm, the first table top fluid dispenser 14 has a stroke length of about 30 mm, and the second table top fluid dispenser 300 has a stroke length of about 30 mm.

The inventors have appreciated that in embodiments of the invention in which multiple pump engagement elements (e.g. the catch member 62, the first engagement portion 322, and the second engagement portion 328) are positioned along an engagement element carrying body (e.g. the face shield 34) that pivots about an axis 362 upon activation of the actuation mechanism 30, the distance that each of the pump engagement elements 62, 322, 328 travels upon activation of the actuation mechanism 30 is a function of the distance of the pump engagement element 62, 322, 328 from the axis 362. The location of each pump engagement element 62, 322, 328 can therefore be selected based on the stroke length of the fluid dispenser 12, 14, 300 that is to be activated by the pump engagement element 62, 322, 328.

For example, in the embodiment shown in FIGS. 33 to 46, the mountable fluid dispenser 12 has a relatively short stroke length of about 11 mm, and the catch member 62 for engaging with the mountable fluid dispenser 12 is therefore positioned relatively close to the face shield pivot axis 362. The first table top fluid dispenser 14 and the second table top fluid dispenser 300 have a relatively longer stroke length of about 30 mm, and so the first engagement portion 322 and the second engagement portion 328 are positioned relatively far from the face shield pivot axis 362.

In other embodiments of the invention, the pump engagement elements 62, 322, 328 could be positioned at different locations relative to the axis 362, in order to accommodate the stroke lengths of different fluid dispensers 12, 14, 300 to be received by the housing 10.

Figure 47:
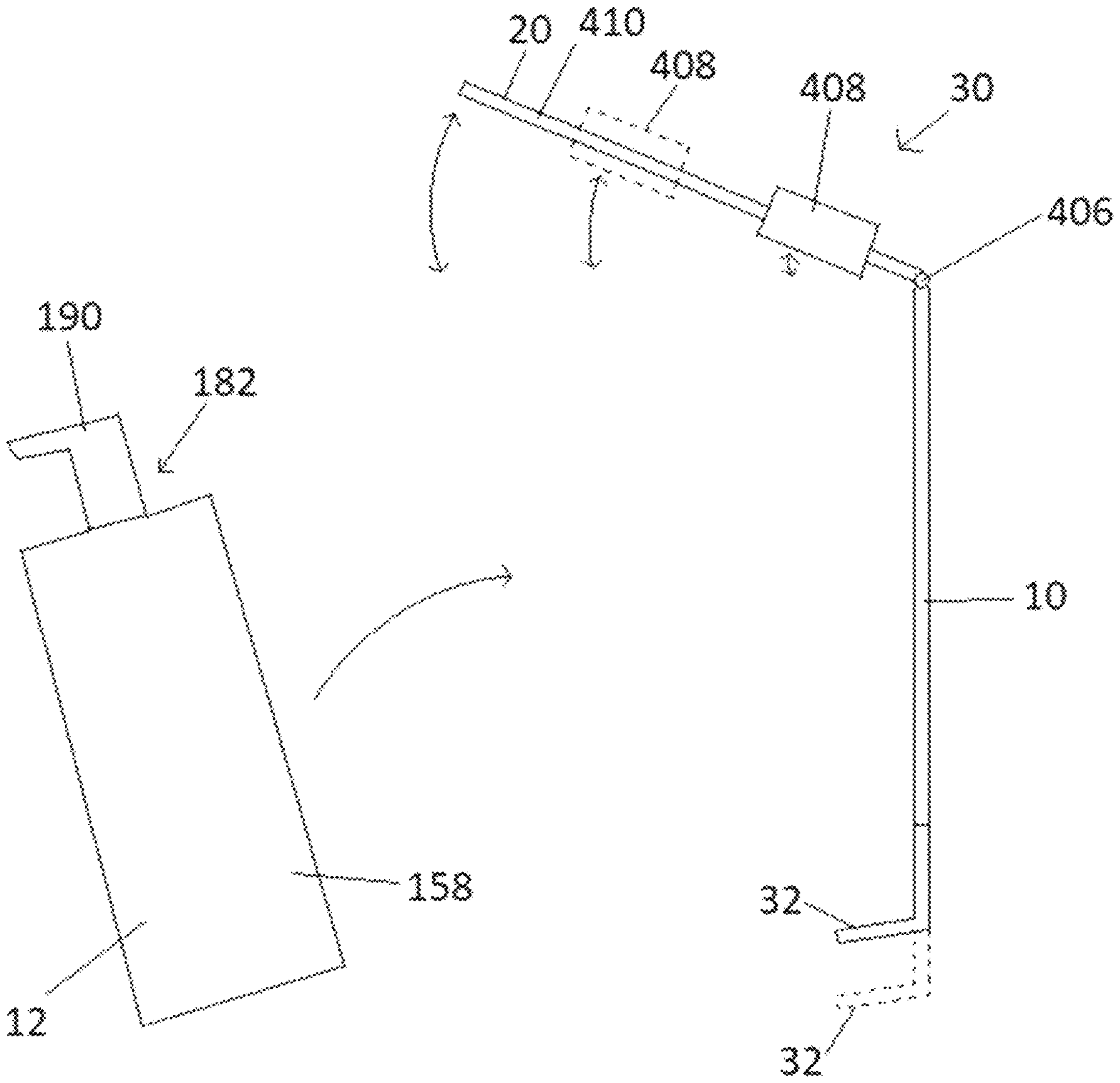
FIG. 47 is a schematic side view of a fluid dispensing system in accordance with a fourth embodiment of the present invention.

Reference is now made to FIG. 47, which schematically depicts a fluid dispensing system in accordance with a fourth embodiment of the present invention Like numerals are used to denote like components.

As in the previous embodiments, the fluid dispensing system shown in FIG. 47 includes a fluid dispenser housing 10 that is configured to receive one or more fluid dispensers 12. The housing 10 has an actuation mechanism 30 with an actuator lever 20 that is pivotable about an axis 406. The actuator lever 20 carries a pump engagement element 408 that is slideable along the lever 20 towards and away from the axis 406. The pump engagement element 408 may be locked at a selected position along the length of the lever 20 using any suitable locking mechanism. The actuator lever 20 functions as an engagement element carrying body 410. The housing 10 also has a support member 32. The support member 32 is preferably adjustable to select the height of the support member 32 relative to the axis 406.

The fluid dispenser or dispensers 12 to be received by the housing 10 have a fluid reservoir 158 that contains a fluid 22 to be dispensed, and a pump mechanism 182 for dispensing the fluid 22 from the reservoir 158. Similarly to the previous embodiments, the pump mechanism 182 has an activation member 190 that is depressed to activate the pump mechanism 182 to dispense the fluid 22.

The housing 10 is configured to receive the fluid dispenser 12, with the bottom surface 184 of the reservoir 158 resting on the support member 32, and with the activation member 190 received by the pump engagement element 408. The pump engagement element 408 preferably has a cavity, not shown, configured to receive the activation member 190 and to prevent the activation member 190 from falling forwardly out of the housing 10.

Figure 53:
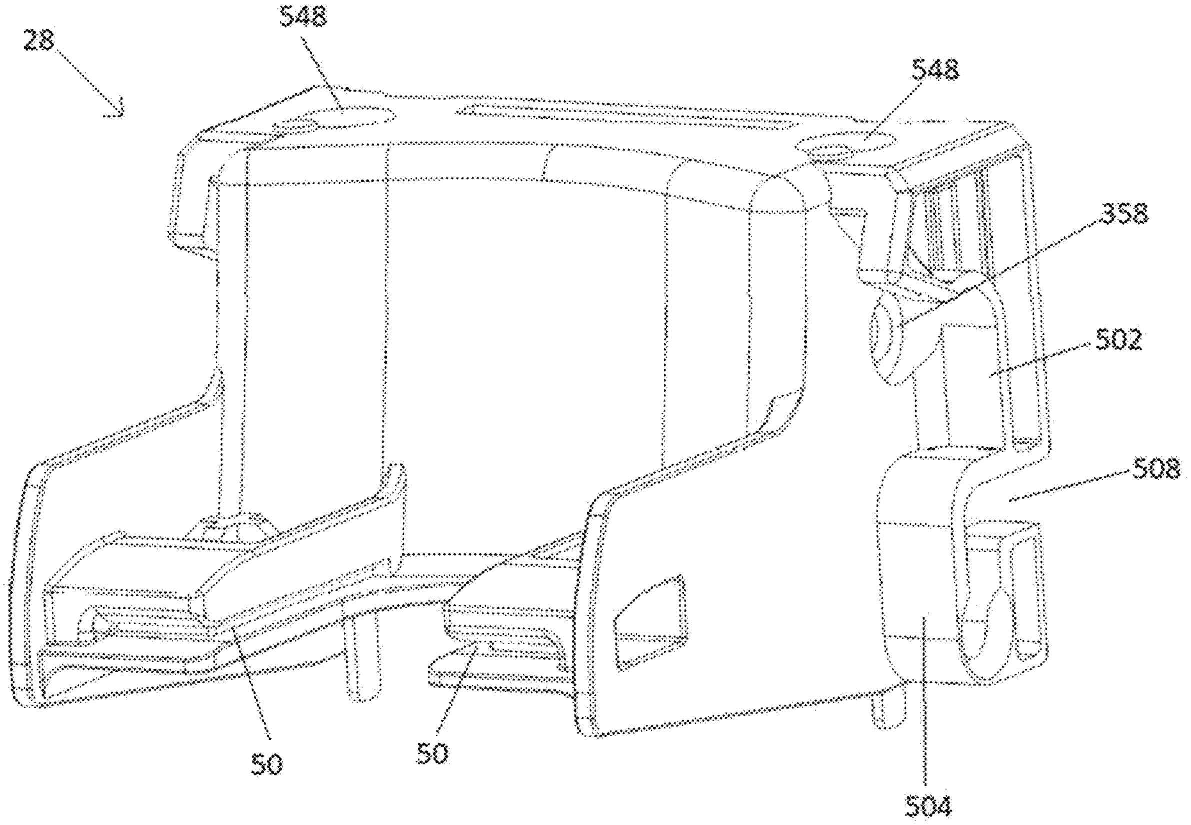
FIG. 53 is a front perspective view of a pump mounting body of the fluid dispenser housing shown in FIG. 48.

As can be seen by comparing the lengths of the arrows shown in FIG. 53, the distance that the pump engagement element 408 travels towards the support element 32 upon activation of the actuation mechanism 30 increases as the pump engagement element 408 moves away from the axis 406. The position of the pump engagement element 408 can therefore be selected to accommodate the stroke length of the fluid dispenser 12 to be received by the housing 10. The height of the support member 32 can furthermore be adjusted so that the activation member 190 of the fluid dispenser 12 engages with the pump engagement element 408 when the lever 20 is at the rest position.

The housing 10 can therefore accommodate a variety of different fluid dispensers 12 having different stroke lengths and bottle heights, by adjusting the position of the pump engagement element 408 along the length of the lever 20, and by adjusting the height of the support element 32. The housing 10 can also be used to adjust the volume of fluid 22 that is dispensed from a single fluid dispenser 12. In particular, the fluid dispenser 12 may have a stroke length that corresponds to a full depression of the activation member 190, causing a maximum dose of fluid 22 to be dispensed from the dispenser 12. By adjusting the position of the pump engagement element 408, the distance that the activation member 190 is depressed upon activation of the actuation mechanism 30 can be decreased to less than the full stroke length, thus resulting in a smaller dose of fluid 22 being dispensed.

Optionally, the pump engagement element 408 has a unique shape that is selected so that the pump engagement element 408 will only engage with an activation member 190 having a particular shape, so that for example only fluid dispensers 12 produced by a particular manufacturer can be received by the housing 10. Optionally, the pump engagement element 408 is removable from the lever 20, and can be replaced with a different pump engagement element 408 that will engage with an activation member 190 having a different shape. Optionally, the engagement element carrying body 410 can also carry multiple pump engagement elements 408 at the same time, the different pump engagement elements 408 for example being configured to engage with different types of fluid dispensers 12.

Reference is now made to FIGS. 48 to 69, which show a fluid dispensing system in accordance with a fifth embodiment of the present invention. The fluid dispensing system shown in FIGS. 48 to 69 is similar to the fluid dispensing system shown in FIGS. 33 to 46. To avoid repetition, only those features of the fluid dispensing system shown in FIGS. 48 to 69 that differ from the fluid dispensing system shown in FIGS. 33 to 46 are described in detail. Like numerals are used to denote like components.

The fluid dispensing system shown in FIGS. 48 to 69 includes a fluid dispenser housing 10, a mountable fluid dispenser 12, a first table top fluid dispenser 14, and a second table top fluid dispenser 300. The fluid dispenser housing 10 has a shroud 26, a pump mounting body 28, an actuation mechanism 30, and a support member 32.

Figure 54:
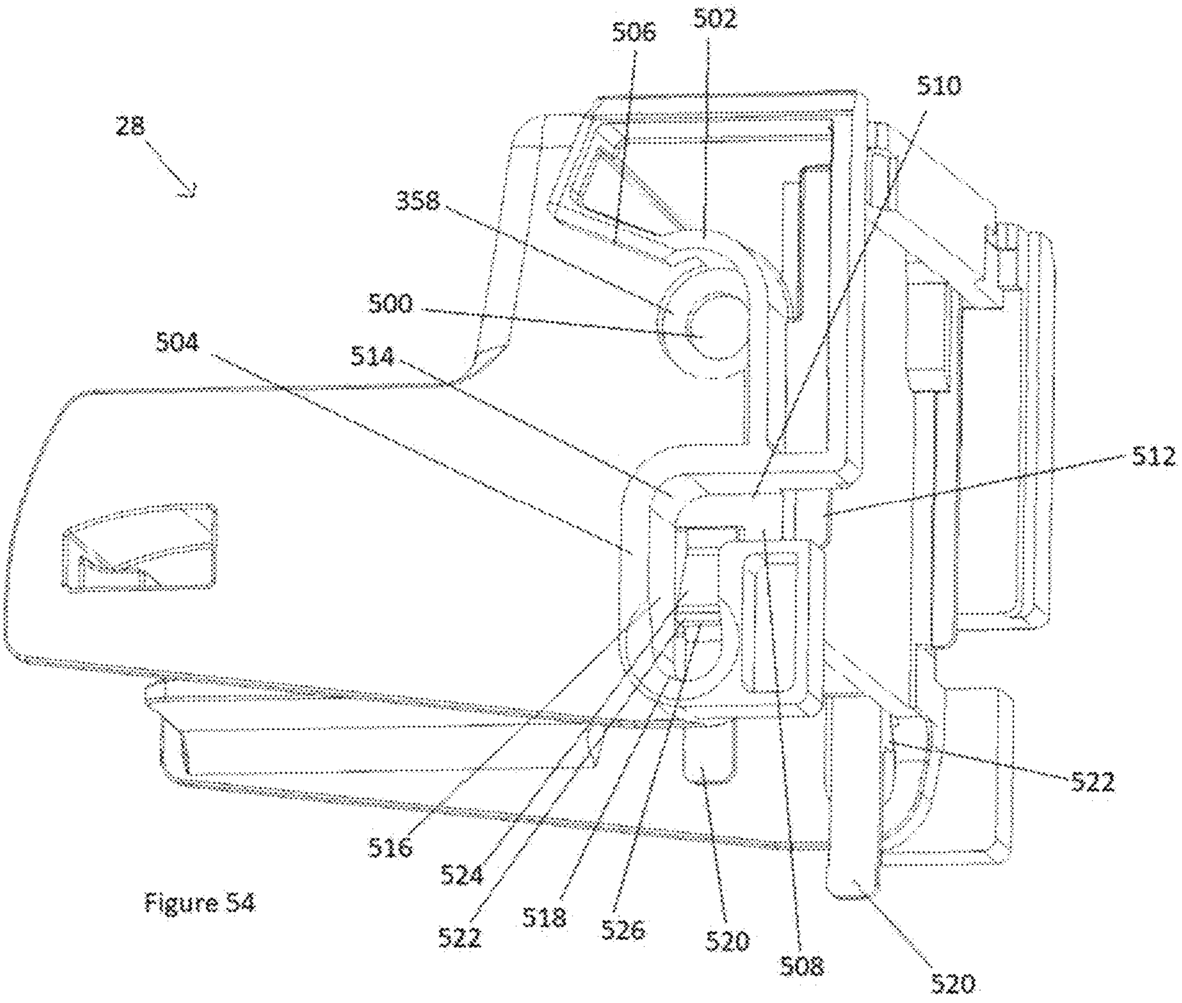
FIG. 54 is a side perspective view of the pump mounting body shown in FIG. 53.
Figure 55:
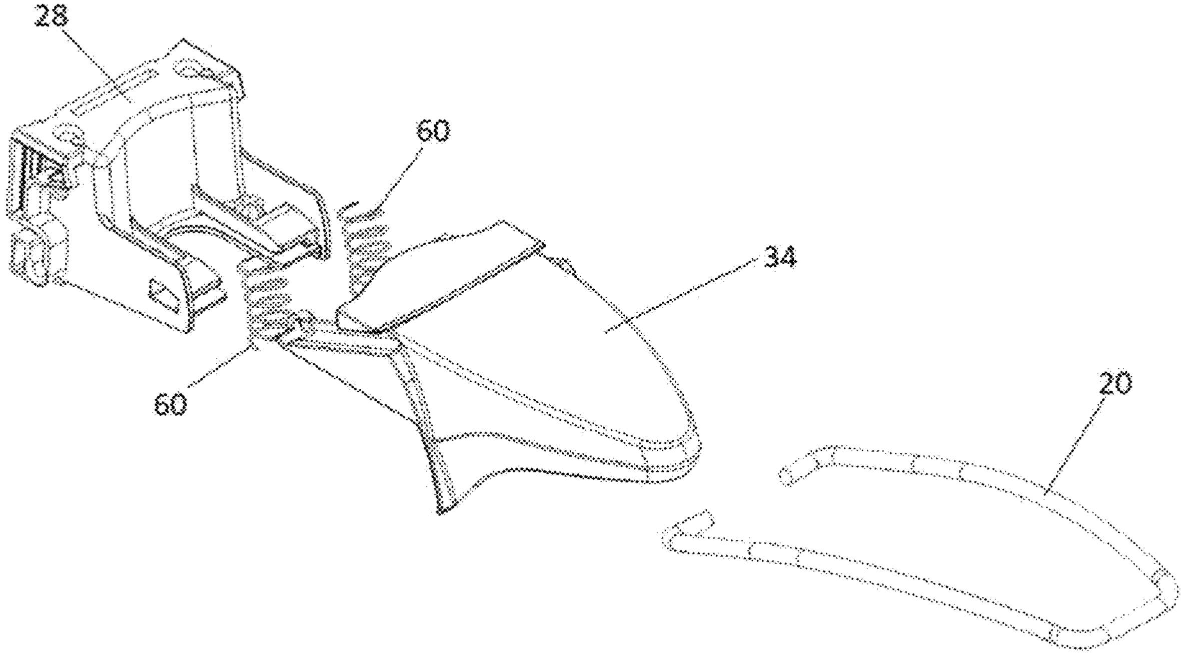
FIG. 55 is an exploded view of a pump actuation mechanism assembly of the fluid dispenser housing shown in FIG. 48.

The pump mounting body 28 is best shown in FIGS. 53 and 54. Similarly to the previous embodiments, the pump mounting body 28 defines two horizontal slots 50 for receiving a pair of mounting fingers 52 that extend laterally outwardly from a fluid pump 54 of the mountable fluid dispenser 12.

As can be seen in FIG. 54, the pump mounting body 28 has a face shield mounting hole 358 on the right side of the pump mounting body 28, with a smaller lever receiving hole 500 positioned at the center of the face shield mounting hole 358. The right side of the pump mounting body 28 also has an upper wall portion 502 and a lower wall portion 504. The upper wall portion 502 has an upper lever engagement surface 506 that extends upwardly and forwardly from the face shield mounting hole 358.

The lower wall portion 504 defines a stud engagement channel 508. The stud engagement channel 508 has a horizontal section 510 and a vertical section 516. The horizontal section 510 has an open back end 512 and extends forwardly from the open back end 512 to a corner 514. The vertical section 516 extends downwardly from the corner 514 to a closed bottom end 518.

Although not visible in the drawings, the left side of the pump mounting body 28 has an identical construction, including a face shield mounting hole 358, a lever receiving hole 500, an upper wall portion 502 with an upper lever engagement surface 506, and a lower wall portion 504 that defines a stud engagement channel 508 with a horizontal section 510, an open back end 512, a corner 514, a vertical section 516, and a closed bottom end 518.

As can be seen in FIG. 53, the top of the pump mounting body 28 also has two stud receiving channels 548 that are open upwardly.

As can been seen in FIG. 54, the pump mounting body 28 has two stud locking members 520 that extend downwardly on the laterally inner side of the stud engagement channels 508 adjacent to the vertical sections 516. Each of the stud locking members 520 has a laterally outwardly directed stud locking finger 522 that is positioned above the closed bottom end 518 of the adjacent stud engagement channel 508. The stud locking fingers 522 have an inclined upper surface 524 and a downwardly directed stud locking surface 526.

The stud locking members 520 are resiliently deflectable from the locking position shown in FIG. 54 to an unlocked position, not shown, by applying a laterally inwardly directed force to the stud locking members 520 to deflect the stud locking members 520 laterally inwardly away from the stud engagement channels 508. The stud locking members 520 are biased to return to the locking position as shown in FIG. 54 upon removal of the laterally inwardly directed force. The laterally inwardly directed force may be applied, for example, by manually pinching the two stud locking members 520 towards each other.

The actuation mechanism 30 includes an actuator lever 20, a face shield 34, and two springs 60. The actuator lever 20 is identical to the actuator lever 20 shown in the previous embodiments.

Figure 49:
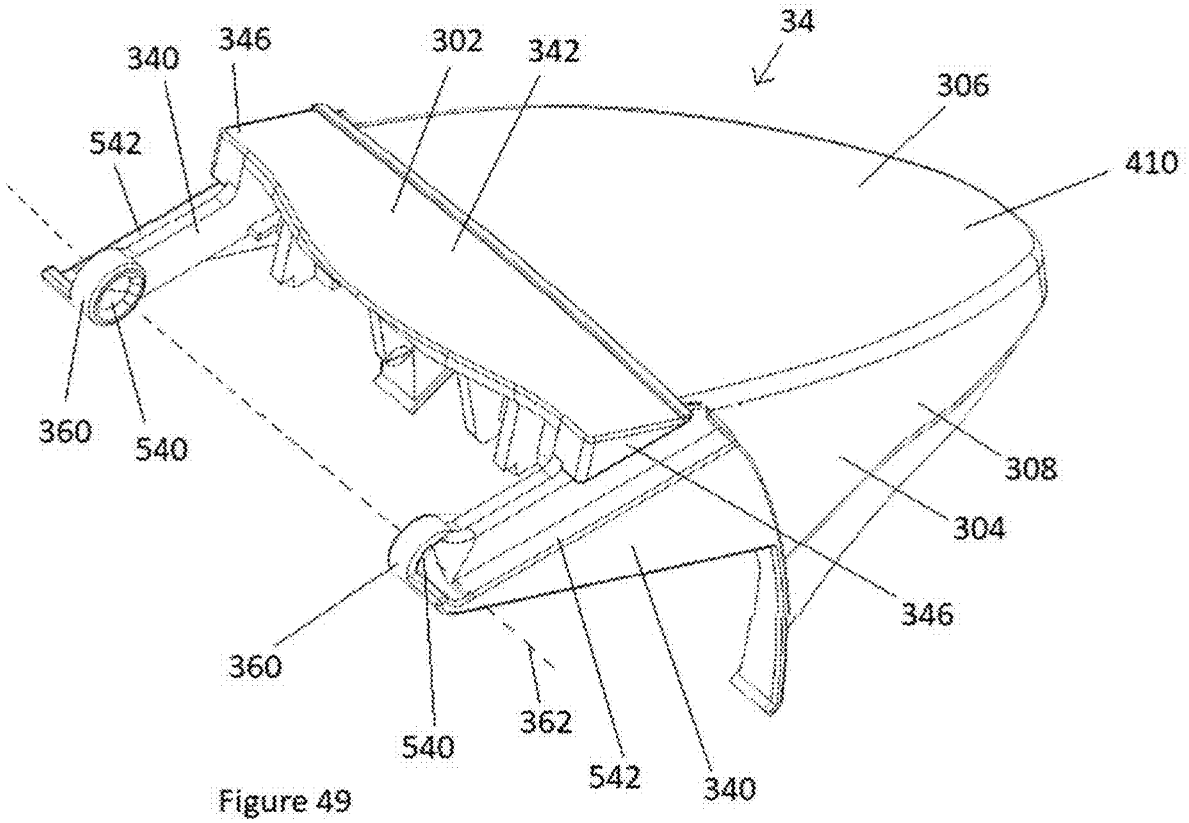
FIG. 49 is a top perspective view of a face shield of the fluid dispenser housing shown in FIG. 48.
Figure 50:
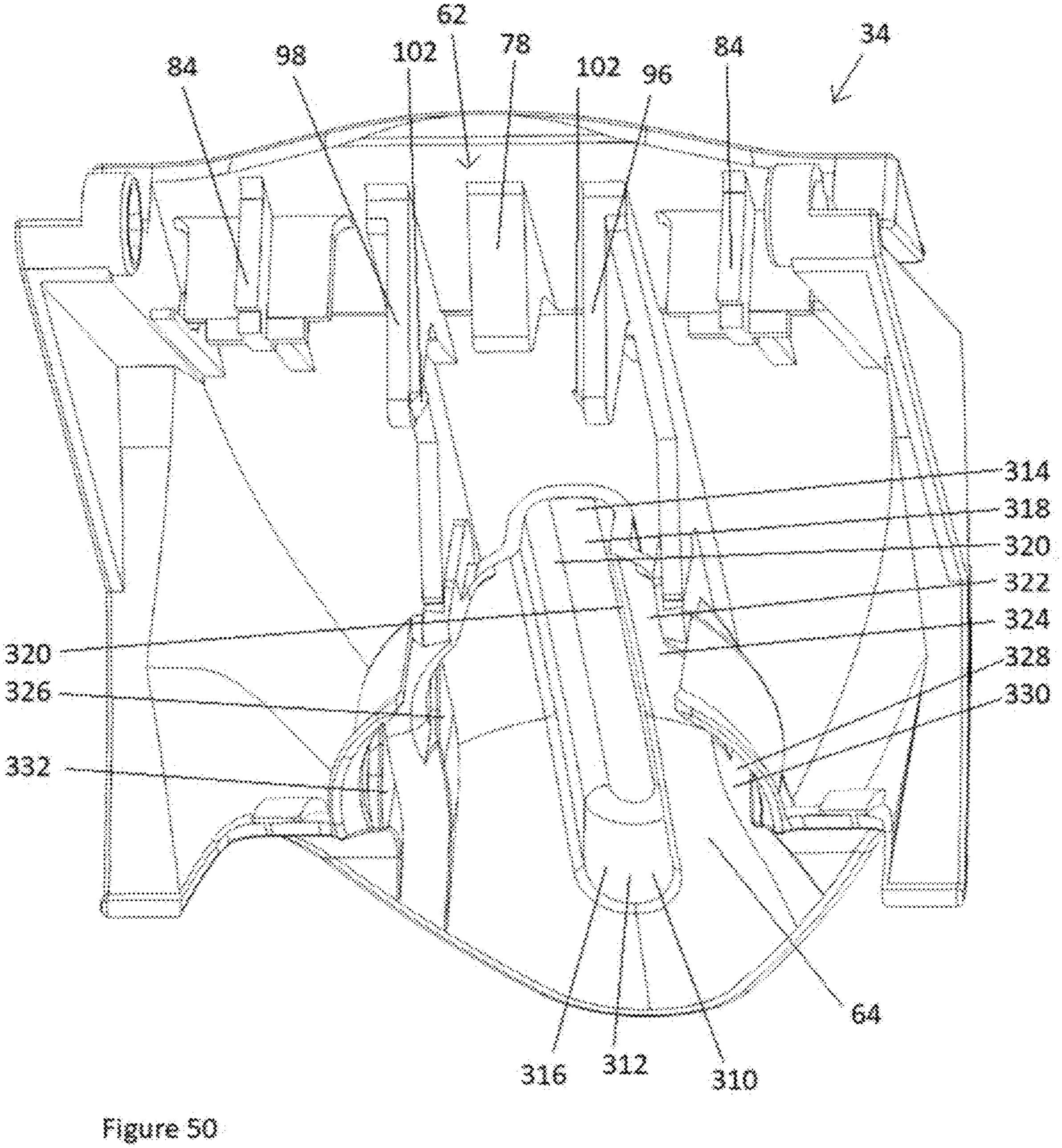
FIG. 50 is a rear perspective view of the face shield shown in FIG. 49.
Figure 51:
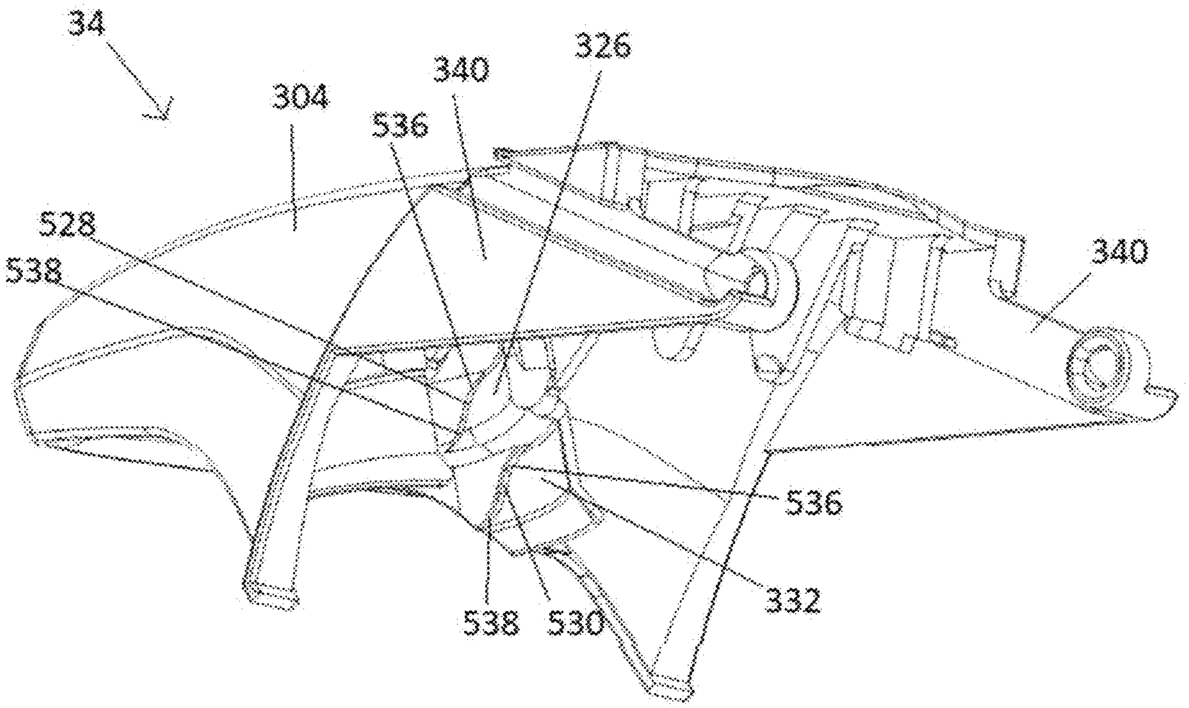
FIG. 51 is a side perspective view of the face shield shown in FIG. 49.
Figure 52:
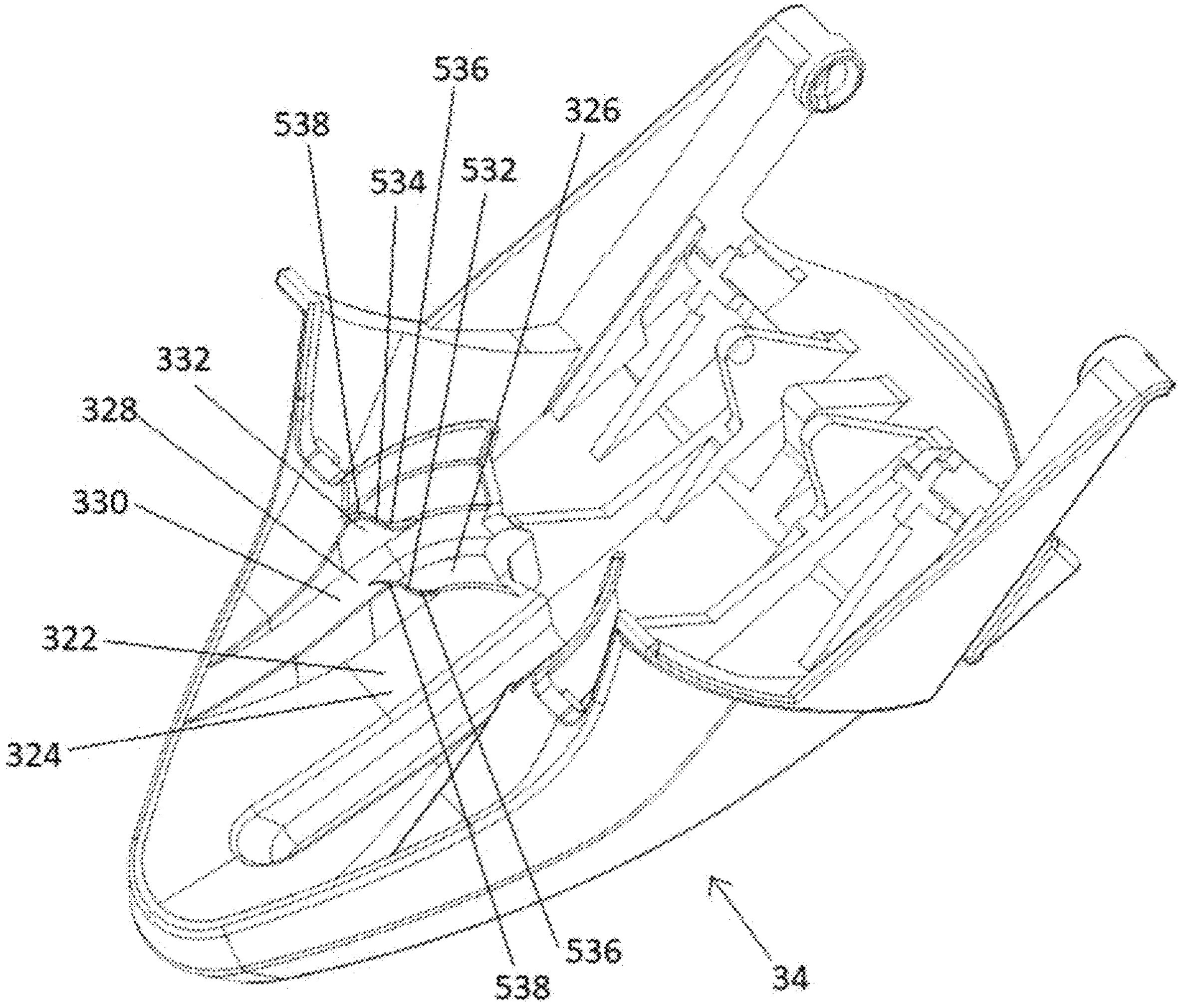
FIG. 52 is a bottom perspective view of the face shield shown in FIG. 49.

The face shield 34 is best shown in FIGS. 49 to 52. The face shield 34 includes a nose portion 304, which extends forwardly from the shroud 26, and a housing attachment portion 302, which is positioned below the top wall 36 of the shroud 26. The nose portion 304 has an upper wall 306 and two side walls 308. As can be seen in FIGS. 50 to 52, an engagement member 64 is positioned adjacent to the underside of the upper wall 306. The engagement member 64 may be integrally formed with the rest of the face shield 34, or optionally could be a separate component that is attached to the nose portion 304 with a snap fit, for example.

Similarly to the embodiment shown in FIGS. 33 to 46, the engagement member 64 defines a central cavity 310 with a stepped construction. The central cavity 310 has a central channel 312 with an open rear end 314 and a closed front end 316. The central channel 312 has a top surface 318 that is positioned near the upper wall 306 of the face shield 34. Two channel side surfaces 320 extend downwardly from the top surface 318, with the central channel 312 being defined between the top surface 318 and the channel side surfaces 320.

The central cavity 310 also has a first engagement portion 322 that is positioned below the central channel 312. The first engagement portion 322 has a first engagement surface 324 that extends laterally outwardly from the two channel side surfaces 320 of the central channel 312. Two first engagement portion side surfaces 326 extend downwardly from the first engagement surface 324.

The central cavity 310 also has a second engagement portion 328 that is positioned below the first engagement portion 322. The second engagement portion 328 has a second engagement surface 330 that extends laterally outwardly from the two first engagement portion side surfaces 326. Two second engagement portion side surfaces 332 extend downwardly from the second engagement surface 330.

As can be seen in FIG. 51, the left side surface 326 of the first engagement portion 322 has a rearwardly facing upper left support surface 528, and the left side surface 332 of the second engagement portion 328 has a rearwardly facing lower left support surface 530. As can be seen in FIG. 52, the right side surface 326 of the first engagement portion 322 has a rearwardly facing upper right support surface 532, and the right side surface 332 of the second engagement portion 328 has a rearwardly facing lower right support surface 534.

Each of the upper left support surface 528, the lower left support surface 530, the upper right support surface 532, and the lower right support surface 534 has a wave-like contour, and are sloped so as to extend upwardly as they extend rearwardly. The upper left support surface 528, the lower left support surface 530, the upper right support surface 532, and the lower right support surface 534 each have a top portion 536 and a bottom portion 538, the top portion 536 being positioned upwardly and rearwardly relative to the bottom portion 538.

The housing attachment portion 302 has two arms 340 that extends rearwardly from the side walls 308 of the nose portion 304, and a central body 342 that extends between the two arms 340 adjacent to the upper wall 306 of the nose portion 304. As can be seen in FIG. 49, at the end of each arm 340 there is a laterally inwardly extended cylindrical mounting finger 360. The mounting fingers 360 extend along a face shield pivot axis 362, and are configured to engage with the face shield mounting holes 358 in the pump mounting body 28 so as to permit the face shield 34 to pivot relative to the pump mounting body 28 about the axis 362.

As can be seen in FIG. 49, each of the mounting fingers 360 has a lever receiving aperture 540 for receiving the laterally inwardly extending ends of the lever 20. Each arm 340 also has an upwardly facing lower lever engagement surface 542 that extends along the length of the arm 340 from the nose portion 304 to the mounting finger 360. The central body 342 has upper tabs 346 that extend laterally outwardly spaced above the lower lever engagement surfaces 542.

As best shown in FIG. 50, the face shield 34 has a central drive member 78 that extends downwardly near the center of the central body 342; two catch arms 96, 98 spaced laterally outwardly from the central drive member 78 that extend downwardly; and two spring receiving members 84 spaced laterally outwardly from the catch arms 96, 98 that also extend downwardly. Each catch arm 96, 98 has a catch finger 102 that projects laterally inwardly and presents an upwardly directed catch surface 104. As in the previous embodiments, the catch arms 96, 98 are resiliently deflectable. Together, the catch arms 96, 98 and the central drive member 78 function as a catch member 62 for engaging with a catching member 170 of the mountable fluid dispenser 12, in the same way as in the embodiment shown in FIGS. 33 to 46.

Figure 56:
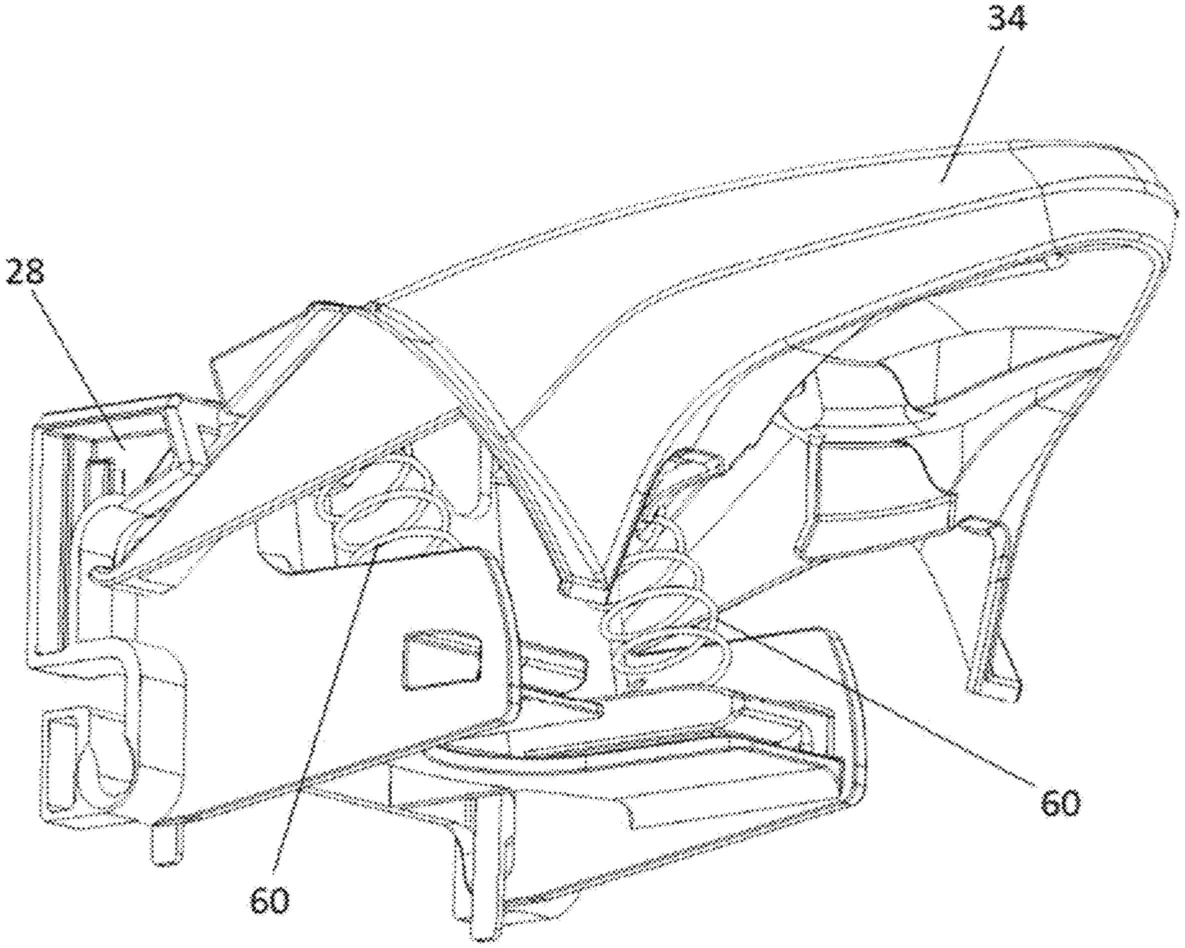
FIG. 56 is a perspective view of the pump actuation mechanism assembly shown in FIG. 55 in a partially assembled state.
Figure 57:
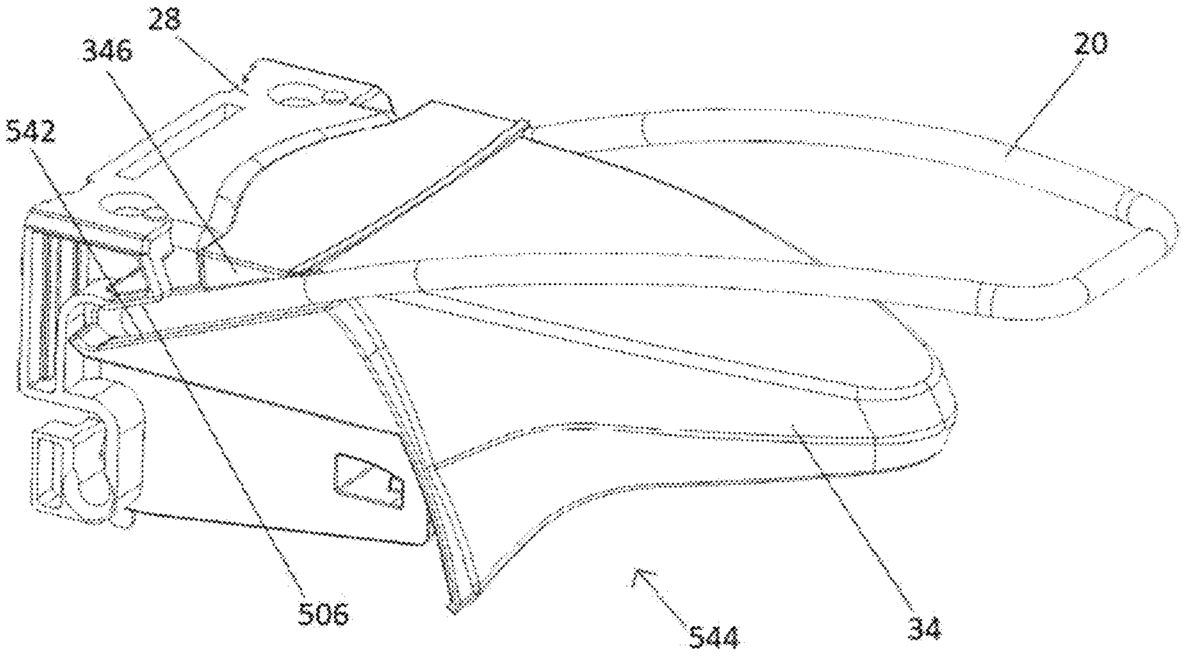
FIG. 57 is a perspective view of the pump actuation mechanism assembly shown in FIG. 55 in an assembled state.

In the embodiment shown in FIGS. 48 to 69, the pump mounting body 28, the face shield 34, the lever 20, and the springs 60 are configured to be assembled into a pump actuation mechanism assembly 544 as shown in FIG. 57. Advantageously, the pump actuation mechanism assembly 544 can be easily mounted to the shroud 26 and removed from the shroud 26 without requiring the use of tools. This preferably gives the fluid dispenser housing 10 a modular design that allows the pump actuation mechanism assembly 544 to be easily removed and replaced, for example if the components need to be repaired or if an upgraded pump actuation mechanism assembly 544 having enhanced features, such as touchless activation, is to be installed. Being able to easily separate the pump actuation mechanism assembly 544 from the shroud 26 also preferably makes it easier to recycle the fluid dispenser housing 10 and the components thereof.

To assemble the pump actuation mechanism assembly 544, the face shield 34 is first mounted to the pump mounting body 28 by sliding the mounting fingers 360 of the face shield 34 into the face shield mounting holes 358 of the pump mounting body 28. The springs are then inserted from the front, so as to extend between the pump mounting body 28 and the spring receiving members 84 of the face shield 34. The springs 60 bias the face shield 34 upwardly relative to the pump mounting body 28, as shown in FIG. 56. The laterally inwardly extending ends of the lever 20 are then inserted through the lever receiving apertures 540 of the mounting fingers 360, and into the lever receiving holes 500 of the pump mounting body 28. As can be seen in FIG. 57, the cylindrical arms of the lever 20 are placed between the upper lever engagement surface 506 of the pump mounting body 28 and the lower lever engagement surface 542 of the face shield 34, which pivots the face shield 34 downwardly from the raised position shown in FIG. 56. The cylindrical arms of the lever 20 also extend between the upper tabs 346 of the central body 342 and the lower lever engagement surfaces 542 on the arms 340 of the face shield 34.

Figure 58:
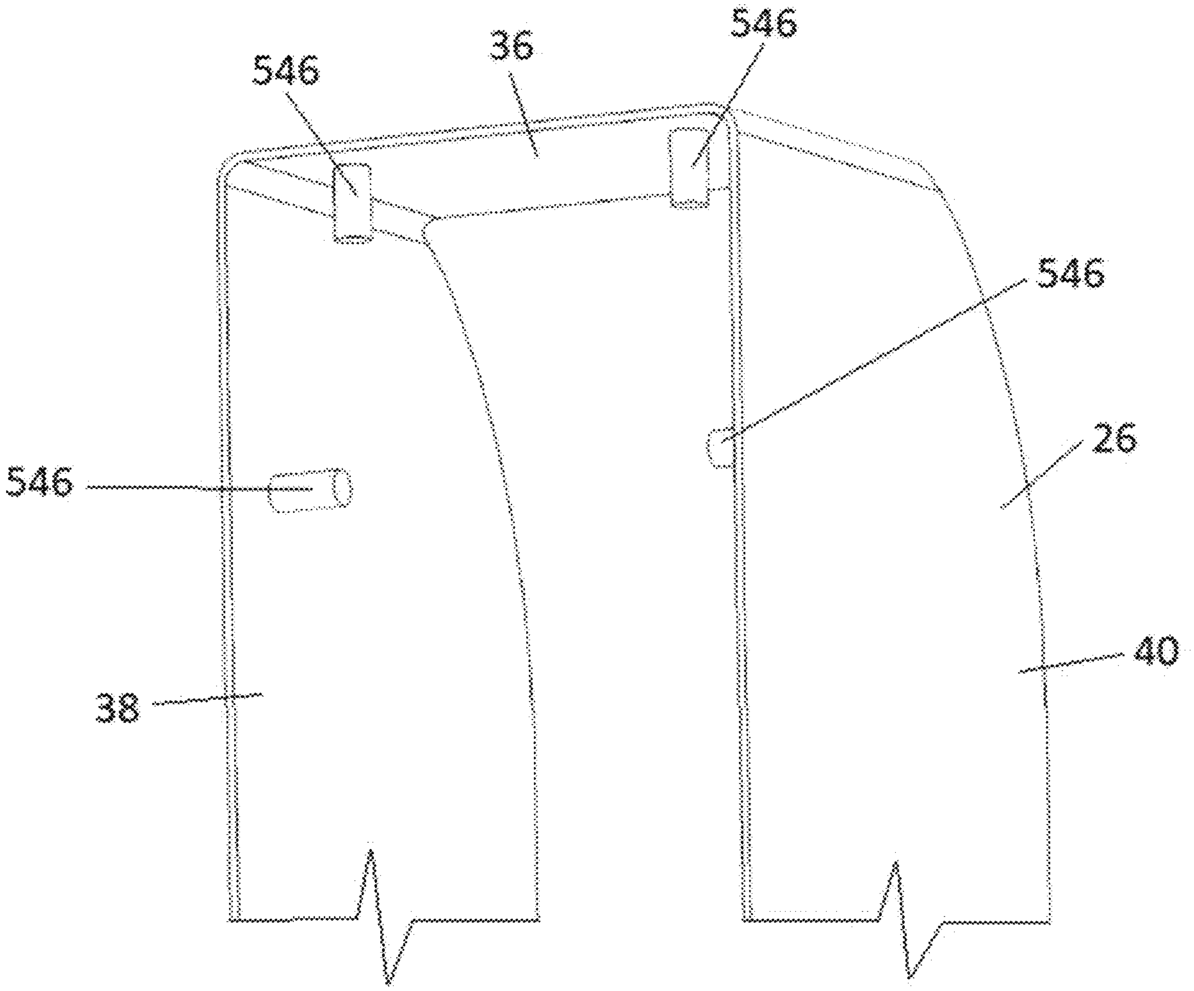
FIG. 58 is a rear perspective view of a top portion of the top wall and the side walls of a shroud of the fluid dispenser housing shown in FIG. 48.

As can be seen in FIG. 58, the right side wall 38 of the shroud 26 has a stud 546 that extends laterally inwardly; the top wall 36 of the shroud 26 has two studs 546 that extend downwardly; and the left side wall 40 of the shroud 26 has a stud 546 that extends laterally inwardly. The pump actuation mechanism assembly 544 is configured to engage with the studs 546 to mount the pump actuation mechanism assembly 544 to the top portion of the shroud 26, in the manner as described below.

Figure 59:
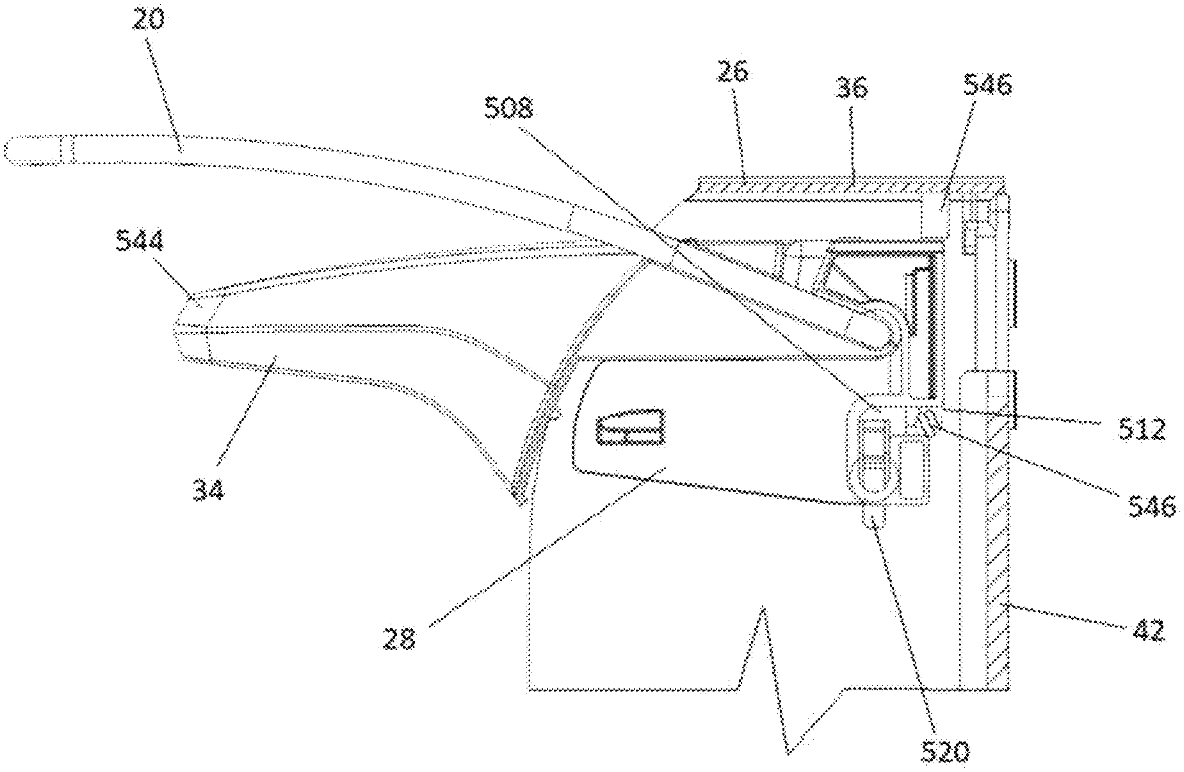
FIG. 59 is a cross-sectional side view of the top portion of the fluid dispenser housing shown in FIG. 48, showing a first step in attaching the pump actuation mechanism assembly shown in FIG. 57 to the shroud shown in FIG. 58.

Once the pump actuation mechanism assembly 544 is fully assembled as shown in FIG. 57, the pump actuation mechanism assembly 544 is inserted rearwardly into the inner cavity 44 of the shroud 26, with the open back ends 512 of the stud engagement channels 508 aligned with the studs 546 extending laterally inwardly from the side walls 38, 40 of the shroud 26, as shown in FIG. 59.

Figure 60:
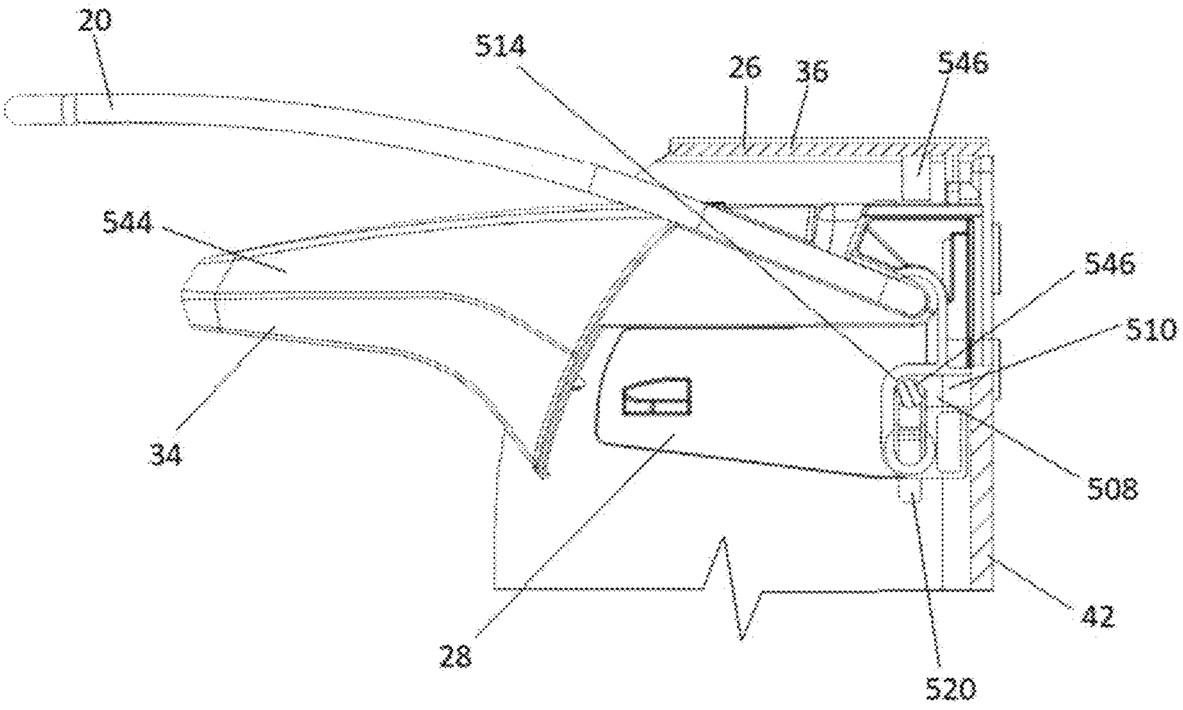
FIG. 60 is a cross-sectional side view of the top portion of the fluid dispenser housing shown in FIG. 48, showing a second step in attaching the pump actuation mechanism assembly shown in FIG. 57 to the shroud shown in FIG. 58.

The pump actuation mechanism assembly 544 is then inserted further rearwardly so that the studs 546 extending laterally inwardly from the side walls 38, 40 pass through the open back ends 512 of the stud engagement channels 508, and across the horizontal sections 510 of the stud engagement channels 508 to the corners 514, as shown in FIG. 60.

Figure 61:
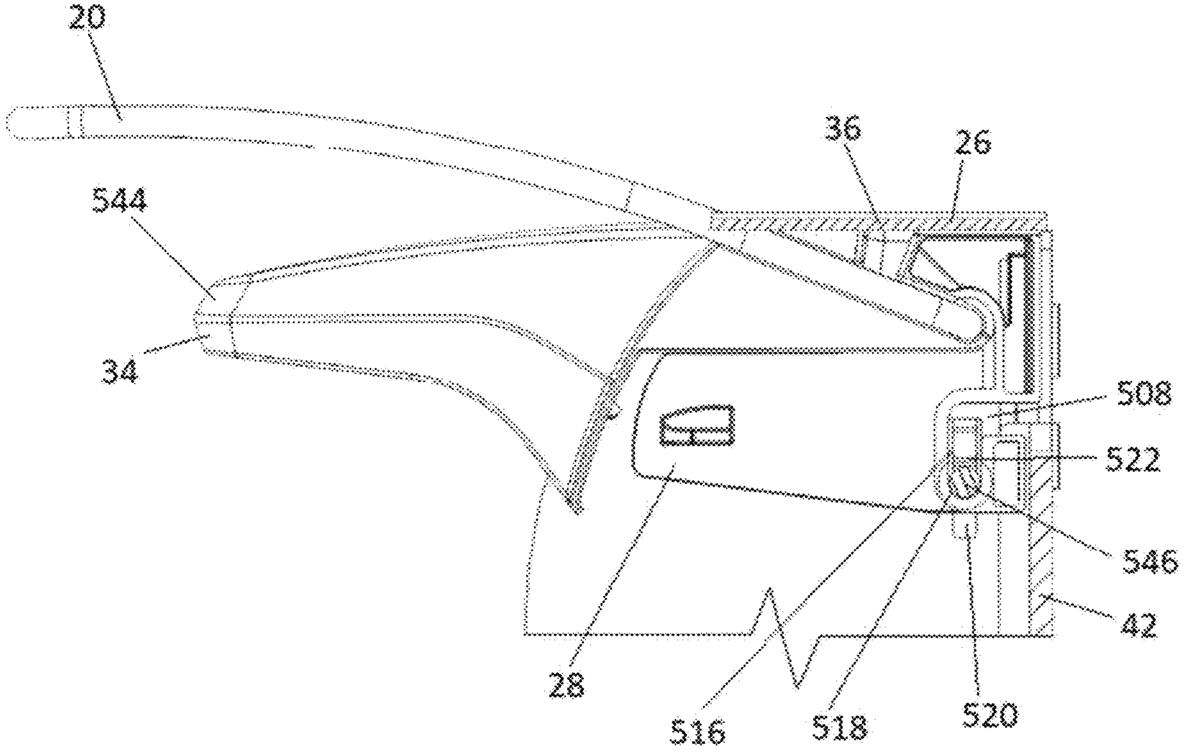
FIG. 61 is a cross-sectional side view of the top portion of the fluid dispenser housing shown in FIG. 48, showing the pump actuation mechanism assembly shown in FIG. 57 attached to the shroud shown in FIG. 58.
Figure 62:
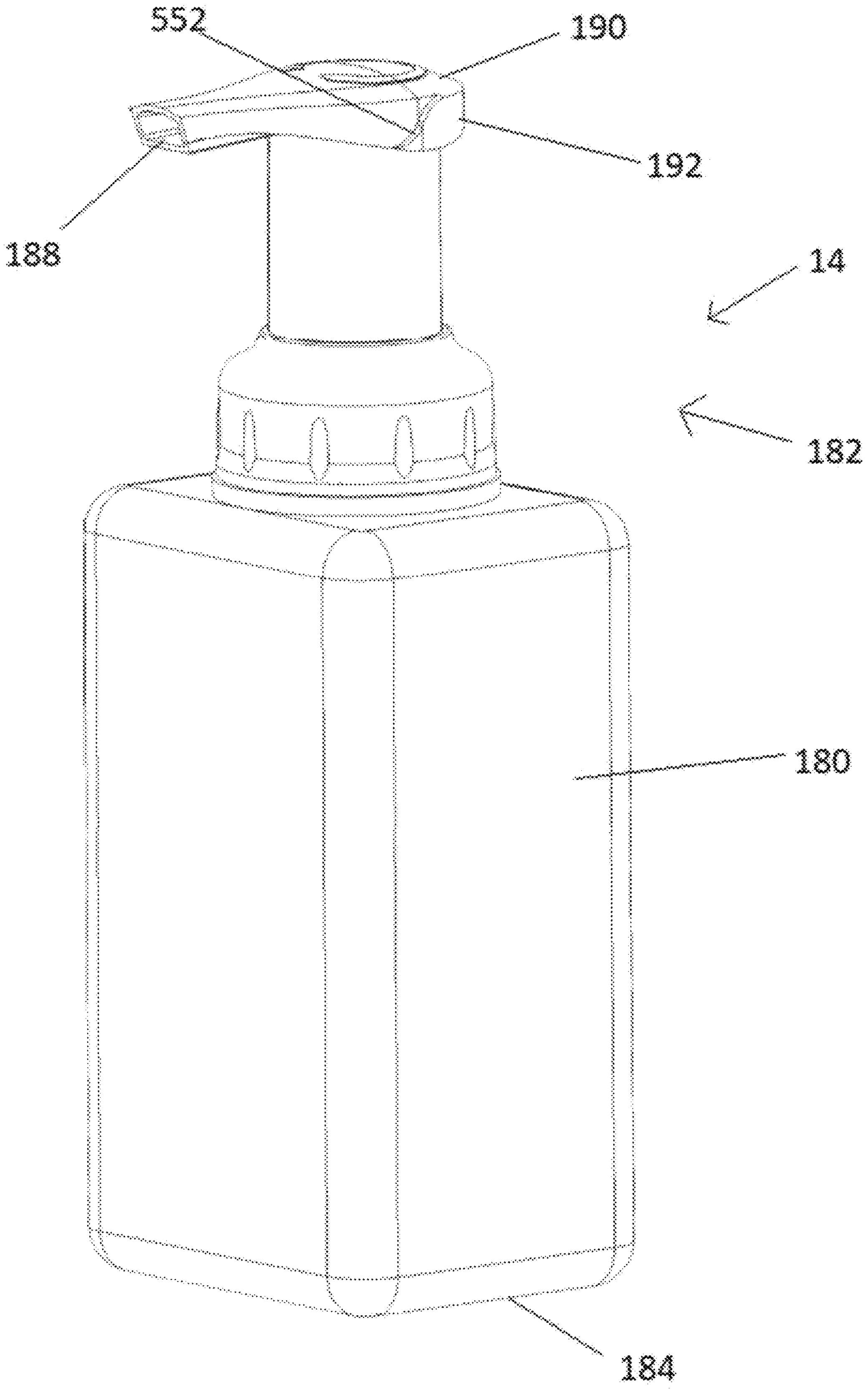
FIG. 62 is a perspective view of a first table top fluid dispenser configured for use with the fluid dispenser housing shown in FIG. 48.

The pump actuation mechanism assembly 544 is then lifted upwardly, so that the studs 546 extending downwardly from the top wall 36 are inserted into the stud receiving channels 548, and the studs 546 extending laterally inwardly from the side walls 38, 40 pass through the vertical sections 516 of the stud engagement channels 508 to the closed bottom ends 518 thereof, as shown in FIG. 61. As the studs 546 extending laterally inwardly from the side walls 38, 40 move through the vertical sections 516 towards the closed bottom ends 518, the studs 546 engage with the inclined upper surfaces 524 of the stud locking members 520, which biases the stud locking members 520 laterally inwardly away from the stud engagement channels 508. Once the studs 546 pass below and out of engagement with the stud locking fingers 522, the stud locking members 520 return to the locked position, with the stud locking surfaces 526 of the stud locking fingers 522 positioned above the studs 546. With the stud locking members 520 in the locked position, the stud locking surfaces 526 of the stud locking fingers 522 prevent the studs 546 extending laterally inwardly from the side walls 38, from exiting the closed bottom ends 518 of the stud engagement channels 508, and thus hold the pump actuation mechanism assembly 544 in place in the shroud 26.

To remove the pump actuation mechanism assembly 544 from the shroud 26, the stud locking members 520 are biased laterally inwardly to the unlocked position, for example by manually pinching or squeezing the stud locking members 520 towards each other. While the stud locking members 520 are in the unlocked position, the pump actuation mechanism assembly 544 can be removed from the shroud 26 by lowering the pump actuation mechanism assembly 544 relative to the shroud 26 to the position shown in FIG. 60, and then sliding the pump actuation mechanism assembly 544 forwardly relative to the shroud 26 so that the studs 546 exit the stud engagement channels 508, as shown in FIG. 59.

Figure 48:
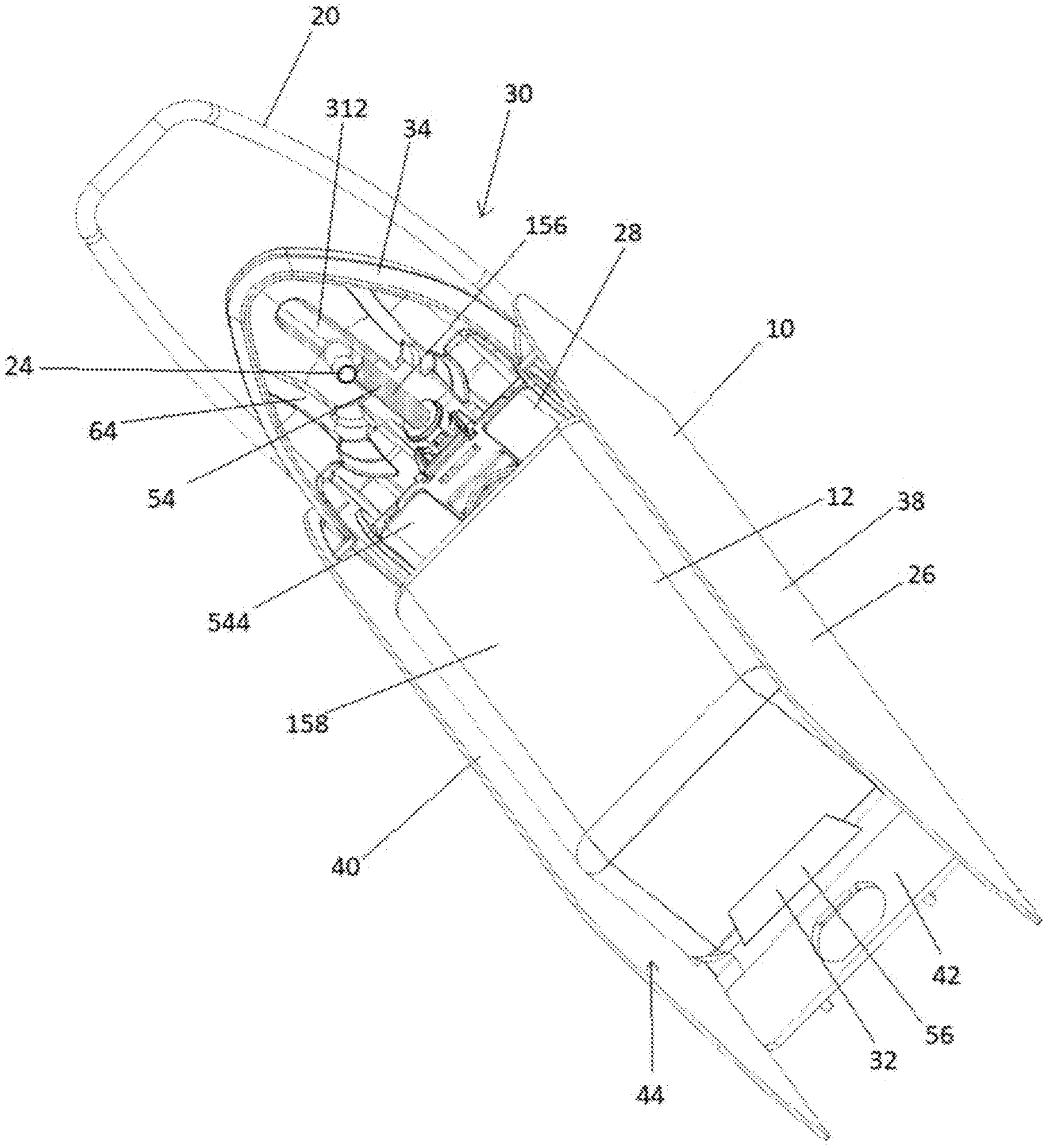
FIG. 48 is a bottom perspective view of a fluid dispenser housing containing a mountable fluid dispenser in accordance with a fifth embodiment of the present invention.

As shown in FIG. 48, the support member 32 extends forwardly from the back wall 42 near the bottom of the shroud 26, and has a foot portion 56 that provides a ledge-like support for supporting the mountable fluid dispenser 12 when the mountable fluid dispenser 12 is received by the housing 10, or for supporting the first or second table top fluid dispenser 14, 300 when the first or second table top fluid dispenser 14, 300 is received by the housing Although not shown in the drawings, the support member 32 is optionally adjustable to select the height of the foot portion 56 relative to the rest of the housing 10.

The mountable fluid dispenser 12 shown in FIGS. 48 to 69 is identical to the mountable fluid dispenser 12 shown in FIGS. 33 to 46, and has the same functions and features. As in the embodiment shown in FIGS. 33 to 46, in the embodiment shown in FIGS. 48 to 69 the actuation mechanism 30 is activated by depressing the lever 20, which causes the face shield 34 to pivot downwardly about the face shield pivot axis 362. When the mountable fluid dispenser 12 is received by the housing 10, as shown in FIG. 48, the downwards movement of the face shield 34 on depressing the lever 20 causes the catch member 62 of the face shield 34 to engage with the catching member 170 of the mountable fluid dispenser 12, which activates the fluid pump 54 of the mountable fluid dispenser 12 to dispense fluid 22 from the fluid outlet 24.

Figure 63:
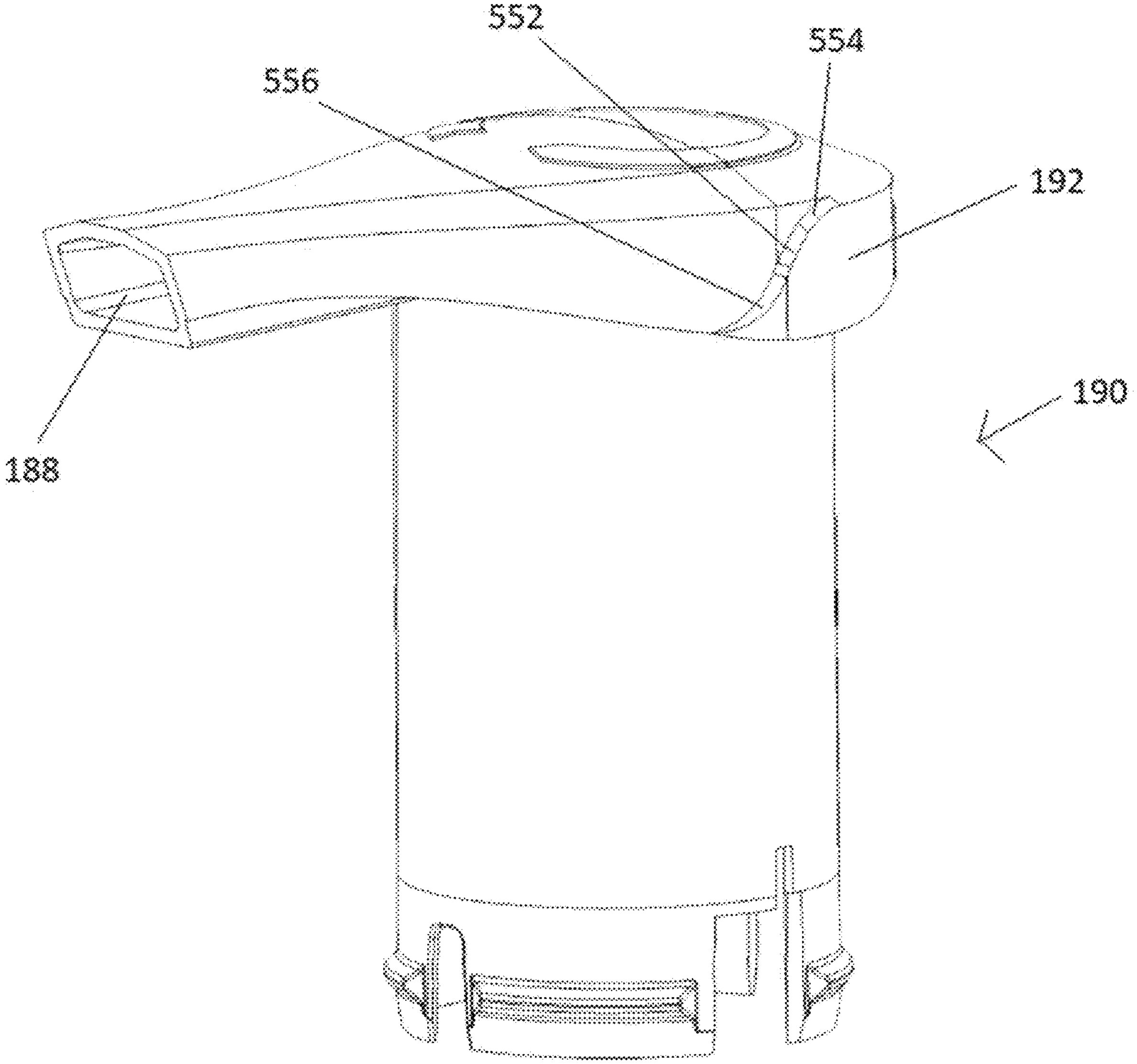
FIG. 63 is a right side perspective view of an activation member of the first table top fluid dispenser shown in FIG. 62.
Figure 64:
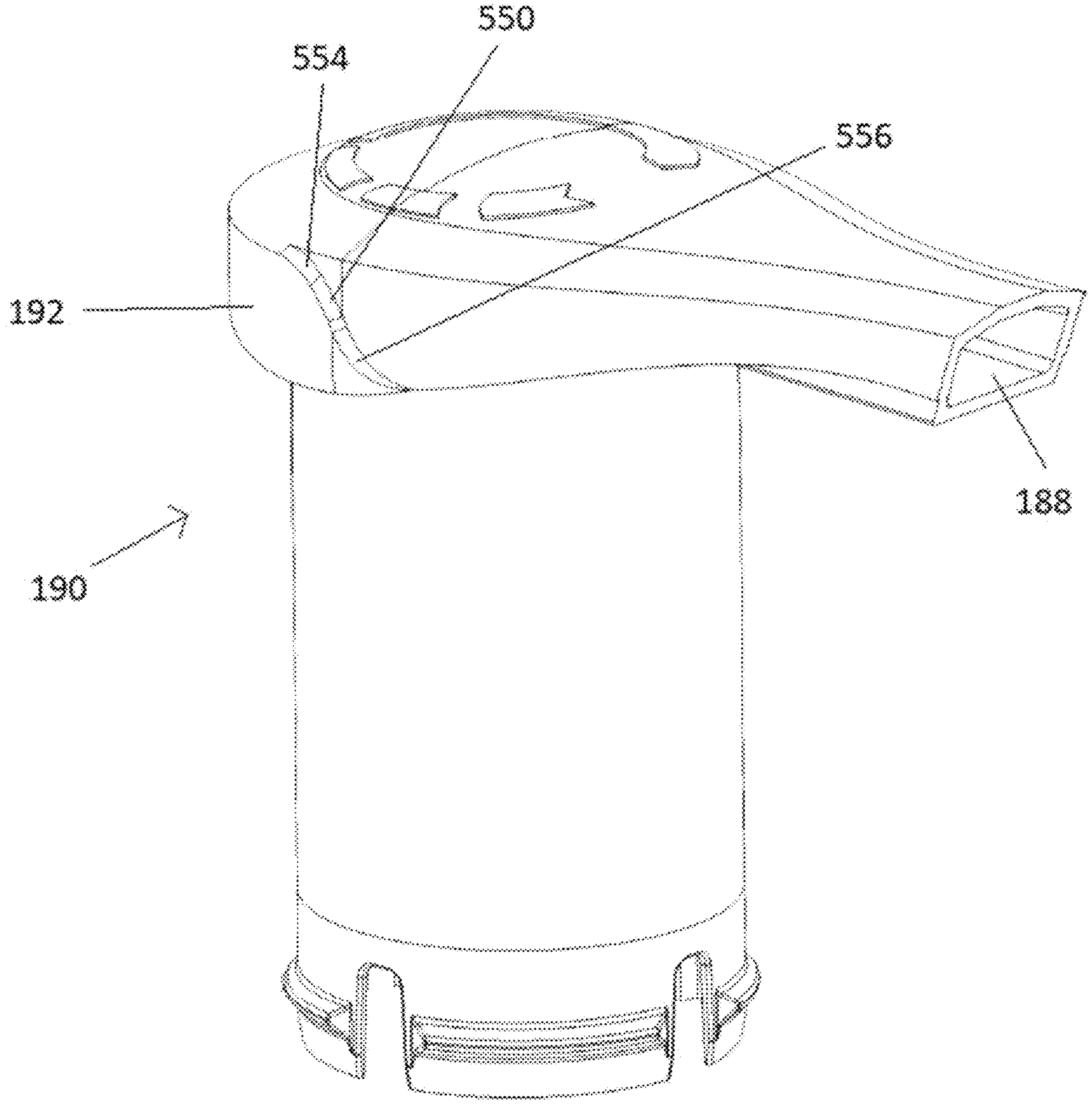
FIG. 64 is a left side perspective view of the activation member shown in FIG. 63.

The first table top fluid dispenser 14 shown in FIGS. 48 to 69 is identical to the first table top fluid dispenser 14 shown in FIGS. 33 to 46, with the only difference being the presence of a right locking surface 552 on the right side of the head 192 of the activation member 190 and a left locking surface 550 on the left side of the head 192 of the activation member 190. The right locking surface 552 is shown in FIG. 63 and the left locking surface 550 is shown in FIG. 64.

The right locking surface 552 and the left locking surface 550 face forwardly and have a wave-like contour. The right locking surface 552 and the left locking surface 550 are also sloped so as to extend upwardly as they extend rearwardly, and each have an upper portion 554 and a lower portion 556, the upper portion 554 being positioned upwardly and rearwardly relative to the lower portion 556.

Figure 65:
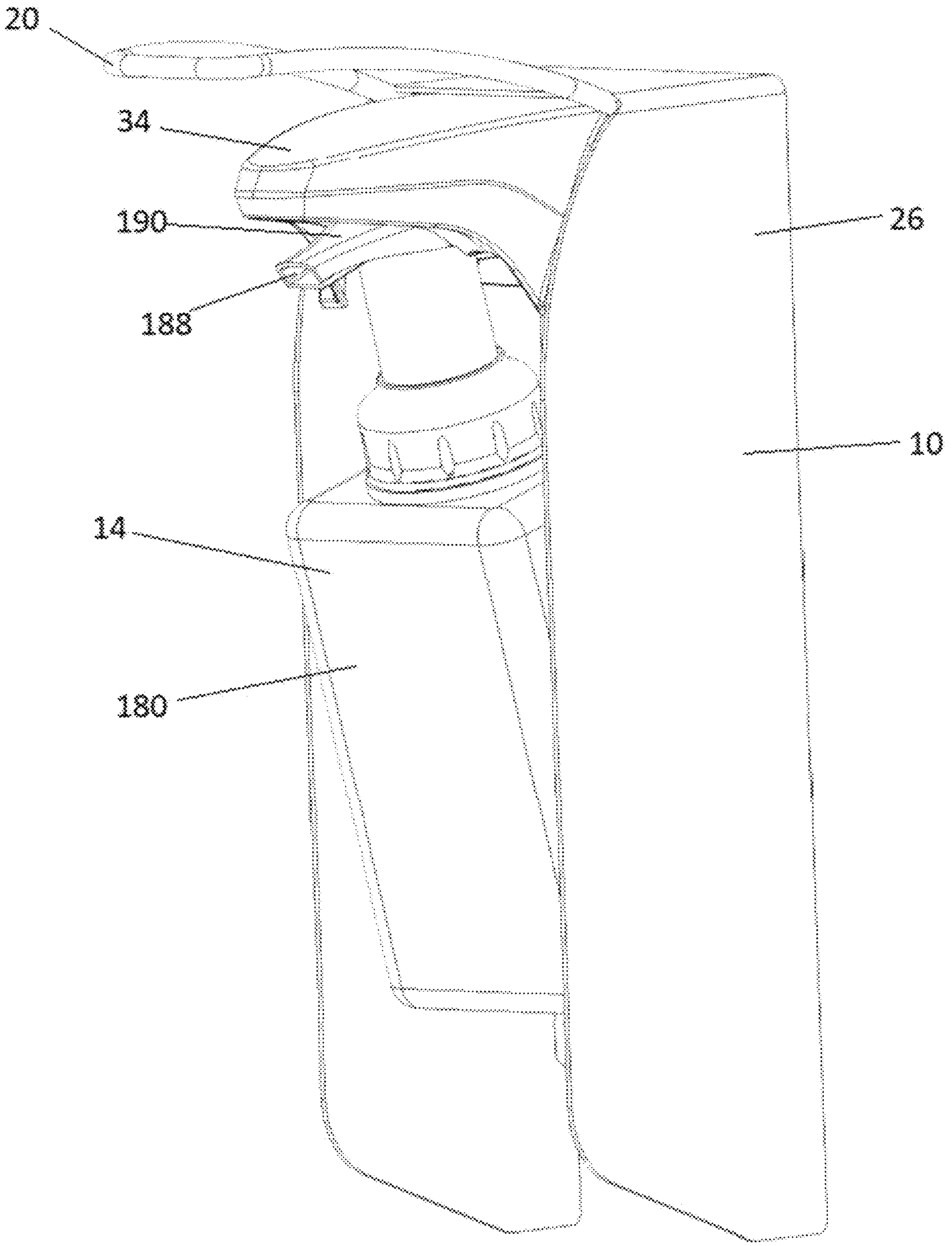
FIG. 65 is a perspective view of the fluid dispenser housing shown in FIG. 48 containing the first table top fluid dispenser shown in FIG. 62.
Figure 66:
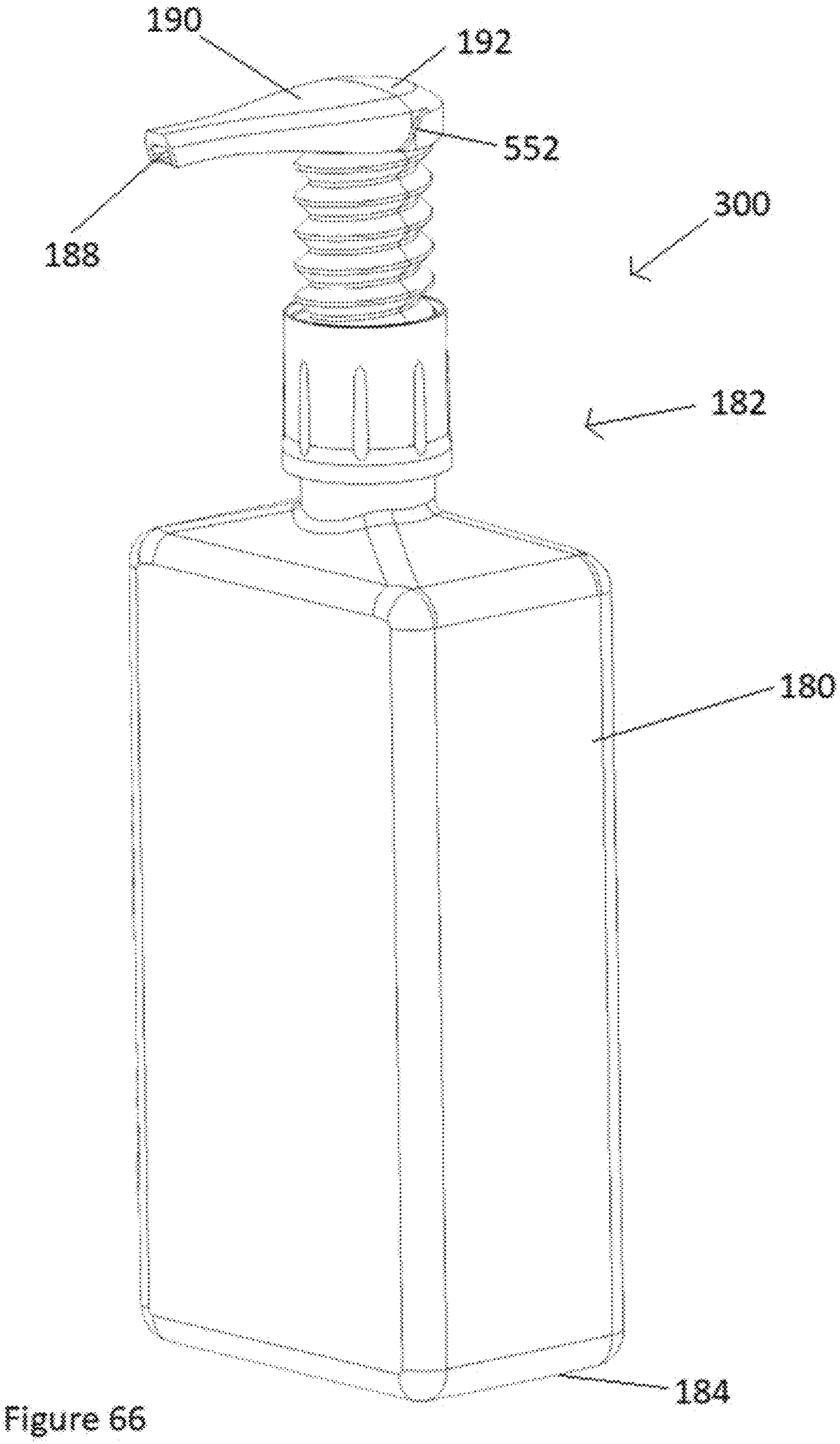
FIG. 66 is a perspective view of a second table top fluid dispenser configured for use with the fluid dispenser housing shown in FIG. 48.

The wave-like contour of the right locking surface 552 corresponds to the wave-like contour of the lower right support surface 534 of the engagement member 64, and the wave-like contour of the left locking surface 550 corresponds to the wave-like contour of the lower left support surface 530 of the engagement member 64, such that the right locking surface 552 matedly engages with the lower right support surface 534 and the left locking surface 550 matedly engages with the lower left support surface 530 when the first table top fluid dispenser 14 is received by the housing 10 as shown in FIG. 65. The engagement of the right locking surface 552 with the lower right support surface 534 and the left locking surface 550 with the lower left support surface 530 helps to prevent the first table top fluid dispenser 14 from falling forwardly out of the housing 10.

The applicant has appreciated that having support surfaces 530, 534 and locking surfaces 550, 552 that are sloped helps to guide the head 192 of the activation member 190 to the correct position within the second engagement portion 328 of the engagement member 64 when the first table top fluid dispenser 14 is placed in the housing 10. In particular, when the head 192 of the activation member 190 is placed in the second engagement portion 328, the sloped support surfaces 530, 534 and locking surfaces 550, 552 engage with each other and can slide against each other until the support surfaces 530, 534 and locking surfaces 550, 552 reach the correct mated configuration.

The applicant has further appreciated that having a slope that changes as the support surfaces 530, 534 and locking surfaces 550, 552 extend upwardly and rearwardly, and in particular the corresponding wave-like contours of the support surfaces 530, 534 and locking surfaces 550, 552, helps to guide the support surfaces 530, 534 and locking surfaces

550, 552 to their correct relative positions, and to matedly hold the support surfaces 530, 534 and locking surfaces 550, 552 together.

With the exception of the engagement of the locking surfaces 550, 552 with the support surfaces 530, 534, the first table top fluid dispenser 14 otherwise functions in exactly the same manner as the first table top fluid dispenser 14 shown in FIGS. 33 to 46. When the first table top fluid dispenser 14 is received by the housing 10 as shown in FIG. 65, depressing the lever 20 causes the face shield 34 to pivot downwardly, which causes the second engagement surface 330 of the engagement member 64 to depress the activation member 190, thereby activating the pump mechanism 182 to dispense fluid 22 from the dispenser outlet 188.

Figure 67:
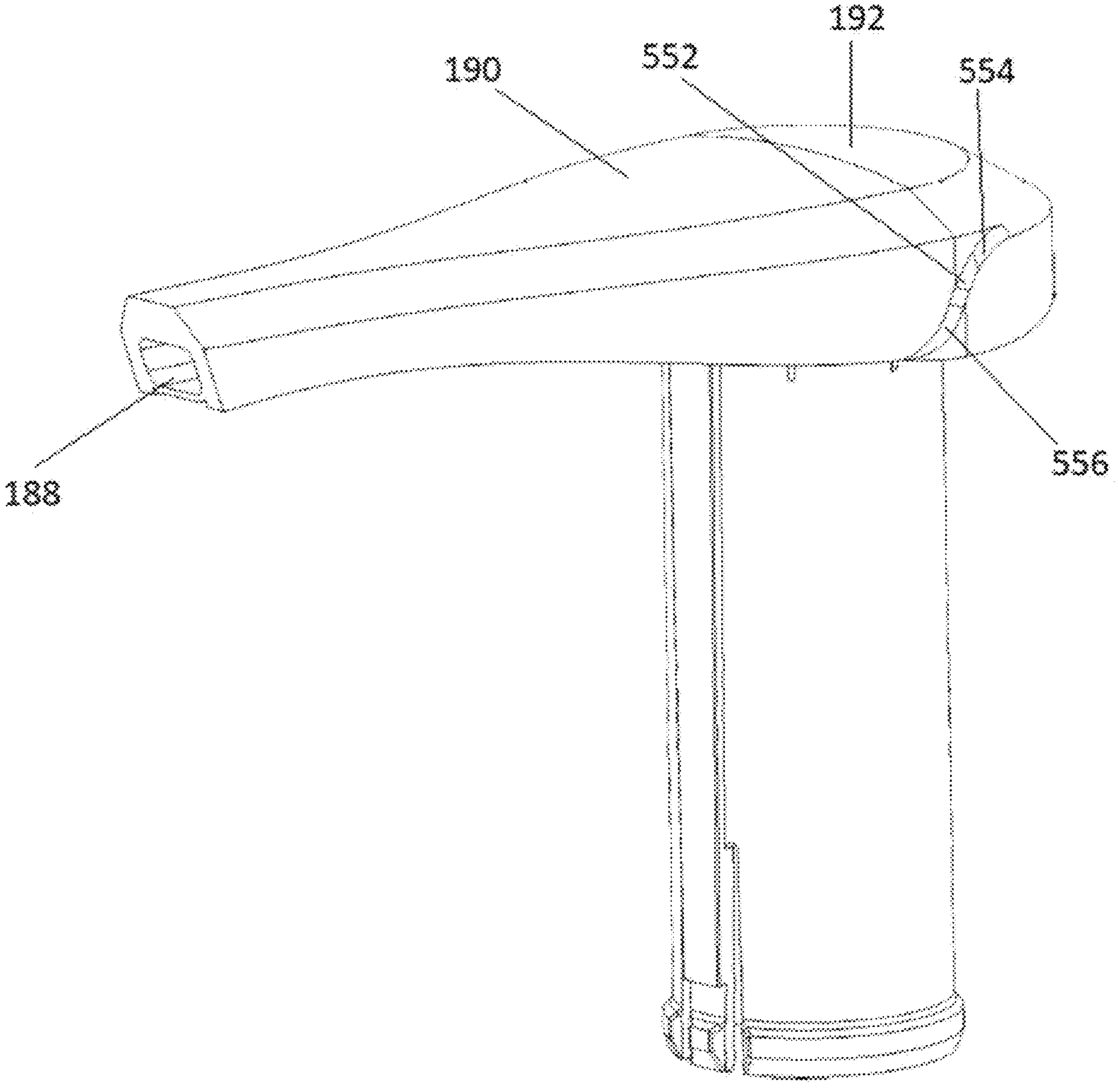
FIG. 67 is a right side perspective view of an activation member of the second table top fluid dispenser shown in FIG. 66.
Figure 68:
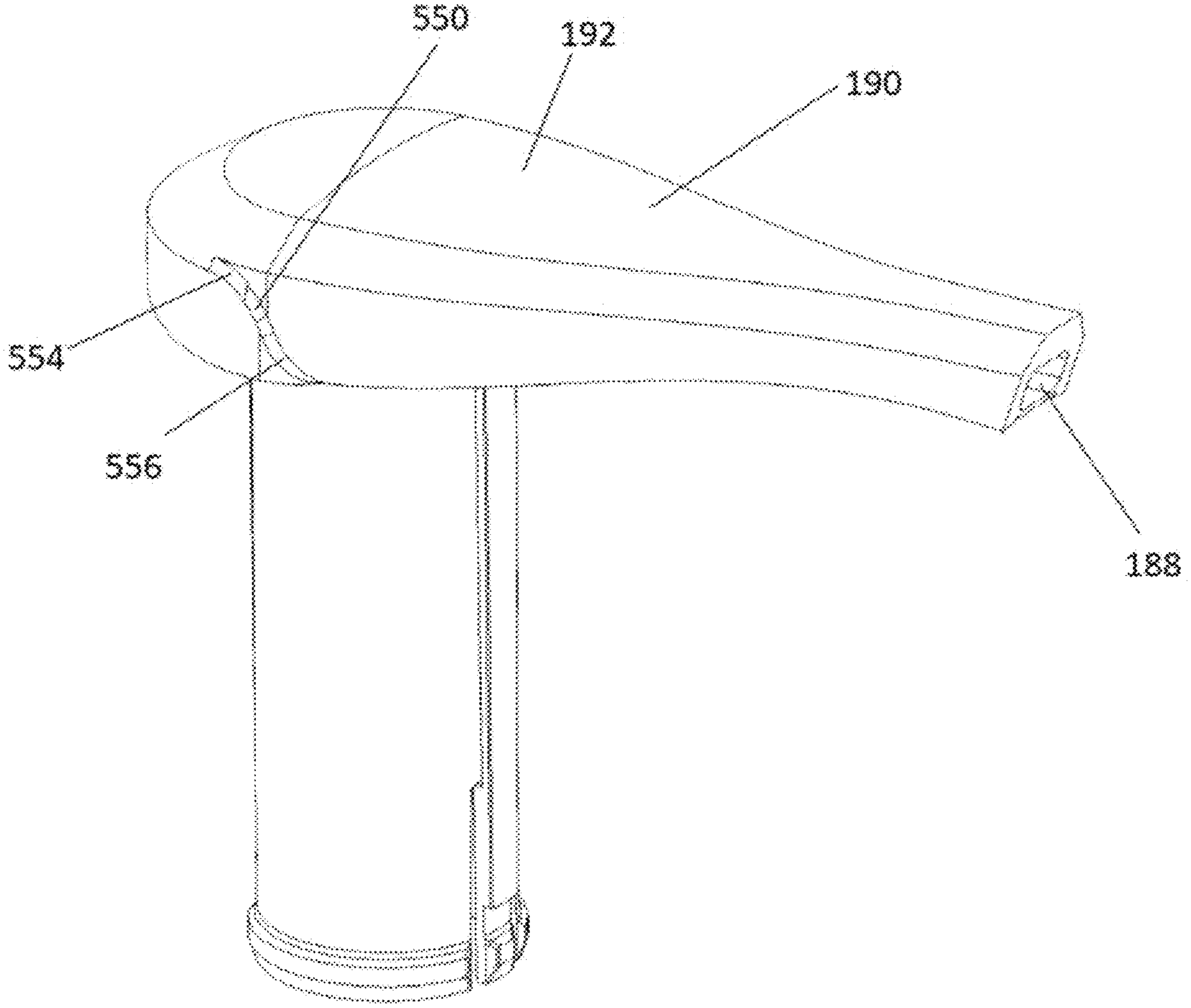
FIG. 68 is a left side perspective view of the activation member shown in FIG. 67.

The second table top fluid dispenser 300 shown in FIGS. 48 to 69 is identical to the second table top fluid dispenser 300 shown in FIGS. 33 to 46, with the only difference being the presence of a right locking surface 552 on the right side of the head 192 of the activation member 190 and a left locking surface 550 on the left side of the head 192 of the activation member 190. The right locking surface 552 is shown in FIG. 67 and the left locking surface 550 is shown in FIG. 68.

The right locking surface 552 and the left locking surface 550 face forwardly and have a wave-like contour. The right locking surface 552 and the left locking surface 550 are also sloped so as to extend upwardly as they extend rearwardly, and each have an upper portion 554 and a lower portion 556, the upper portion 554 being positioned upwardly and rearwardly relative to the lower portion 556.

Figure 69:
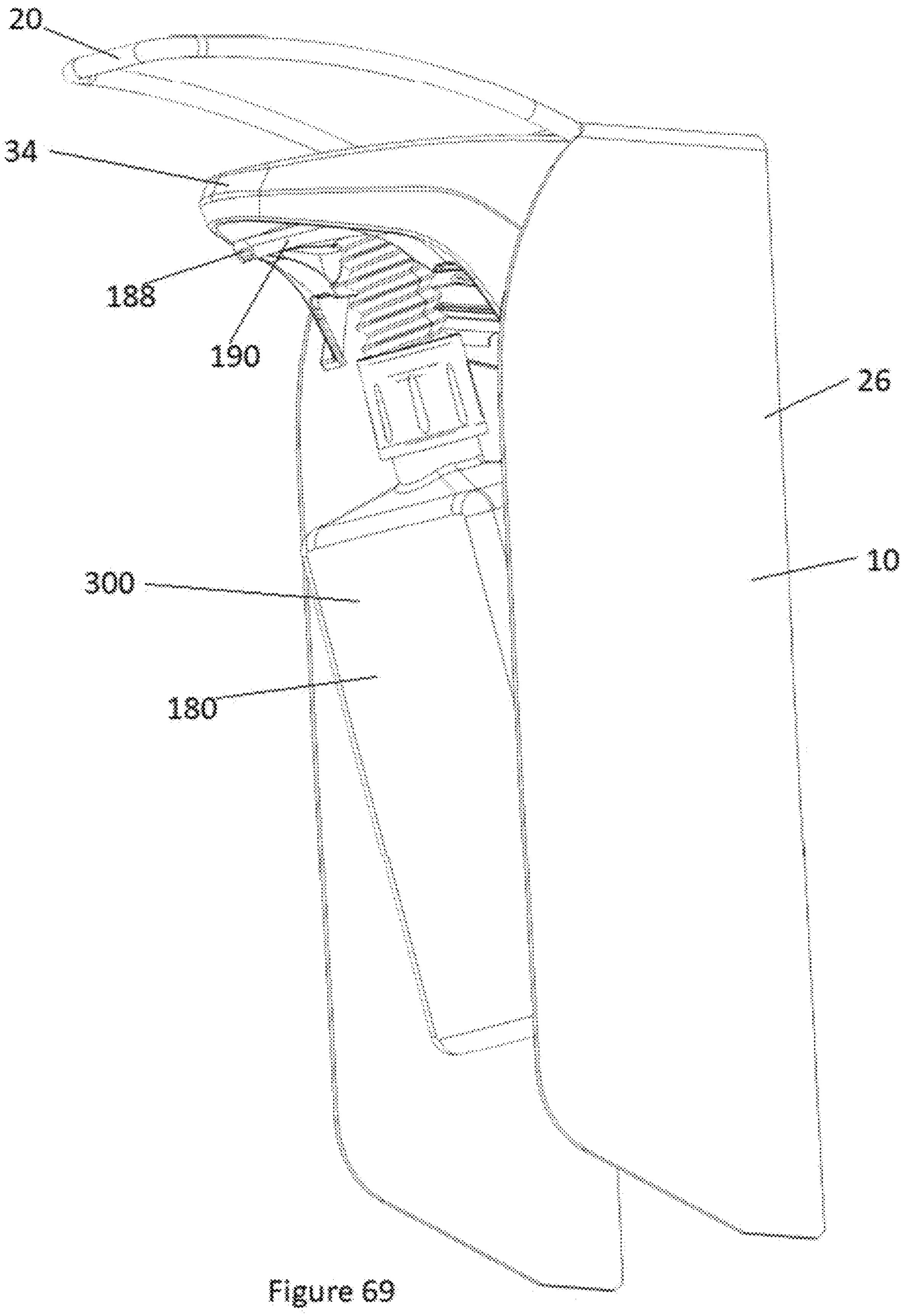
FIG. 69 is a perspective view of the fluid dispenser housing shown in FIG. 48 containing the second table top fluid dispenser shown in FIG. 66.

The wave-like contour of the right locking surface 552 corresponds to the wave-like contour of the upper right support surface 532 of the engagement member 64, and the wave-like contour of the left locking surface 550 corresponds to the wave-like contour of the upper left support surface 528 of the engagement member 64, such that the right locking surface 552 matedly engages with the upper right support surface 532 and the left locking surface 550 matedly engages with the upper left support surface 528 when the second table top fluid dispenser 300 is received by the housing 10 as shown in FIG. 69. The engagement of the right locking surface 552 with the upper right support surface 532 and the left locking surface 550 with the upper left support surface 528 helps to prevent the second table top fluid dispenser 300 from falling forwardly out of the housing 10.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular constructions of the housing 10, the mounted fluid dispenser 12, or the table top fluid dispensers 14 shown in the drawings. Rather, the invention could be used with any suitable construction and configuration of the housing 10, mountable fluid dispenser 12, and table top fluid dispenser 14.

The housing 10 could be mounted to any suitable support structure 16, including for example posts, poles, boards, or windows.

The invention could also be used with a housing 10 that is touchlessly operated. Any suitable touchlessly operated housing 10 that is known in the art could be adapted to incorporate the invention. Using a touchlessly operated housing 10 would preferably allow a table top fluid dispenser 14 that is normally manually operated to be operated touchlessly by mounting the table top fluid dispenser 14 in the touchlessly operated housing 10.

In some embodiments of the invention, the engagement member 64 is configured to fit within the open rear portion 152 of an existing face shield 34 of an existing housing 10, so that the housing 10 can be retrofitted to receive a table top fluid dispenser 14 merely by attaching the engagement member 64. In other embodiments of the invention, the existing face shield 34 may not have an open rear portion 152 that would accommodate the engagement member 64. In this circumstance, the face shield 34 could also be replaced with a new face shield 34 having a suitable open rear portion 152 that accommodates the engagement member 64, or which has an engagement member 64 integrally formed therein. The face shield 34 may also be referred to as a nozzle shield 34.

Optionally, the engagement member 64 may be provided or sold on its own as an adapter for retrofitting existing fluid dispenser housings 10. The engagement member 64 could also be provided or sold together with a replacement face shield 34. The engagement member 64 could also be provided or sold pre-installed in the housing 10. The engagement member 64 could also be provided or sold packaged together with the table top fluid dispenser 14. Although the engagement member 64 has been described in some of the preferred embodiments as a separate piece that attaches to the actuation plate 58, the engagement member 64 and the actuation plate 58 could also be formed as a single unitary piece.

Any suitable pump mechanism 182 could be used for the mountable fluid dispenser 12 and the table top fluid dispensers 14, and the invention is not limited to the particular pump mechanisms 182 that have been shown and described. Alternative mechanisms for attaching the actuation mechanism 30 of the housing 10 to the mountable fluid dispenser 12 could also be used, including for example mechanisms that do not include catch arms 96, 98, or where the catch arms 96, 98 are rigid rather than flexible. The engagement member 64 could also have a different shape than is shown in the drawings, including any suitable shape for engaging with any suitable type of table top fluid dispenser 14. The engagement member 64 could also connect to the actuation plate 58/face shield 34 in a manner that differs from that shown in the drawings. Preferably, the engagement member 64 attaches to the actuation plate 58/face shield 34 in a manner that does not interfere with the ability of the housing 10 to receive the mountable fluid dispenser 12, though this is not strictly necessary in all embodiments of the invention.

Although the fluid 22 is preferably a hand cleaning fluid 22, such as hand soap or hand sanitizer, the dispensers 12, 14 could be used to dispense other fluids 22 as well. The term "fluid" as used herein includes any flowable substance, including liquids, foams, emulsions, and dispersions.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A fluid dispensing system comprising:

a housing;

a first fluid dispenser; and a second fluid dispenser;

wherein the first fluid dispenser comprises:

a first bottle containing a supply of a first fluid;

a first dispenser outlet; and a first pump mechanism for dispensing an allotment of the first fluid from the first bottle out the first dispenser outlet upon activation of the first pump mechanism;

wherein the first pump mechanism has an activation member that is movable relative to the first bottle between a raised position and a depressed position;

wherein the first pump mechanism has a first biasing mechanism that biases the activation member towards the raised position;

wherein the first bottle has a bottom surface that engages with a horizontal support surface when the first fluid dispenser is placed on top of the horizontal support surface for operation of the first fluid dispenser in a stand-alone mode;

wherein, when the first fluid dispenser is placed on top of the horizontal support surface for operation of the first fluid dispenser in the stand-alone mode, the first pump mechanism is manually activatable to dispense the allotment of the first fluid by manually depressing the activation member from the raised position to the depressed position;

wherein the housing is configured to removably receive the first fluid dispenser for operation of the first fluid dispenser in a housed mode;

wherein the housing comprises:

an actuation mechanism; and a support member that engages with a support surface of the first fluid dispenser when the first fluid dispenser is received by the housing;

wherein the actuation mechanism comprises an engagement member that moves relative to the support member between a first position and a second position upon activation of the actuation mechanism;

wherein, when the first fluid dispenser is received by the housing for operation of the first fluid dispenser in the housed mode, and the engagement member is moved from the first position to the second position, the engagement member depresses the activation member from the raised position to the depressed position, to thereby activate the first pump mechanism to dispense the allotment of the first fluid;

wherein the second fluid dispenser comprises:

a second bottle containing a supply of a second fluid;

a second dispenser outlet; and a second pump mechanism for dispensing an allotment of the second fluid from the second bottle out the second dispenser outlet upon activation of the second pump mechanism;

wherein the second pump mechanism has a piston forming element and a piston chamber forming body;

wherein the piston chamber forming body defines a piston chamber that slideably receives the piston forming element;

wherein the piston forming element is slideable along a pump axis relative to the piston chamber forming body between an extended position and a retracted position;

wherein the housing is configured to removably receive the second fluid dispenser for operation of the second fluid dispenser when the first fluid dispenser is absent from the housing, without removal of the engagement member from the housing;

wherein the housing further comprises a support element that engages with the piston chamber forming body to prevent the piston chamber forming body from moving axially relative to the support element;

wherein the actuation mechanism further comprises a catch member that moves relative to the support element between an elevated position and a lowered position upon activation of the actuation mechanism;

wherein the piston forming element has a catching member that engages with the catch member;

wherein, when the catching member is engaged with the catch member and the support element is engaged with the piston chamber forming body, movement of the catch member between the elevated position and the lowered position moves the piston forming element relative to the piston chamber forming body between the extended position and the retracted position, to thereby activate the second pump mechanism to dispense the allotment of the second fluid; and wherein the actuation mechanism further comprises a second biasing mechanism that biases the catch member towards the elevated position.

2. The fluid dispensing system according to claim 1, wherein the housing is configured to be mounted to a vertical support structure.

3. The fluid dispensing system according to claim 1, wherein the support surface of the first fluid dispenser comprises the bottom surface of the first bottle.

4. The fluid dispensing system according to claim 1, wherein the actuation mechanism further comprises an actuation plate;

wherein the engagement member attaches to the actuation plate; and wherein the engagement member is detachable from the actuation plate.

5. The fluid dispensing system according to claim 4, wherein the catch member has two catch arms that extend from the actuation plate for engagement with the catching member;

wherein the engagement member attaches to the actuation plate at at least one attachment point; and wherein the at least one attachment point is spaced from the two catch arms.

6. The fluid dispensing system according to claim 5, wherein the two catch arms are resiliently deflectable from an unbiased position to a deflected position;

wherein the two catch arms move from the unbiased position to the deflected position upon engagement of the catch member with the catching member; and wherein the engagement member is sufficiently spaced from the two catch arms to permit movement of the two catch arms from the unbiased position to the deflected position.

7. The fluid dispensing system according to claim 5, wherein the actuation plate has a left side attachment opening and a right side attachment opening;

wherein a left one of the two catch arms extends through the left side attachment opening;

wherein a right one of the two catch arms extends through the right side attachment opening;

wherein the engagement member as a left side attachment arm and a right side attachment arm;

wherein the left side attachment arm extends through the left side attachment opening, and is spaced laterally outwardly from the left one of the two catch arms; and wherein the right side attachment arm extends through the right side attachment opening, and is spaced laterally outwardly from the right one of the two catch arms.

8. The fluid dispensing system according to claim 7, wherein, when the catch member engages with the catching member, the catching member is positioned between the two catch arms; and wherein, when the catch member engages with the catching member, the catching member is spaced from the left side attachment arm and the right side attachment arm of the engagement member.

9. The fluid dispensing system according to claim 4, wherein the piston forming element has an elongated spout tube, the second dispenser outlet located at a terminal end of the elongated spout tube;

wherein the engagement member has a spout tube opening; and wherein the elongated spout tube extends through the spout tube opening when the catching member is engaged with the catch member and the engagement member is attached to the actuation plate.

10. The fluid dispensing system according to claim 4, wherein, upon activation of the actuation mechanism, the actuation plate moves downwardly relative to the support element and relative to the support member;

wherein the downward movement of the actuation plate moves the catch member downwardly from the elevated position to the lowered position;

wherein the downward movement of the actuation plate moves the engagement member from the first position to the second position;

wherein the second biasing mechanism biases the actuation plate upwardly, which causes the actuation plate to move upwardly after the activation of the actuation mechanism has ended;

wherein the upward movement of the actuation plate moves the catch member upwardly from the lowered position to the elevated position; and wherein the upward movement of the actuation plate moves the engagement member from the second position to the first position.

11. The fluid dispensing system according to claim 1, wherein the actuation mechanism comprises a nozzle shield;

wherein the nozzle shield pivots about a pivot axis between a rest position and a lowered position upon activation of the actuation mechanism; and wherein pivoting of the nozzle shield between the rest position and the lowered position moves the engagement member between the first position and the second position.

12. The fluid dispensing system according to claim 11, wherein the nozzle shield comprises the engagement member and the catch member;

wherein the engagement member is spaced from the catch member;

wherein pivoting of the nozzle shield between the rest position and the lowered position moves the catch member between the elevated position and the lowered position; and wherein the second biasing mechanism biases the nozzle shield towards the rest position.

13. The fluid dispensing system according to claim 11, wherein the actuation mechanism further comprises an actuator lever;

wherein the actuation mechanism is activated by manually depressing the actuator lever from a raised position to a depressed position;

wherein the housing has a pump mounting body, the pump mounting body comprising the support element;

wherein the nozzle shield is pivotally mounted to the pump mounting body for pivoting relative to the pump mounting body about the pivot axis; and wherein, when the actuator lever moves from the raised position to the depressed position, the actuator lever engages with the nozzle shield, which pivots the nozzle shield about the pivot axis from the rest position to the lowered position.

14. The fluid dispensing system according to claim 1, further comprising a third fluid dispenser, the third fluid dispenser comprising:

a third bottle containing a supply of a third fluid;

a third dispenser outlet; and a third pump mechanism for dispensing an allotment of the third fluid from the third bottle out the third dispenser outlet upon activation of the third pump mechanism;

wherein the third pump mechanism has a second activation member that is movable relative to the third bottle between a raised position and a depressed position;

wherein the third pump mechanism has a third biasing mechanism that biases the second activation member towards the raised position;

wherein the third bottle has a second bottom surface that engages with a horizontal support surface when the third fluid dispenser is placed on top of the horizontal support surface for operation of the third fluid dispenser in a stand-alone mode;

wherein, when the third fluid dispenser is placed on top of the horizontal support surface for operation of the third fluid dispenser in the stand-alone mode, the third pump mechanism is manually activatable to dispense the allotment of the third fluid by manually depressing the second activation member from the raised position to the depressed position;

wherein the housing is configured to removably receive the third fluid dispenser for operation of the third fluid dispenser in a housed mode, when the first fluid dispenser and the second fluid dispenser are absent from the housing;

wherein the support member engages with the second bottom surface of the third bottle when the third fluid dispenser is received by the housing; and wherein, when the third fluid dispenser is received by the housing for operation of the third fluid dispenser in the housed mode, and the engagement member is moved from the first position to the second position, the engagement member depresses the second activation member from the raised position to the depressed position, to thereby activate the third pump mechanism to dispense the allotment of the third fluid.

15. The fluid dispensing system according to claim 14, wherein the engagement member has a first engagement portion configured to receive the first activation member of the first fluid dispenser when the first fluid dispenser is received by the housing;

wherein the engagement member has a second engagement portion configured to receive the second activation member of the third fluid dispenser when the third fluid dispenser is received by the housing; and wherein the first activation member has a different size and/or a different shape than the second activation member.

16. The fluid dispensing system according to claim 1, wherein the piston forming element has an elongated spout tube, the second dispenser outlet located at a terminal end of the elongated spout tube; and wherein the engagement member has a channel for receiving the elongated spout tube when the second fluid dispenser is received by the housing.

17. The fluid dispensing system according to claim 1, wherein the support member has an adjustable height.

18. The fluid dispensing system according to claim 1, wherein the housing is configured to carry the second fluid dispenser in a substantially vertical orientation when the second fluid dispenser is received by the housing; and wherein the housing is configured to carry the first fluid dispenser angled forwardly in a tilted orientation when the first fluid dispenser is received by the housing.

19. The fluid dispensing system according to claim 1, wherein the engagement member comprises a cavity for receiving the activation member of the first fluid dispenser;

wherein the cavity has an upper surface that engages with a top surface of the activation member;

wherein, upon activation of the actuation mechanism, the upper surface of the cavity moves downwardly, which depresses the activation member;

wherein the cavity has a left side surface that is positioned adjacent to a left side of the activation member when the first fluid dispenser is received by the housing;

wherein the cavity has a right side surface that is positioned adjacent to a right side of the activation member when the first fluid dispenser is received by the housing;

wherein the left side surface of the cavity has a rearwardly facing left support surface that is configured to engage with a forwardly facing left locking surface on the left side of the activation member; and wherein the right side surface of the cavity has a rearwardly facing right support surface that is configured to engage with a forwardly facing right locking surface on the right side of the activation member.

20. The fluid dispensing system according to claim 2, wherein the support surface of the first fluid dispenser comprises the bottom surface of the first bottle;

wherein the actuation mechanism comprises a nozzle shield;

wherein the nozzle shield pivots about a pivot axis between a rest position and a lowered position upon activation of the actuation mechanism;

wherein pivoting of the nozzle shield between the rest position and the lowered position moves the engagement member between the first position and the second position;

wherein the actuation mechanism further comprises an actuator lever;

wherein the actuation mechanism is activated by manually depressing the actuator lever from a raised position to a depressed position;

wherein the housing has a pump mounting body, the pump mounting body comprising the support element;

wherein the nozzle shield is pivotally mounted to the pump mounting body for pivoting relative to the pump mounting body about the pivot axis;

wherein, when the actuator lever moves from the raised position to the depressed position, the actuator lever engages with the nozzle shield, which pivots the nozzle shield about the pivot axis from the rest position to the lowered position;

wherein the second biasing mechanism biases the actuator lever towards the raised position;

wherein the piston forming element has an elongated spout tube, the second dispenser outlet located at a terminal end of the elongated spout tube;

wherein the engagement member has a channel for receiving the elongated spout tube when the second fluid dispenser is received by the housing;

wherein the housing is configured to carry the second fluid dispenser in a substantially vertical orientation when the second fluid dispenser is received by the housing; and wherein the housing is configured to carry the first fluid dispenser angled forwardly in a tilted orientation when the first fluid dispenser is received by the housing.

* * * * *